US007120928B2

(12) United States Patent
Sheth et al.

(10) Patent No.: US 7,120,928 B2
(45) Date of Patent: Oct. 10, 2006

(54) SECURE SELECTIVE SHARING OF ACCOUNT INFORMATION ON AN INTERNET INFORMATION AGGREGATION SYSTEM

(76) Inventors: Dinesh Sheth, 2420 Lennox Dr., Germantown, TN (US) 38138; Bysakh Bhasi, 2923 Waterview Cove, Memphis, TN (US) 38119

( * ) Notice: Subject to any disclaimer, the term of this patent is extended or adjusted under 35 U.S.C. 154(b) by 1087 days.

(21) Appl. No.: 09/944,333

(22) Filed: Aug. 30, 2001

(65) Prior Publication Data

US 2002/0194502 A1 Dec. 19, 2002

Related U.S. Application Data

(60) Provisional application No. 60/298,770, filed on Jun. 15, 2001.

(51) Int. Cl.
*G06F 17/30* (2006.01)
*H04L 9/32* (2006.01)
*G06F 7/04* (2006.01)
*G06F 15/16* (2006.01)
*H04K 1/00* (2006.01)
*H04L 9/00* (2006.01)

(52) U.S. Cl. .............................. 726/4; 726/7; 713/184
(58) Field of Classification Search ..................... None
See application file for complete search history.

(56) References Cited

U.S. PATENT DOCUMENTS

| 5,819,285 | A | 10/1998 | Damico et al. |
| 5,878,219 | A | 3/1999 | Vance et al. |
| 6,081,263 | A | 6/2000 | LeGall et al. |
| 6,112,240 | A | 8/2000 | Pogue et al. |
| 6,269,370 | B1 | 7/2001 | Kirsch |
| 6,327,628 | B1 | 12/2001 | Anuff et al. |
| 6,438,575 | B1 | 8/2002 | Khan et al. |
| 6,483,523 | B1 | 11/2002 | Feng |
| 6,493,717 | B1 * | 12/2002 | Junkin .......................... 707/102 |
| 6,782,253 | B1 * | 8/2004 | Shteyn et al. ............. 455/414.1 |
| 6,820,204 | B1 * | 11/2004 | Desai et al. .................... 726/6 |
| 6,839,680 | B1 * | 1/2005 | Liu et al. ....................... 705/10 |
| 6,856,974 | B1 | 2/2005 | Ganesan et al. |

(Continued)

FOREIGN PATENT DOCUMENTS

WO WO 9835469 A2 * 8/1998

OTHER PUBLICATIONS

Weston, Rusty, et al. "Stop browsing: Let the Net wait on you for a change: Harness the p . . . " May 1997, ComputerLife v4, n5, p. 82-84.

(Continued)

*Primary Examiner*—Kambiz Zand
*Assistant Examiner*—Virgil Herring
(74) *Attorney, Agent, or Firm*—Wyatt, Tarrant & Combs, LLP

(57) ABSTRACT

A computerized method of providing and allowing secure selective sharing of account information between users of an Internet information aggregation system. A grantor user creates one or more view pages, each of the view pages having a plurality of monitors therein. A unique visitation access code is assigned to each of a plurality of grantee users of the system. The grantor uses the visitation access codes to selectively grant visitation access to the grantor's view pages to selected grantees. When a grantee logs onto the Internet information aggregation system via a processor, such as a computer or a mobile device, the system allows the grantee user to select one of the grantors' view pages, whereupon the system displays the selected grantor's view page on the grantee user's display.

52 Claims, 40 Drawing Sheets

U.S. PATENT DOCUMENTS

| | | | |
|---|---|---|---|
| 6,859,212 | B1 | 2/2005 | Kumar et al. |
| 6,871,220 | B1 | 3/2005 | Rajan et al. |
| 6,941,376 | B1 * | 9/2005 | Mitchell et al. ............ 709/229 |
| 6,957,199 | B1 * | 10/2005 | Fisher ......................... 705/78 |
| 2001/0032092 | A1 | 10/2001 | Calver |
| 2001/0051907 | A1 | 12/2001 | Kumar et al. |
| 2002/0007330 | A1 | 1/2002 | Kumar et al. |
| 2002/0018078 | A1 | 2/2002 | Khan et al. |
| 2002/0049727 | A1 | 4/2002 | Rothkopf |
| 2002/0052954 | A1 | 5/2002 | Polizzi et al. |
| 2002/0194267 | A1 | 12/2002 | Flesner et al. |
| 2003/0120599 | A1 | 6/2003 | Algboatwalla et al. |
| 2004/0199497 | A1 * | 10/2004 | Timmons ....................... 707/3 |

OTHER PUBLICATIONS

Willmott, Don, et al. "Yodlee—This new digital dashboard puts all your password-protected online accounts in one place for easy viewing," Feb. 2000, PC Magazine pp. 1.

Intuit Inc. et al. "Intuit To Expand Its "My Accounts" by Quicken service giving consumers the power to view account data from more than 40 . . . ", Press Release Feb. 2, 2000.

Financial Review Online, "Yodlee unveils "Activities-Centric" Agg Platform, Adds Partners," Http:www.edocs.com/News/Media Coverage/2000/MC_FinServOnline_121100.htm.

www.yodlee.com et al, "Dashboard help," Apr. 4, 2001, Http://web.archive.org/web/20010417134325/www.yodlee.com/help/dashboard.html, pp. 1-7.

Yodlee Inc. et al "My Yodlee Demo" Mar. 2001, pp. 1-8 http://web.archive.org/web/20010331035420/www.yodlee.com/demo/overview.html.

Wall Street Technology et al., "The Big Picture: Account Aggregation" Aug. 10, 2000 http://www.wallstreettech.com/showArticle.html:articleID=14704395 pp. 1-2.

Fuji, Hiroshi et al., "E-aggregation: the Present and Future of Online Financial Services in Asia-Pacific" May 2000 pp. 1-14.

ByAllAcounts Inc. et al "WebPortfolio Demo" Apr. 2 pp. 1-13 http://www.byallaccounts.com/products/webpril02.htm.

* cited by examiner

Figure 2

*(Browser window showing uMonitor.com page at https://www.umonitor.com/s/av?servtypeid=name)*

Toolbar: Back, Forward, Stop, Refresh, Home, AutoFill, Print, Mail, Favorites, Add, Source

Bookmarks: @ Live Home Page, @ Apple Computer, @ Apple Support, @ Apple Store, @ Microsoft MacTopia, @ MSN, @ Office for Macintosh, @ View of uMONITOR.com — Search [60] [Altavista] [62] [Go]

even view --------Views-------- | --------Options-------- | Logout Help Feedback | My Favorites – Fast Login

Finance Monitor — Modify Refresh

First Tennessee Bank [AutoLogin]
Last Updated June 14, 04:00AM, EDT[Refresh]
00005234200005484857  $(514.20)
00005236200000484957
Current Balance  $(349.21)

Digital Credit Uni [1] [AutoLogin]
Last Updated 14, 04:00AM, EDT[Refresh]
Primary Account  $30.41
Free Checking  $12.17
Visa Classic
Current Balance  $(1,456.02)
Available Credit  $1,542.98
Min Payment Due  $12.44
Payment Due Date  7/5/01

New Vehicle
Current Balance  $(1150.33)
Available Credit  $0.00
Min Payment Due [158A]  $97
Payment Due Date  $01

Net Bank [AutoLogin]
Last Updated March 18, 04:00 [Refresh]
10002510567 [160A] 92

T. Rowe Price Workplace [AutoLogin]
Last Updated March 19, 04:00AM, EDT[Refresh]
260191920
Symbol  Quantity  Price  Value
Blue Chip Growt  8.645  $  39.32
Janus Fund  8.398  $3  [10]  119.32
Restricted Sone  8.354  $32.07  $2,037.15
S1 Corporation  493.060  $12.05  $5,048.60
Net Value  $8,528.68

Charles Schwab [AutoLogin]
Last Updated June 14, 04:00AM, EDT[Refresh]
Symbol  Quantity  Price  Value
SNXFX  30.539  $34.57  $1,055.73
SWTX  127.812  $19.43  $2,483.39
CASH  $3,967.73
Net Value  $7,506.85

Janus Funds [AutoLogin]
Last Updated June 14, 04:00AM, EDT[Refresh]
201094114 saurin
Symbol  Quantity  Price  Value
Janus Fund  238.827  $32.15  $7,202.63
Janus Growth An  371.956  $33.07  $12,208.03
Janus Twenty Fu  198.027  $44.76  $9,863.69
Janus Worldwide  190.741  $50.21  $9,577.11
Net Value  $37,940.36

201116764 saurin
Symbol  Quantity  Price  Value
Janus Twenty  295.401  $44.76  $13,222.15
Net Value  $13,222.15

203428187 saurin
Symbol  Quantity  Price  Value
Janus Twenty FU  45.317  $44.76  $2,028.39
Net Value  $2,028.39

202018611 saurin
Symbol  Quantity  Price  Value
Janus Enterpris  364.621  $79.50  $14,410.43
Janus OldBal LI  988.744  $17.62  $17,421.07
Janus Mercury F  825.458  $24.62  $20,222.78
Janus Money Mar  2,424.710  $1.00  $3,424.71
Janus Olympus F  822.198  $31.03  $17,025.01
Janus Orion Fun  2,218.680  $5.71  $13,239.55
Janus Special S  1,002.892  $17.11  $17,178.22
Janus Strategic  1,784.578  $10.33  $18,192.80
Janus Twenty Fu  345.172  $44.76  $15,449.90
Janus Venture F  410.197  $46.47  $19,051.85
Net Value  $154,727.11
Total  $203,045.20

CreditCard Monitor — Modify Refresh

American Express Card [AutoLogin]
Last Updated June 14, 04:02AM, EDT[Refresh]
XXX-XXXXXX-X1005  $(509.53)
Current Balance  $(509.53)

Discover Card [2] [AutoLogin]
Last Update 04:02AM, EDT[Refresh]
XXX-XXXXXX-4645
Current Balance  $(509.53)
Credit Limit  $6,750.00
Available Credit  $6,127.00
Min Payment Due  $12.00
Payment Due Date  June 11,2001
The username and/or password supplied could not access your account. Plea[400]d resubmit.
$(1,100.58)

Package Monitor — Modify Refresh
Last Updated March 22, 01:00AM, EST
Package  Carrier  Status  Date
XX – 2949  FedEx  Delivered  12/20/2000 11:29
XX – 2871  FedEx  Delivered  12/20/2000 11:30
--Select Carrier--
[Track] [Monitor]

Flight Monitor — Modify Refresh
To add a flight to this section please click on the Modify link.
Flight #
--Select Airline--
Jun  14  2001
[Get Information] [Monitor]

Lifestyle Monitor — Modify Refresh
Auctions & Bids
EggHead.com  Yahoo Auctions
Computers & Internet
Computer.net
Finance
PO.com
Reference
Yourdictionary.com  WhobePages.com  Compudata.net
Dictionary.com
Shopping
123Greetings.com  Amazon

Bills Monitor — Modify Refresh
Bellsouth [AutoLogin]
Last Updated June 14, 03:00AM, EDT[Refresh]
Due Date  Amt Due
XXX-XXX-1757  Jun 23  $(171.63)

Sprint PCS [AutoLogin]
Last Updated March 12, 06:06AM, CST[Refresh]
Due Date  Amt Due
9012690331  March 17, 2001  $(0.00)
The username and/or password supplied could not access your account. Please verify and resubmit.
Total  $(171.63)

My Insurance — Modify Refresh
To add an account to this section please click on the Modify link.

Market Monitor — Modify Refresh

Select Broker [Janus Fund] [64] [Trade]

| Symbol | Price | Change | (%) |
|---|---|---|---|
| AJ | 1077.28 | 14.22 | -0.87% |
| AOS | NA | NA | |
| BEAS | 2.33 | 0.02 | -6.64% |
| BUD | [3] 0.24 | .057% | |
| COMP | 2 | -3.71 | -1.59% |
| F | 24.58 | 0.01 | 0.04% |
| FOX | 37.62 | 0.31 | 0.29% |
| FON | 28.02 | -0.48 | 2.15% |
| GLW | 18.64 | -0.71 | -4.09% |
| | 80.29 | -0.23 | -0.39% |
| [500] | 116.34 | -1.19 | -3.07% |
| | 6.71 | -0.53 | -2.92% |
| MOT | 14.40 | -0.48 | -3.23% |
| MSFT | 69.75 | -0.93 | -1.32% |
| ORCL | 15.01 | -0.49 | -3.10% |
| PCS | 20.95 | -0.45 | -2.1% |
| NIFY | 3.82 | 0.02 | 0.53% |
| SPX | 1231.68 | -9.91 | -0.8% |
| T | 20.75 | -0.21 | -1.0% |
| YOO | 23.04 | -0.36 | -1.51% |
| WGON | 16.38 | -0.46 | -3.75% |

Quotes are delayed
Enter Quote symbol
[Get Quote] [Monitor]

Rewards Monitor — Modify Refresh
Delta Airlines [AutoLogin]
Last Updated June 23, 04:00AM, EDT[Refresh]
XXXXX26500  0

Hilton Honors [AutoLogin]
Last Updated June 13, 06:00AM, EDT[Refresh]
XXXXX4831  61,985

Marriott Rewards [AutoLogin]
Last Updated June 4, 06:00am, EDT[Refresh]
Dsheth  475,995 uMonitor Mail (0 New, 0 Total)
Last Updated Feb 08, 10:07AM, CST[Refresh]
Sender  Date  Subject

Yahoo Mail (13 New, 14 Total)
Last Updated June 14, 10:00AM, EDT[Refresh]
Sender  Date  Subject
lhe5547@h  Jun 08  DATA e-alert 0
brandedneu  May 16  FI Home Based b
Admissions  May 14  You have been a
Lxmong  Jun 05  2nd Mortgage fa
Admissions  May 30  University Dipl

Weather Monitor — Modify Refresh
Last Updated June 14, 10:00AM, EDT[Refresh]
| City | Lo | HI | Current |
|---|---|---|---|
| Chicago, IL | 70°F | 90°F | (73°F) |
| Los Angeles, CA | 61°F | 84°F | (63°F) |
| Memphis, TN | 73°F | 91°F | (73°F) |
| New York, NY | 68°F | 81°F | (68°F) |
| Houston, TX | 75°F | 80°F | (81°F) |
| Baltimore, MD | 70°F | 84°F | (73°F) |
| Atlanta, GA | 68°F | 86°F | (72°F) |

Enter City or Zip
[Get Details] [Monitor]
(e.g. 38119 or Memphis or Memphis, TN)

---

Copyright © 2001 uMonitor, Inc. All rights reserved.
TRUSTe  VeriSign
About uMonitor  Security & Privacy Policy  Terms of Service  Contact uMonitor Connection to www.umonitor.com is secure (RD4-128)

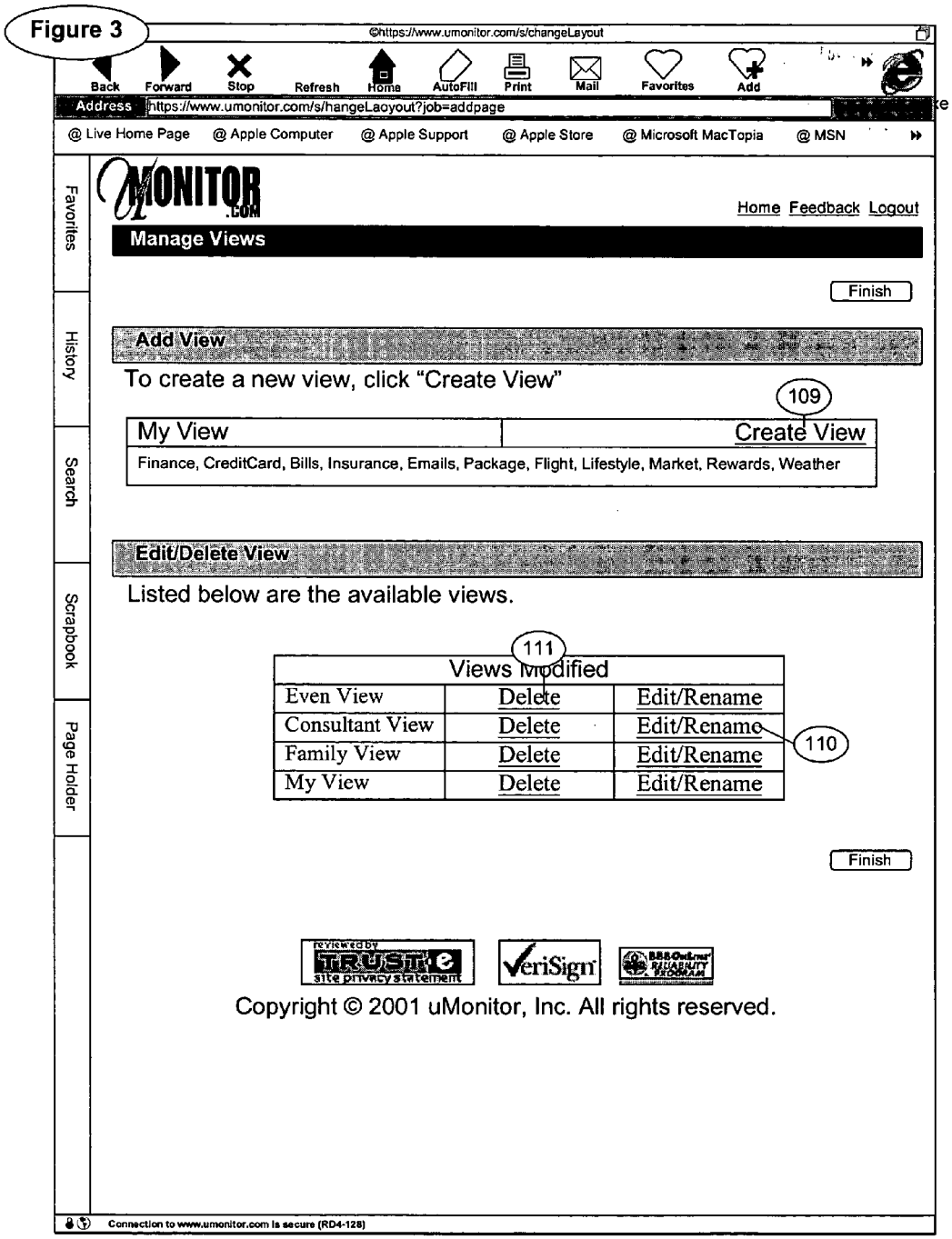

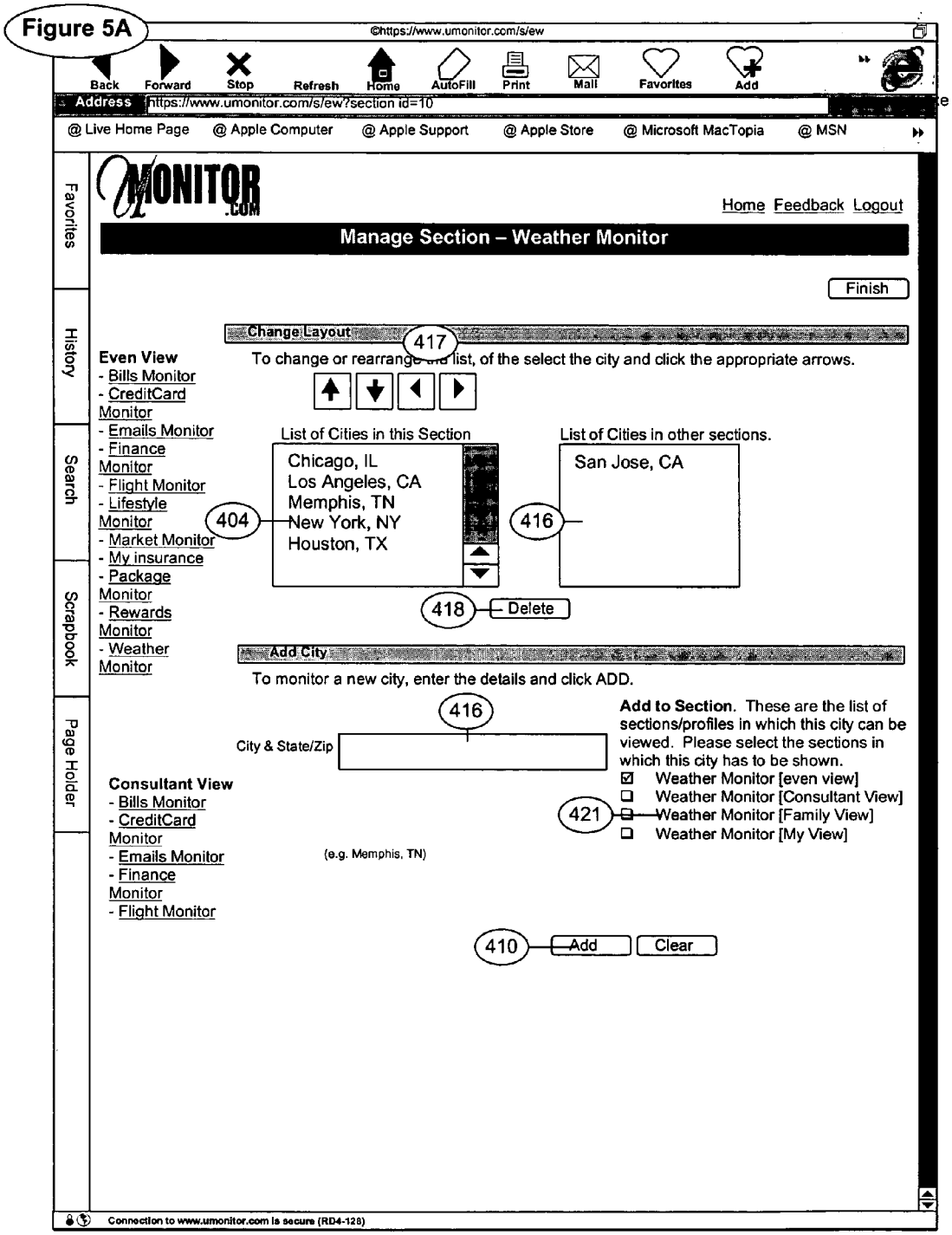

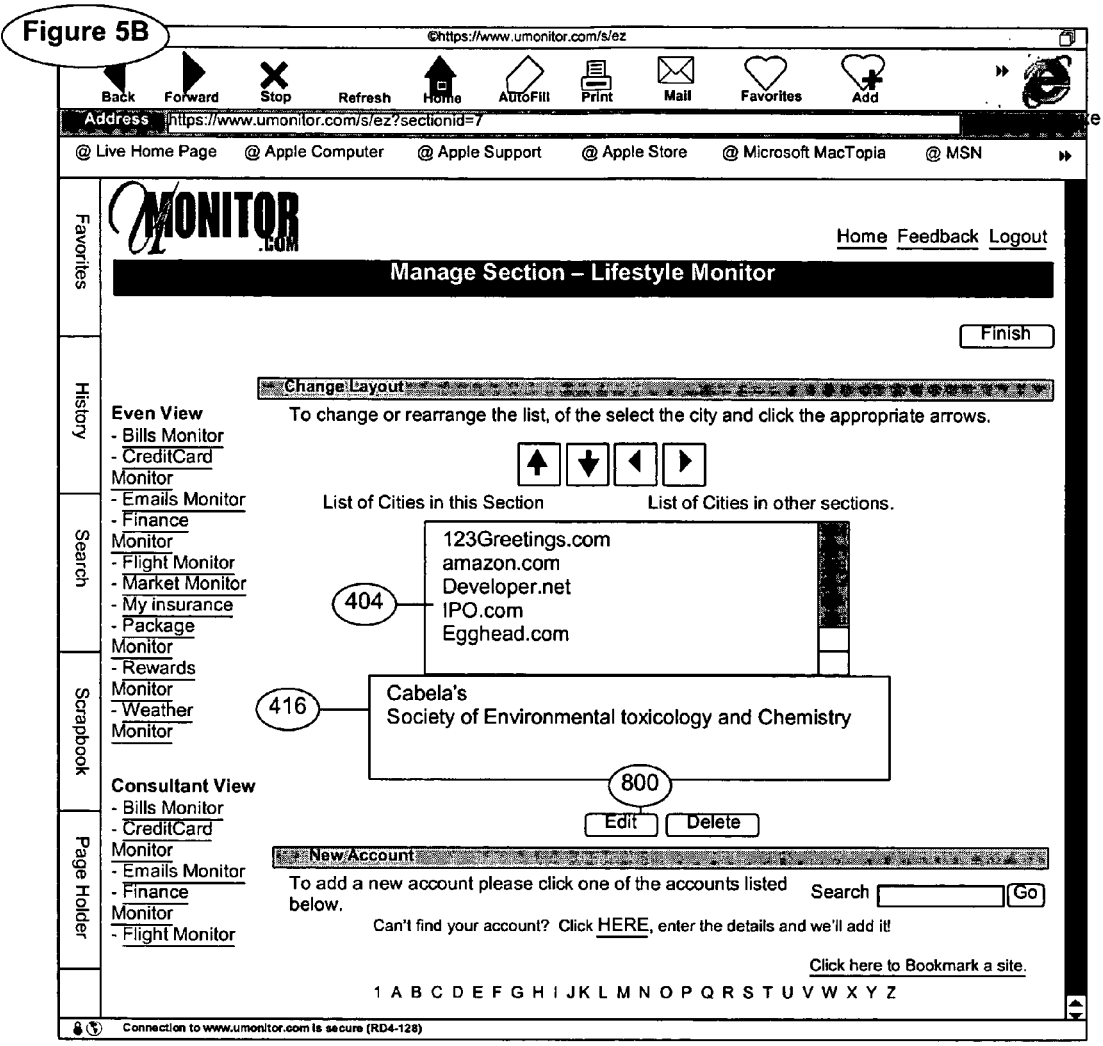

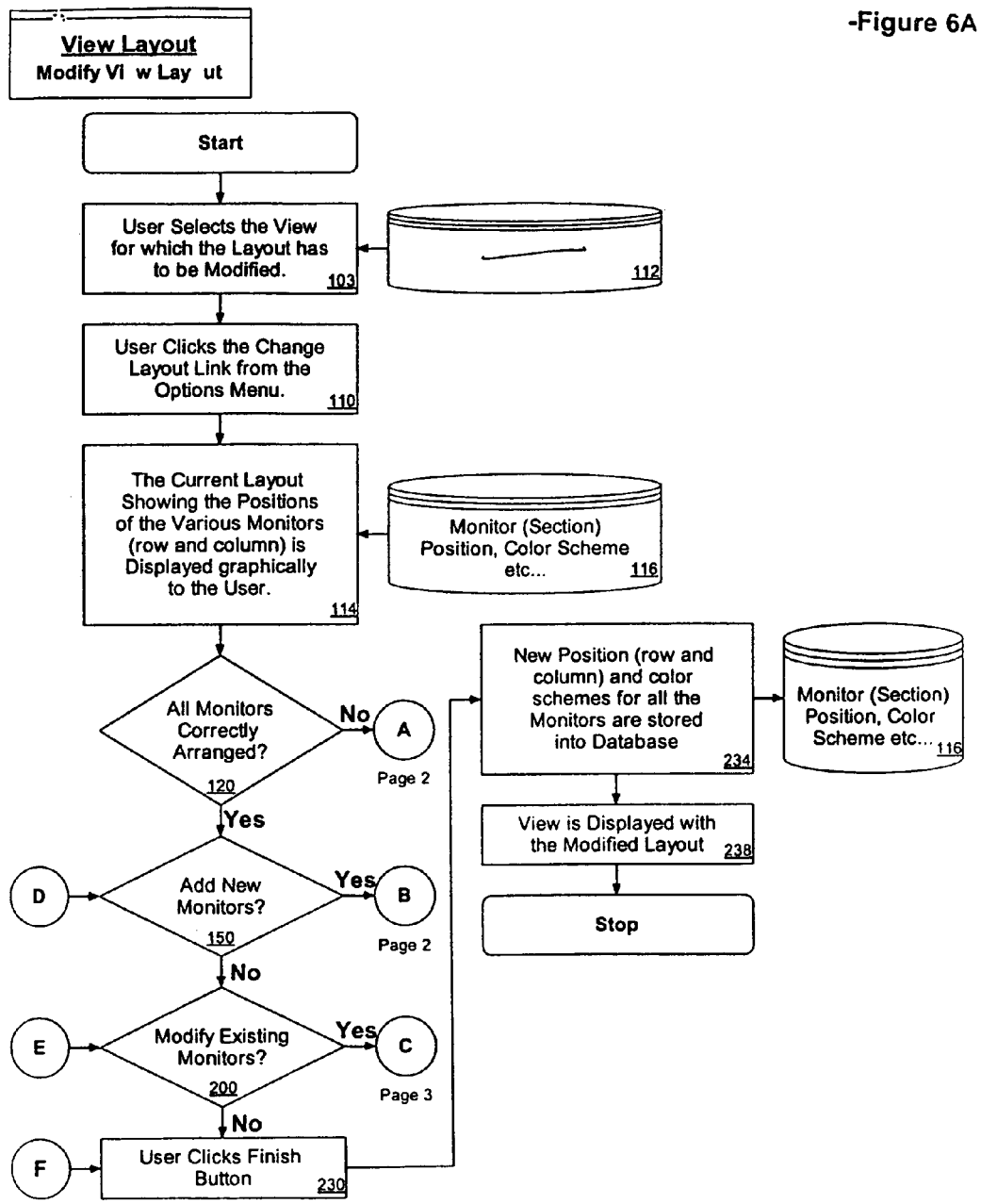
-Figure 6A

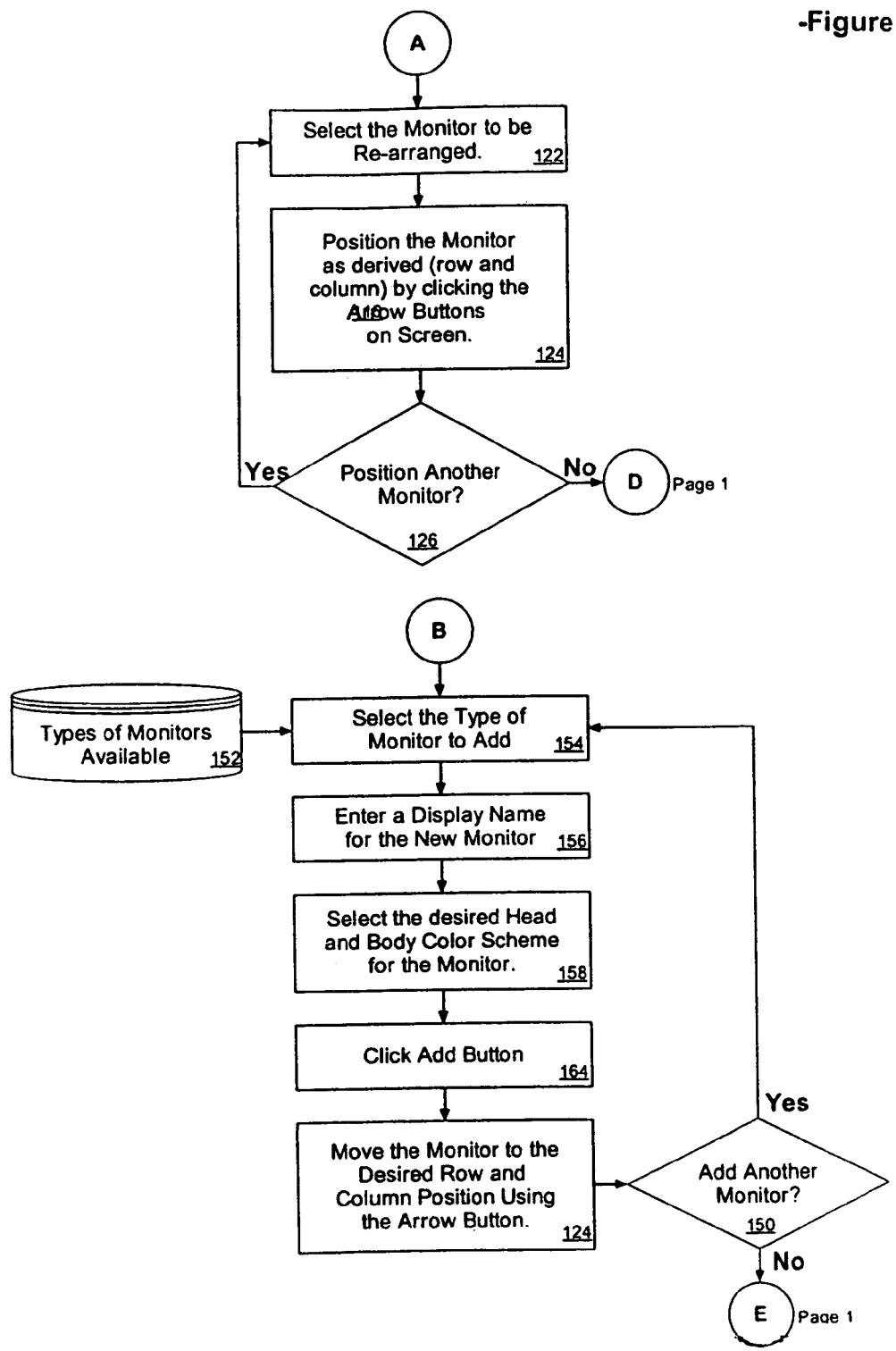
-Figure 6B

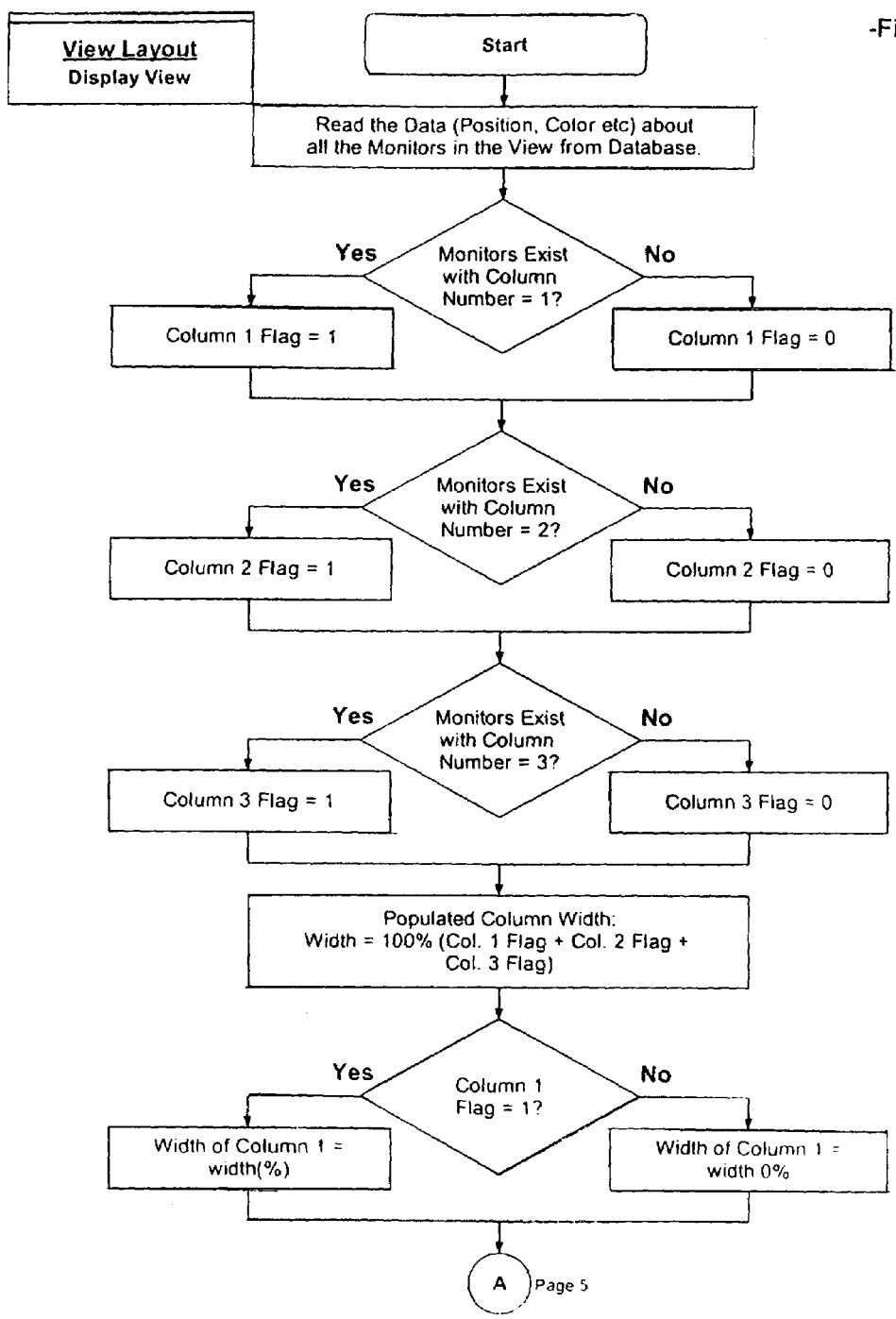
-Figure 7A

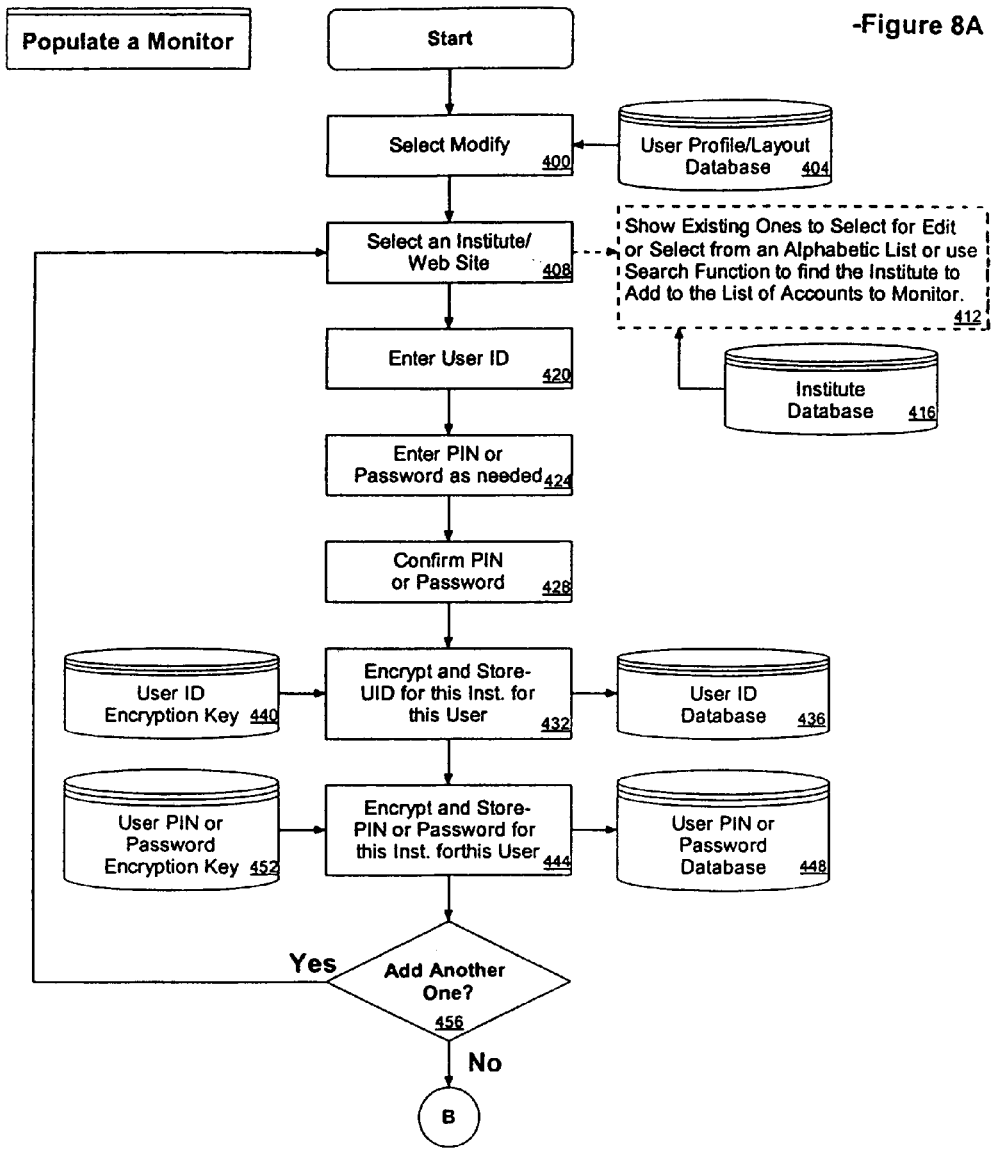
-Figure 8A

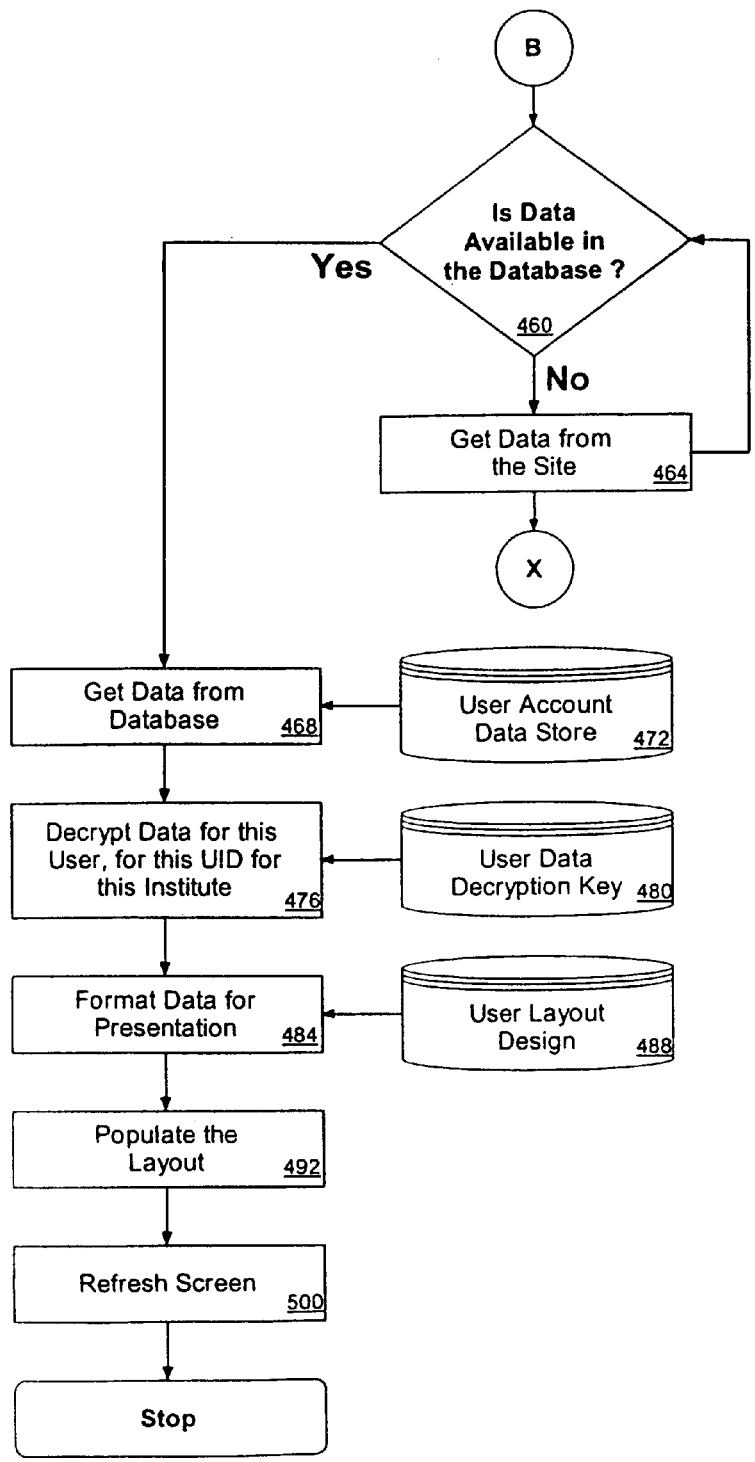
-Figure 8B

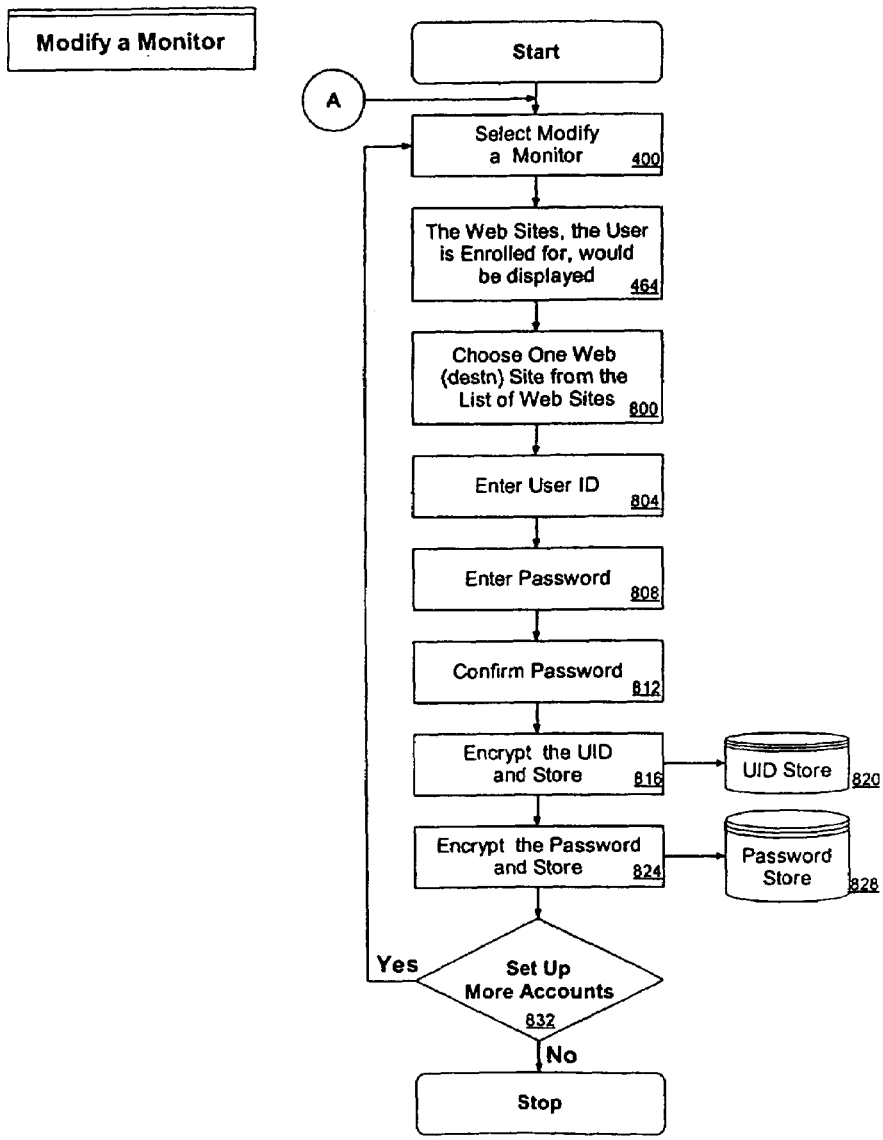
-Figure 9

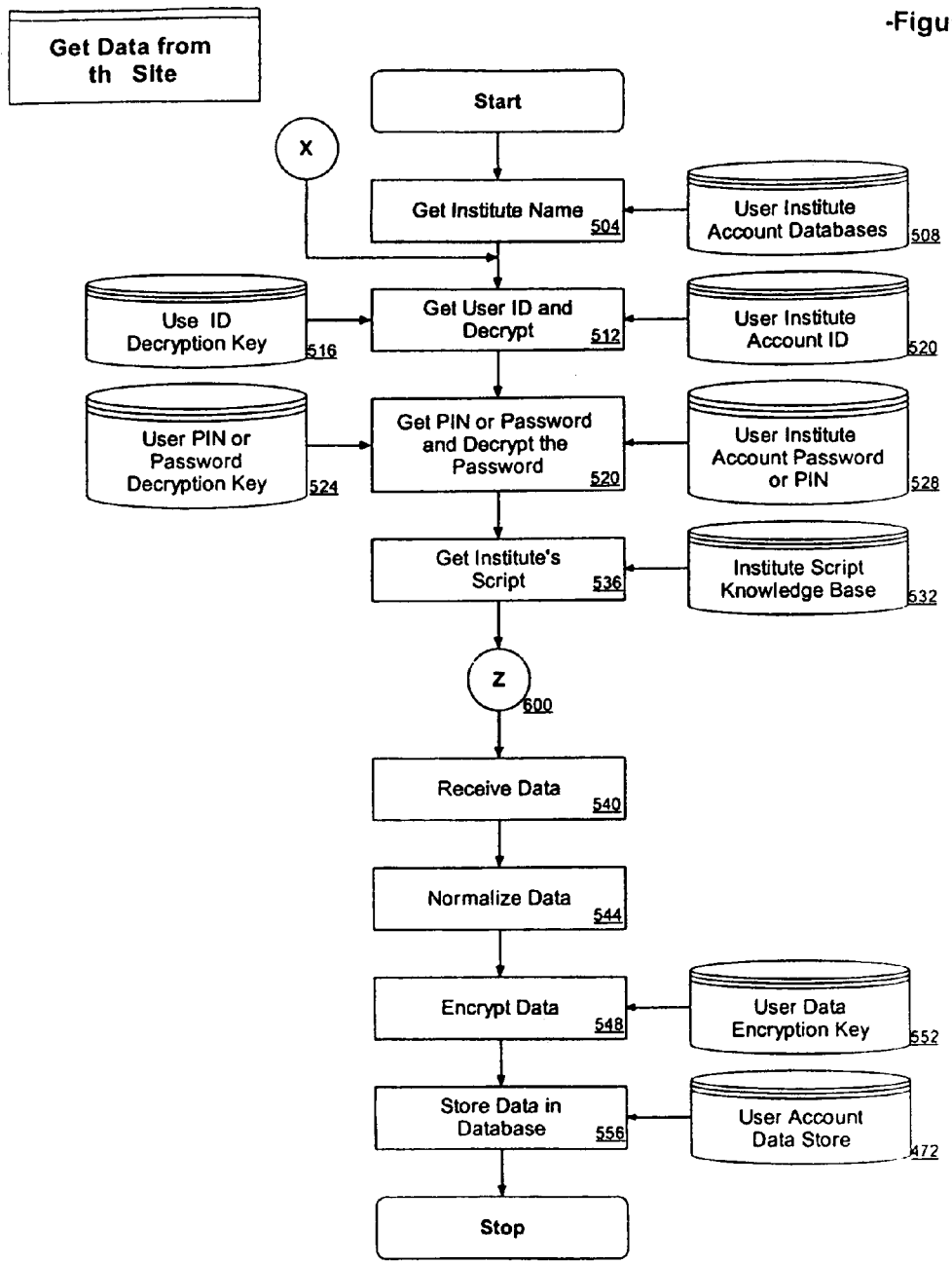
-Figure 10A

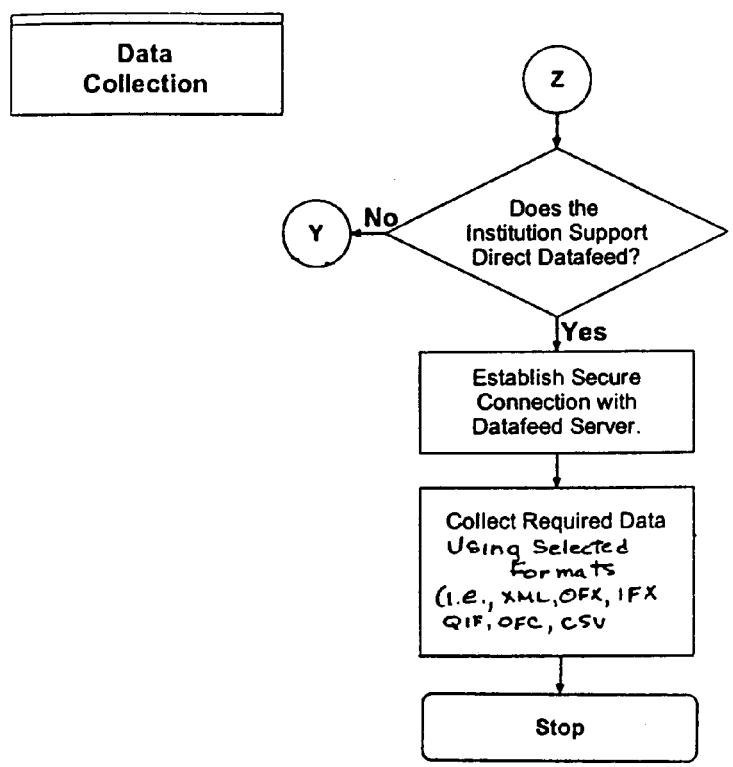
-Figure 10B

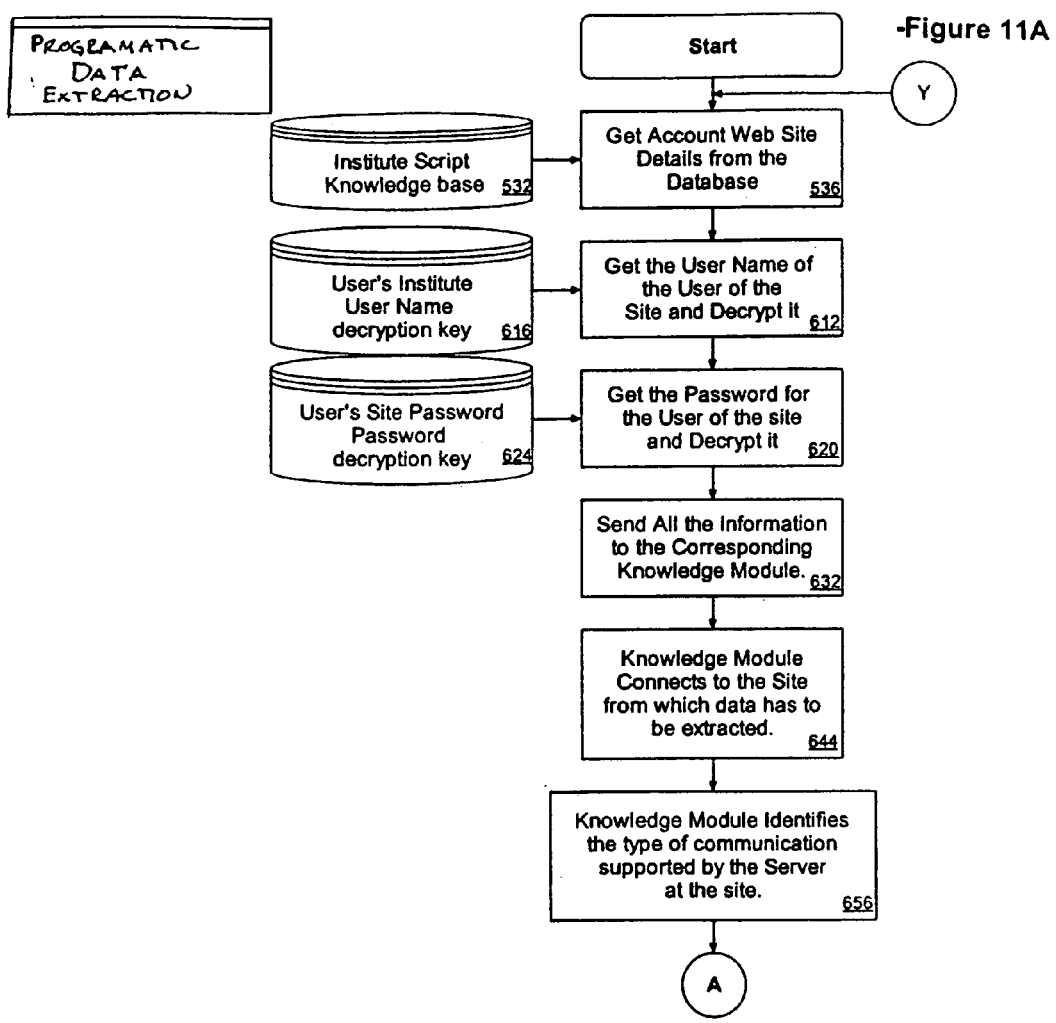

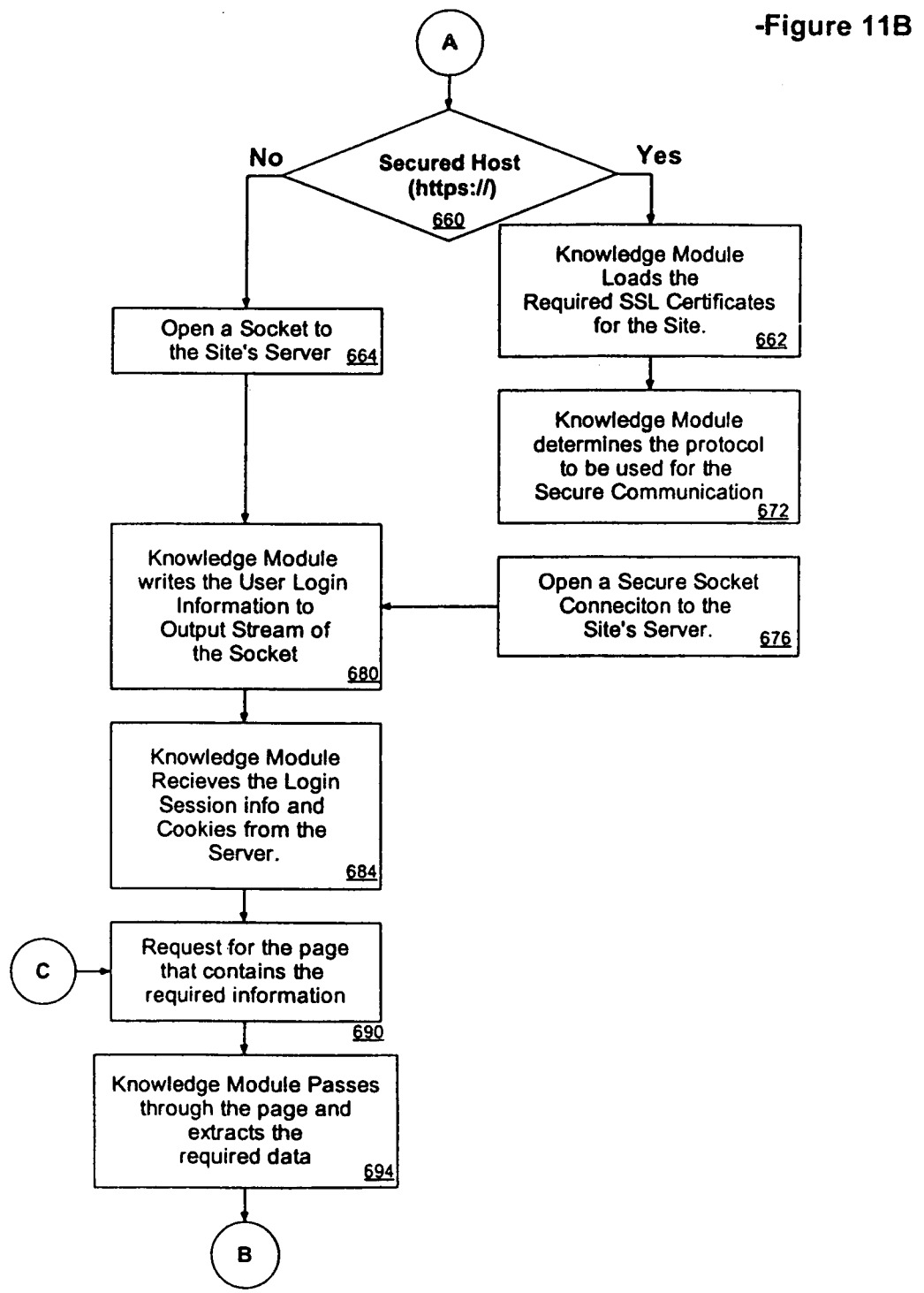
-Figure 11B

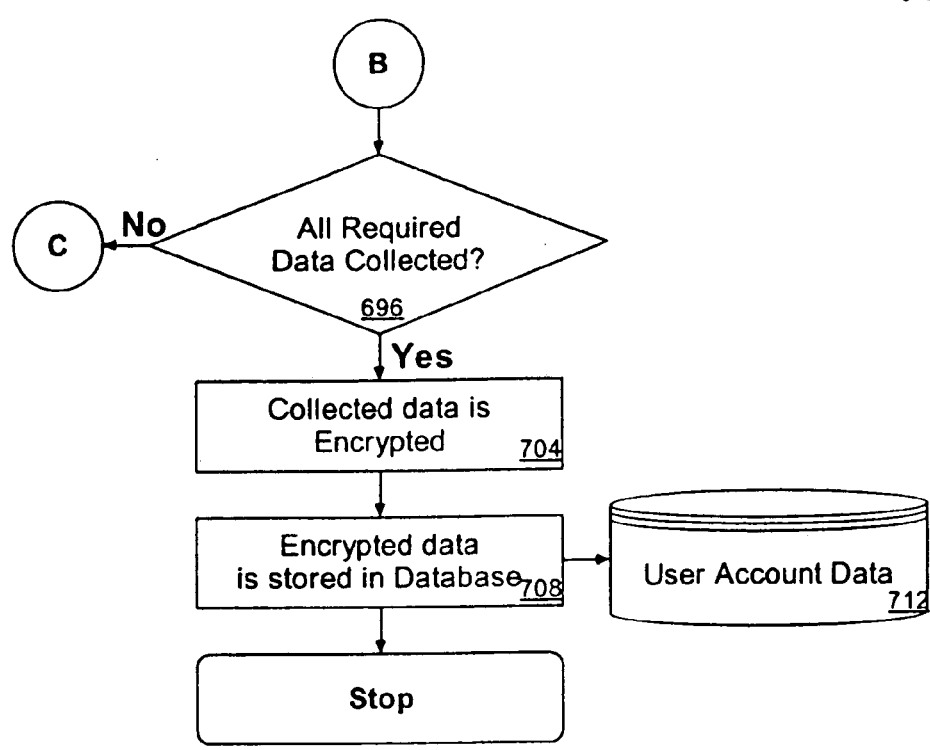
-Figure 11C

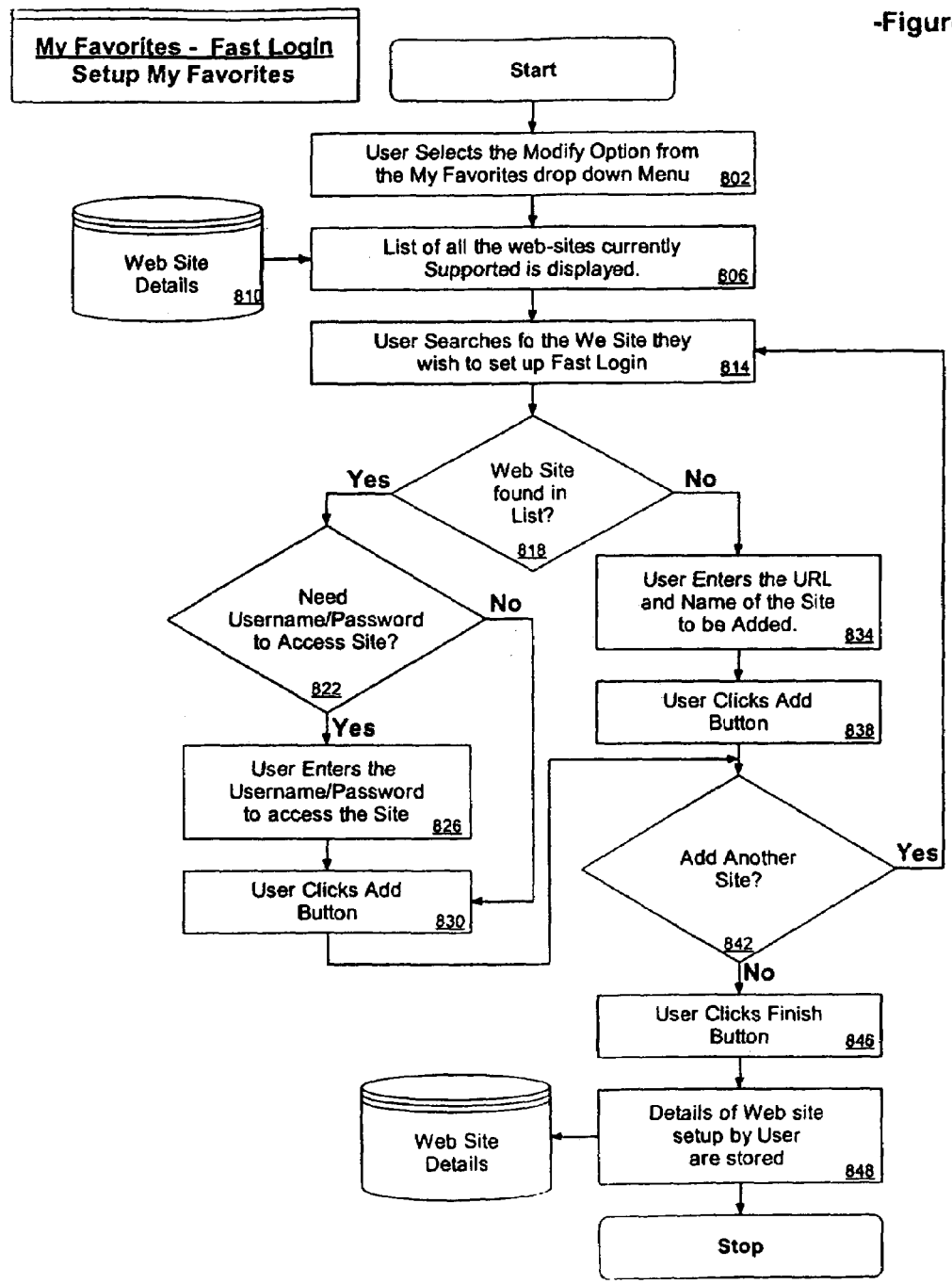
-Figure 12A

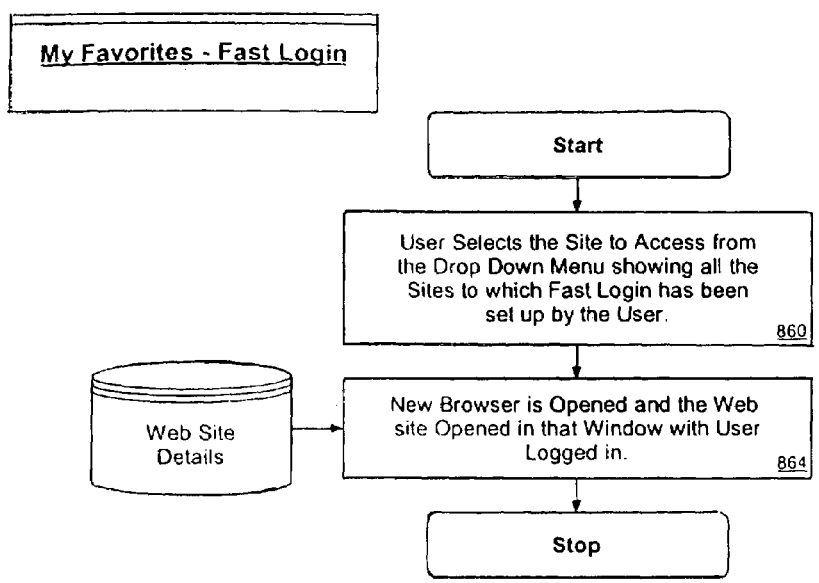
-Figure 12B

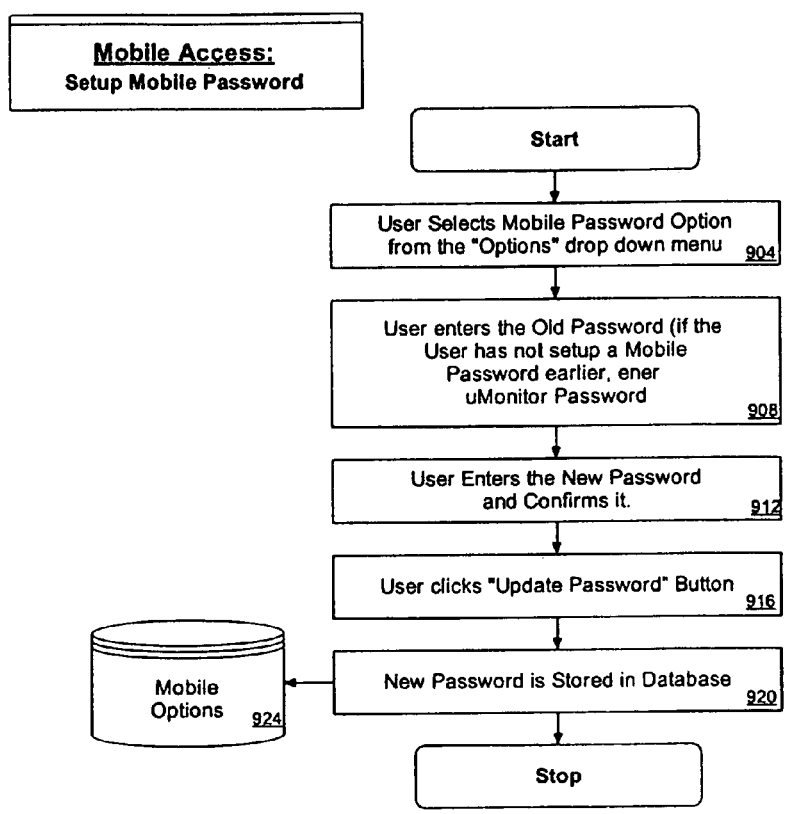
-Figure 13A

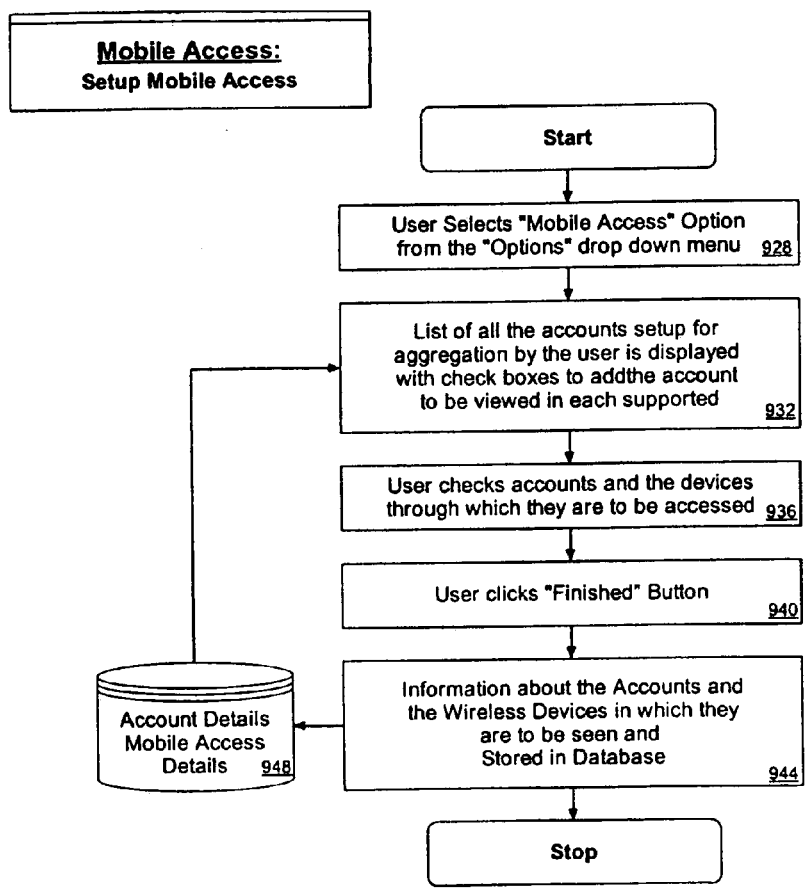
-Figure 13B

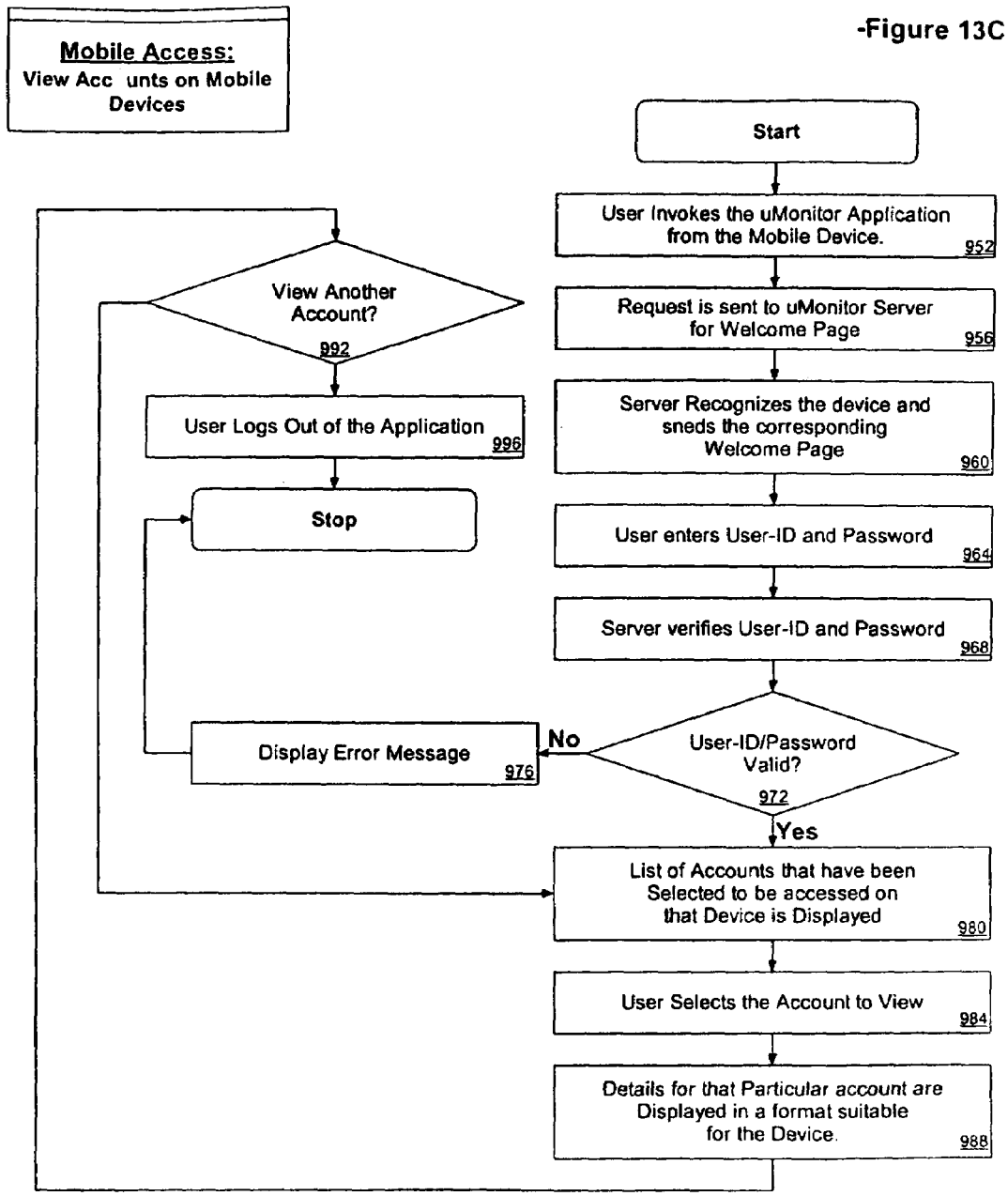

SECURE SELECTIVE SHARING OF ACCOUNT INFORMATION ON AN INTERNET INFORMATION AGGREGATION SYSTEM

CROSS-REFERENCE TO RELATED APPLICATIONS

This patent application relates to and claims priority from U.S. Provisional Patent Application No. 60/298,770, filed Jun. 15, 2001, which is pending and relates to application Ser. No. 09/943,801 filed Aug. 30, 2001 entitled "Internet Aggregation System Using Programmatic Data Extraction."

STATEMENT REGARDING FEDERALLY SPONSORED RESEARCH OR DEVELOPMENT

Not Applicable

FIELD OF THE INVENTION

The present invention relates to information aggregation systems, and more particularly to methods of aggregating secure information and presenting aggregated Internet account information on a computer screen or a wireless device in a format that is easy to read and that can be readily modified to meet the needs and interests of individual users of the system. The present invention also relates to Internet systems providing secure access to information from various sources and sharing of personal information securely between its users.

BACKGROUND OF THE INVENTION

In the past year or so, a small number of Internet service providers have begun to provide certain information aggregation services. In the Internet context, information aggregation refers to the process of gathering data and other information from selected web sites and displaying the data on users' personal computers (PC's) and wireless devices. Although the development of Internet information aggregation systems is still in its infancy, the number of service providers offering information aggregation services is beginning to grow.

A successful information aggregation system must overcome a number of difficulties associated with operating in an Internet environment. Such difficulties include: accessing and retrieving data from a variety of diverse web-sites; accessing and retrieving secure data from a variety of secure web-sites; updating data on a timely basis; displaying data in a useful and user friendly format; maintaining the confidentiality of client data through encryption and decryption; organizing and maintaining large amounts of data; accurately and rapidly retrieving stored data; and updating and maintaining user account information.

A key feature of information aggregation systems is the ability to carry out Programmatic Data Extraction ("PDE"). In the context of Internet information aggregation systems, PDE refers to a process by which a host information aggregation server mimics the login characteristics of a client and, once logged onto an institute or web site, picks up needed information from the institute or web site. In essence, the host server makes institutes/web-sites believe that the host server is the client, thus enabling the host server to retrieve the client's secure data. The host server can then display the secure data for the user in the host server's information aggregation system.

Existing Internet information aggregation systems do not provide a function that permits online interactive sharing of financial and non-financial account information (emails, rewards etc.) as well as other personal information (like personal profile, medical records etc.) among users of the system. On existing systems, a user located in one location who has aggregated certain information ("grantor") is unable to assign the right to other users ("grantees") to view his or her personal information on grantee's computer. Likewise, a grantee located in one location is unable to view the grantor's information on his or her computer. The ability to selectively and easily share online aggregated personal information securely would significantly expand the uses and functionality of Internet information aggregations systems. However, in order to preserve the security of account information, the account sharing system must implement sufficient security measures. For example, grantors and grantees should not be required to disclose their login IDs and passwords to one another in order to share account information. The information should not be emailed or sent out unsecurely to each other. Additionally, the account sharing system should preferably be easy to use. For example, a grantor should be able to readily assign or revoke sharing privileges to his or her grantees. The grantor and grantees should also preferably be able to access shared information through various media like the Internet, mobile phones, PDA and other wireless handheld devices.

Internet based email and other messaging services, which allow users to exchange messages in real time, have become very common. E.g. MSN Messenger, AOL Instant Messenger. But these messages are not secure and can be easily intercepted by third parties, without the sender and recipient being aware of the interception. The availability of a messaging system that can be used to exchange messages securely between two or more users can resolve this problem. Through the new mechanism described herein, users will be able to send messages securely to selected recipients.

Multi-column layouts for displaying information and data have been around for many years. For example, newspapers typically use a three-column layout. Multi-column layouts are also used in data tables and in accounting systems. Web pages of Internet web sites frequently employ multi column layouts in a fixed format. See e.g. www.cnn.com. However, up to now, such web sites have not provided a simple means for altering the location and appearance of the information contained in the three-column layout to each user. Additionally, no one other than applicant has employed a multi column (e.g. three column) display layout in an Internet information aggregation system (for an example of applicant's three column layout. See FIG. 2 or visit www.umonitor.com). Applicant's system allows users to design various views with multi column layouts to create sets of information that can be shared with other users.

The applicant is a leading developer of information aggregation software, and has pioneered many of the innovations that are presently appearing on the Internet information aggregation market. The inventors have identified various problems associated with information aggregation systems, and have invented a system that is easy to read, use, and modify. There is thus a need for an information aggregation system having the following described characteristics and advantages over the prior art.

OBJECTS AND SUMMARY OF THE INVENTION

It is an object of the invention to provide an Internet information aggregation system that allows selective sharing of account information among users of the system.

It is another object of the invention to provide an Internet information aggregation system in which a user located in one location is able to view the personal information of other users on his or her computer or wireless devices.

It is another object of the invention to provide an Internet information aggregation system in which a user located in one location can selectively assign and revoke the right to other users to view his or her personal information.

It is another object of the invention to provide an Internet information aggregation system that allows selective sharing of account information among users of the system while providing security features that preserve the security and confidentiality of users' personal information.

It is yet another object of the invention to facilitate and promote selective sharing of account information among users of an Internet information aggregation system by providing an account sharing function that is easy to use.

It is still another object of the invention to provide an account sharing function for an Internet information aggregation system that allows a user to select multiple levels of access when assigning sharing privileges to other users. This feature allows users to perform different functions on shared information.

It is also an object of the invention to provide a secure mechanism for the users sharing each other's information to securely communicate with each other using secure messages.

These and other objects and advantages of the invention shall become apparent from the following general and preferred description of the invention.

Accordingly, a computerized method of providing and allowing secure selective sharing of account information between users of an Internet information aggregation system is provided comprising the following. A grantor user creates one or more view pages, each of the view pages having a plurality of monitors therein. A unique visitation access code is assigned to each of a plurality of grantee users of the Internet information aggregation system. The grantor selectively obtains the visitation access codes from one or more of the grantees, and uses the visitation access codes to selectively grant visitation access to one or more of the grantor's view pages to one or more of the grantees. The grantor may also selectively revoke visitation access privileges to one or more of the grantees. The grantor's view pages preferably include a public view that displays non-sensitive information, a private view that displays sensitive information, and an advisor view that displays selected account information pertaining to obtaining advice from an advisor, such as a financial, health, or travel advisor.

Using the visitation access codes to selectively grant visitation access to one or more of the grantor's view pages to one or more of the grantees preferably comprises the following. The system receives input from the grantor for granting visitation access, and then verifies that the grantor is authorized to grant visitation access. If the grantor is authorized to grant visitation access, the system presents a graphical user interface for granting visitation access. The system receives input from the grantor for a visitation access code of a selected grantee, and then determines whether the grantor entered a correct visitation access code. If the grantor entered a correct visitation access code, the system displays a list of the grantor's available view pages. The system then receives input from the grantor for selectively granting access to one or more of the grantor's view pages to the selected grantee. The grantor, in selectively granting access to one or more of the grantor's view pages, preferably can selectively assign one of three levels of access for each the view page for which access is granted. The three levels are: Read Access, Refresh Access, and Full Access.

When a grantee logs onto the Internet information aggregation system via a processor, such as a computer or a mobile device, the system displays one of the grantee's view pages on a display of the grantee's processor. The display includes an option for selectively viewing view pages of grantors who have granted visitation access to the grantee. When the grantee user selects one of the grantors' view pages, the system displays the selected grantor's view page on the grantee user's display. In displaying the selected grantor's view page on the grantee user's display, the system preferably retrieves the selected grantor's view from a visitation access view store database, retrieves the grantor's decryption and encryption keys from a grantor decryption and encryption keys database, retrieves the grantee's decryption and encryption keys from a reviewer decryption and encryption keys database, and retrieves the grantor's visitation access permissions from a grantor permissions database. The system then utilizes the grantor's decryption and encryption keys, the grantee user's decryption and encryption keys, and the grantor's visitation access permissions to display the selected grantor's view page on the grantee user's display.

The system determines whether the grantee has been granted a right to Read Access, Refresh Access, or Full Access, and limits the grantee's use of the selected grantor's view page to the granted right of access. In determining whether the grantee has been granted Read Access, Refresh Access, or Full Access, the system preferably first determines whether the grantee user has been granted Read Access. If the grantee has been granted Read Access, the system retrieves the selected grantor's view page, displays the selected grantor's view page on the grantee's display, and permits the grantee user to view the view page in a read-only mode. If the grantee has not been limited only to Read Access, the system then determines whether the grantee has been granted Refresh Access. If the grantee has been granted Refresh Access, the system retrieves the selected host user's view page, displays the selected grantor's view on the grantee's display, and enables the grantee user to selectively refresh selected information on the selected grantor's view page. However, if the grantee has not been limited only to Read Access or Refresh Access, the system retrieves the selected grantor's view page, displays the selected grantor's view on the grantee's display, enables the grantee user to selectively refresh selected information on the selected grantor's view page, and further enables the grantee user to carry out functions on the grantor's view page as though the grantee user were the grantor. For example, the grantee can carry out transactions, log in to selected web-sites, and modify the grantor's account information as though the grantee were the grantor.

BRIEF DESCRIPTION OF THE DRAWINGS

FIG. 2 is a preferred embodiment of a graphical user interface of a view page of the information aggregation system of the invention.

FIG. 3 is a preferred embodiment of a graphical user interface of an add view page of the information aggregation system of the invention.

FIGS. 6A–6C are a flow chart of one preferred embodiment of a routine for changing a layout of an information aggregation program.

FIGS. 7A–7B are a flow chart of a preferred embodiment of a routine for displaying a view page in a three-column layout.

FIGS. 8A–8B are a flow chart of one preferred embodiment of a routine for populating a monitor.

FIG. 9 is a flow chart of one preferred embodiment of a routine for modifying passwords.

FIG. 10 is a flow chart of one preferred embodiment of a routine for getting data from a web-site.

FIGS. 11A–11C are a flow chart of one preferred embodiment of a routine for PDE.

FIGS. 12A–12B are a flow chart of one preferred embodiment of a routine for a fast access or auto-login feature of the invention.

FIGS. 13A–13C are a flow chart of one preferred embodiment of a routine for providing access to the system through mobile devices such as phones, pagers and the like.

FIG. 15B is a flow chart of a preferred embodiment of a routine for creating and changing view pages for use in selective sharing of personal information among users of an Internet information aggregation system.

FIG. 15C is a flow chart of a preferred embodiment of a routine for granting visitation access to users in a system for selective sharing of personal information among users of an Internet information aggregation system.

FIG. 15D is a flow chart of a preferred embodiment of a routine for revoking access to users in a system for selective sharing of personal information among users of an Internet information aggregation system.

FIG. 15E is a flow chart of a preferred embodiment of a routine for reviewing views in a system for selective sharing of personal information among users of an Internet information aggregation system.

PREFERRED EMBODIMENTS OF THE INVENTION

In the following detailed description of the preferred embodiments, reference is made to the accompanying drawings, which form a part hereof, and in which are shown by way of illustration specific embodiments in which the invention may be practiced. It is to be understood that other embodiments may be utilized and structural changes may be made without departing from the scope of the present invention.

The present invention is directed to the embodiments shown in FIGS. 14 and 15 and described in Section L below. The invention is used in an account aggregation system, such as the preferred account aggregation system shown in FIGS. 1–13 and described in sections A–K below.

A. System Overview

Figure 1:
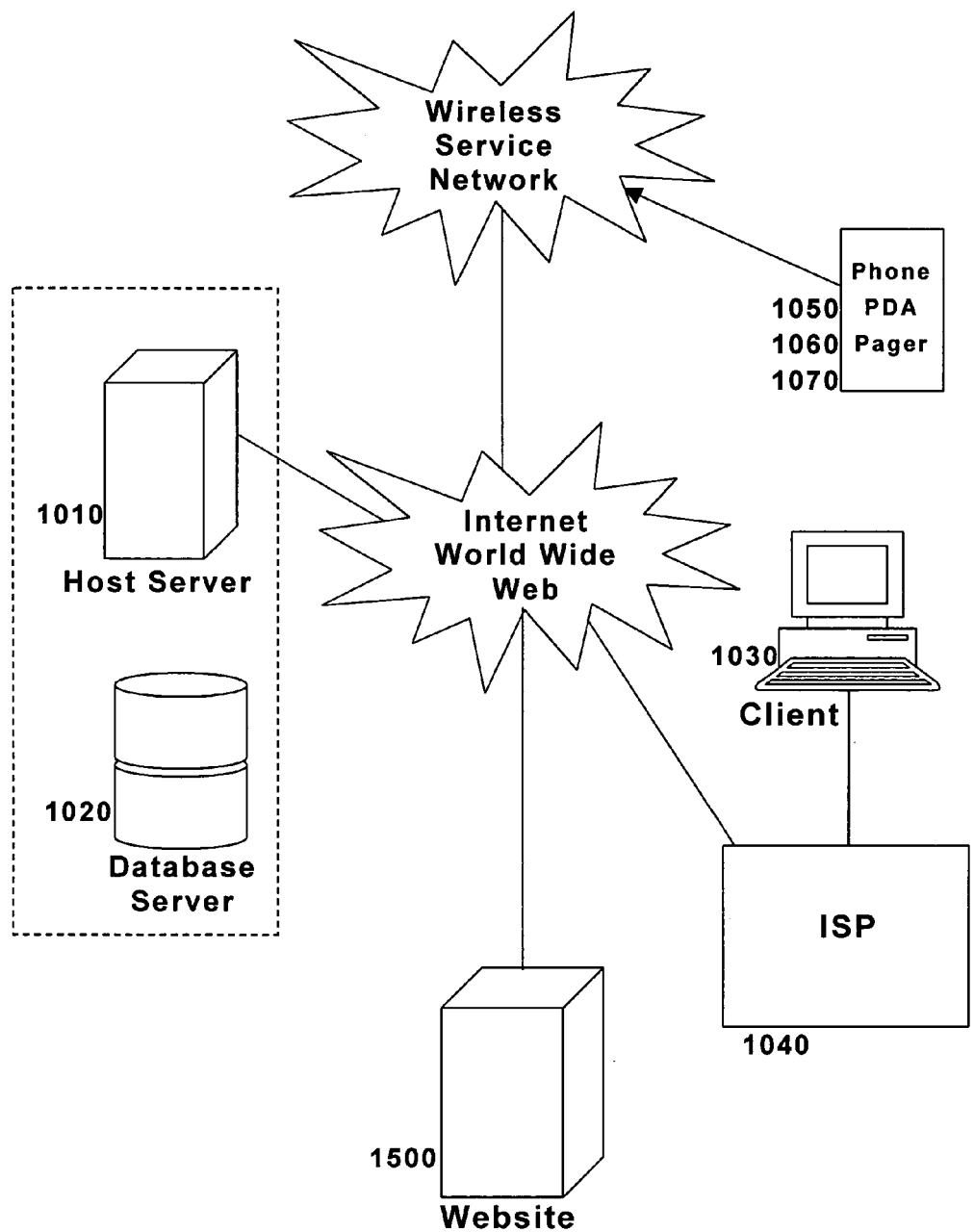
FIG. 1 is a block diagram showing an overview of an Internet based system that incorporates the information aggregation system of the invention.

As shown in FIG. 1, the invention is used on conventional Internet web-site platforms. All functions of the system are performed from a web interface where a user or client comes to the information aggregation system of the invention site using a browser like Internet Explorer 5.0 or Navigator 4.x. A computer, such as a personal computer (PC) or mainframe, serves as the host server 1010. The host server 1010 is programmed to carry out the functions described in further detail below. A database server 1020 is associated with the host server 1010. The host server 1010 is connected to the Internet via a means known in the art such as through a modem to a telephone or ISDN line. A user or client 1030 logs onto the host server 1010 via the Internet, typically through a conventional Internet service provider (ISP) 1040. The user logs onto the host server 1010 using a user identification number ("user ID") and a password, using a secure network connection. Once the user is logged onto the host server 1010, the user can view and process aggregated account information in the manner described below. The inventive program routines described below provide the user with numerous options for customizing the layout and functionality of the information aggregation system. The user interfaces of the invention employ conventional point-and-click display and selection components, such as the type presently used on the Microsoft Windows and Macintosh operating systems. A user or client with a cell phone 1050, a pager 1060 or PDA 1070 logs on to the server through a wireless network using a user ID and password. The host server 1010 provides desired information in a format suitable to the client's mobile device (i.e. cell phone, pager, or PDA). Preferred embodiments of the information aggregation system of the invention can be viewed at www.umonitor.com.

B. User Interface

FIG. 2 shows a preferred embodiment of a "view" page 20 used in the information aggregation system of the invention. After the user successfully logs onto the host server 1010, view page 20 is displayed on the display monitor of the user's computer 1030. The view page 20 functions as a graphical user interface (GUI). The view page 20 allows the user to modify the information aggregation system by simply pointing and clicking on various options and pull-down menus, in the manner described below.

As shown in FIG. 2, the home page view 20 preferably has three columns 1, 2, 3. The preferred three column layout shown in FIG. 2 allows all or nearly all of the desired aggregated information to be displayed at one time on the screen of a conventional computer display screen or monitor 1030, minimizing or eliminating the necessity of scrolling left-right on the display screen, clicking on various links, or going to different pages. One or more monitors 10 are displayed in each of the columns 1, 2, 3. In FIG. 2, column 1 includes a finance monitor, a credit card monitor, and a bills monitor. Column 2 includes an e-mail monitor, a package monitor, a flight monitor, and a life style monitor. Column 3 includes a market monitor, a rewards monitor, and a weather monitor. As will be discussed in further detail below, the system allows the user to populate, format, move, add, and delete monitors and rearrange them as convenient. Although a three-column layout is preferred, any number of columns, from 1 to n, can be used in the system.

The three-column layout is displayed on the user's display 1030 using conventional computer graphics interfacing. However, the system of the invention allows each user great flexibility in modifying the view page 20 and in creating multiple view pages 20. The view page 20 can modified using simple and readily understood point and click functions, in the manner described below.

A user can access most of the software routines by selecting the "Options" feature 110 from the view page 20. When the user selects options 110, he or she will be presented with a pull-down menu. The pull-down menu preferably contains the following selections: Change Layout; Add/Delete Views; Change Password; Update Profile; Change Mobile Password; and Mobile Access. Each of these functions is described below.

The view selection icon 103 provides a pull-down menu containing a list of the user's various view pages 20. The user interface of the view page 20 also preferably includes a search box 60 for entering search queries and an adjacent pull-down menu of web search engines 62. The link box 64 preferably includes a pull down window of "My Favorites" for fast access to favorite sites.

The view page 20 and all other pages of the system are displayed on the user's browser (e.g. Netscape Navigator; Microsoft Internet Explorer) using a secure connection. While displaying the view page 20, the viewer can access the various functions provided by the browser, such as Forward, Back, Print, Favorites, and the like. The user can enter an address on the web address bar of the browser in order to surf the web, and can then return to the information aggregation system as desired. If the user leaves the information aggregation system during this process, the user will have to login again. For wireless devices such as cell phones, pagers, and PDAs, information is organized in a hierarchical one-column view to accommodate size limitations of display and difficulty in data entry for navigation from a small keypad or stylus. This optimized presentation gives more useful information with the least amount of user interaction.

C. Create View Page

The information aggregation system of the invention allows a user to readily create multiple view pages 20. A new view page 20 is created by selecting "Add/Delete Views" from the "Options" feature 110 of the view page 20. Upon selecting "Add/Delete Views," the user will be presented with a GUI such as the preferred embodiment shown in FIG. 3. When the user clicks on the "Create View" link 109 shown in FIG. 3, the software automatically creates a new view page 20. In a preferred embodiment, the software automatically populates the newly created view page 20 with each of the types of available monitors 10 (e.g. Finance Monitor, Bills Monitor, etc.), i.e. the software creates a default view page 20. The user can then populate, delete or add monitors 10 to the view page 20 in the manner described below. The user can delete an existing view page 20 by simply clicking on the delete link 111.

The user can create a plurality of view pages 20 using the above procedure, and can assign a different name to each view page (e.g. "My View," "My View 2"). The user's various views 20 are stored in and retrieved from database 112. When the user desires to switch to a different view, the user clicks on the view selection icon 103 in FIG. 2. Once a particular view page 20 has been selected using the view selection icon 103, the selected view page 20 can be modified by selecting Change Layout from the options pull-down menu 110, in the manner described below.

D. Modify View Page Layout

Figure 6C:
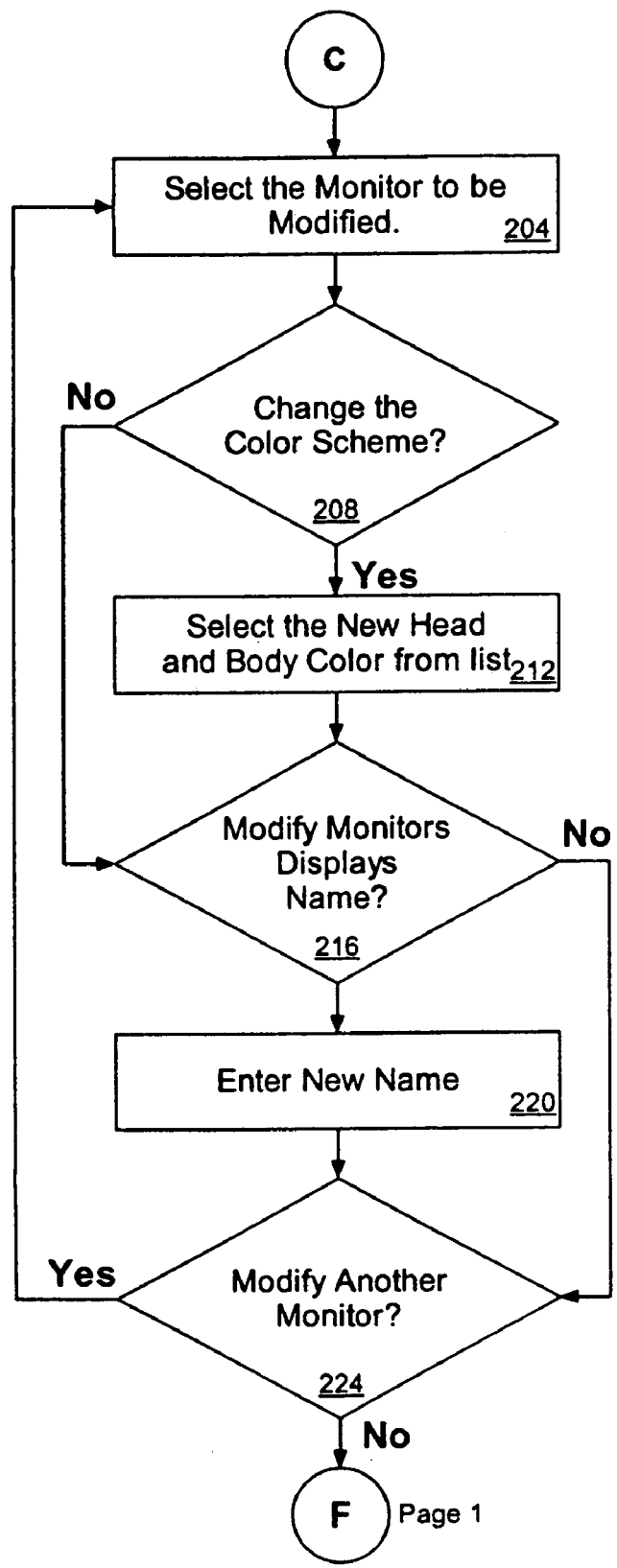

FIG. 6 is a high-level flow chart for one embodiment of a method which implements the change layout functions of the information aggregation system. When a user desires to modify a layout of a view page 20, the user first selects the desired view page 20 using link 103, in the manner described above. In order to modify the selected view page 20, the user accesses the process of FIG. 6 by selecting "Change Layout" from the "Options" link 110 of the view page 20. Alternatively, the user can access the routine of FIG. 6 by selecting the "Edit/Rename" link 110 from the "Create View" GUI shown in FIG. 3. After completing either of these procedures, the user will be presented with a GUI such as the preferred embodiment shown in FIG. 4.

1. Arrange Monitors

Monitors 10 may be arranged on the view page 20 by the process described in blocks 120–126 of FIG. 6. The GUI of FIG. 4 includes a three column chart 114 that lists all the monitors 10 in the sequence and position in which they appear on the view page 20. The software retrieves the existing characteristics of the monitors 20 (i.e. section, position, color scheme etc.) of the selected view page 20 from database 116.

Figure 4:
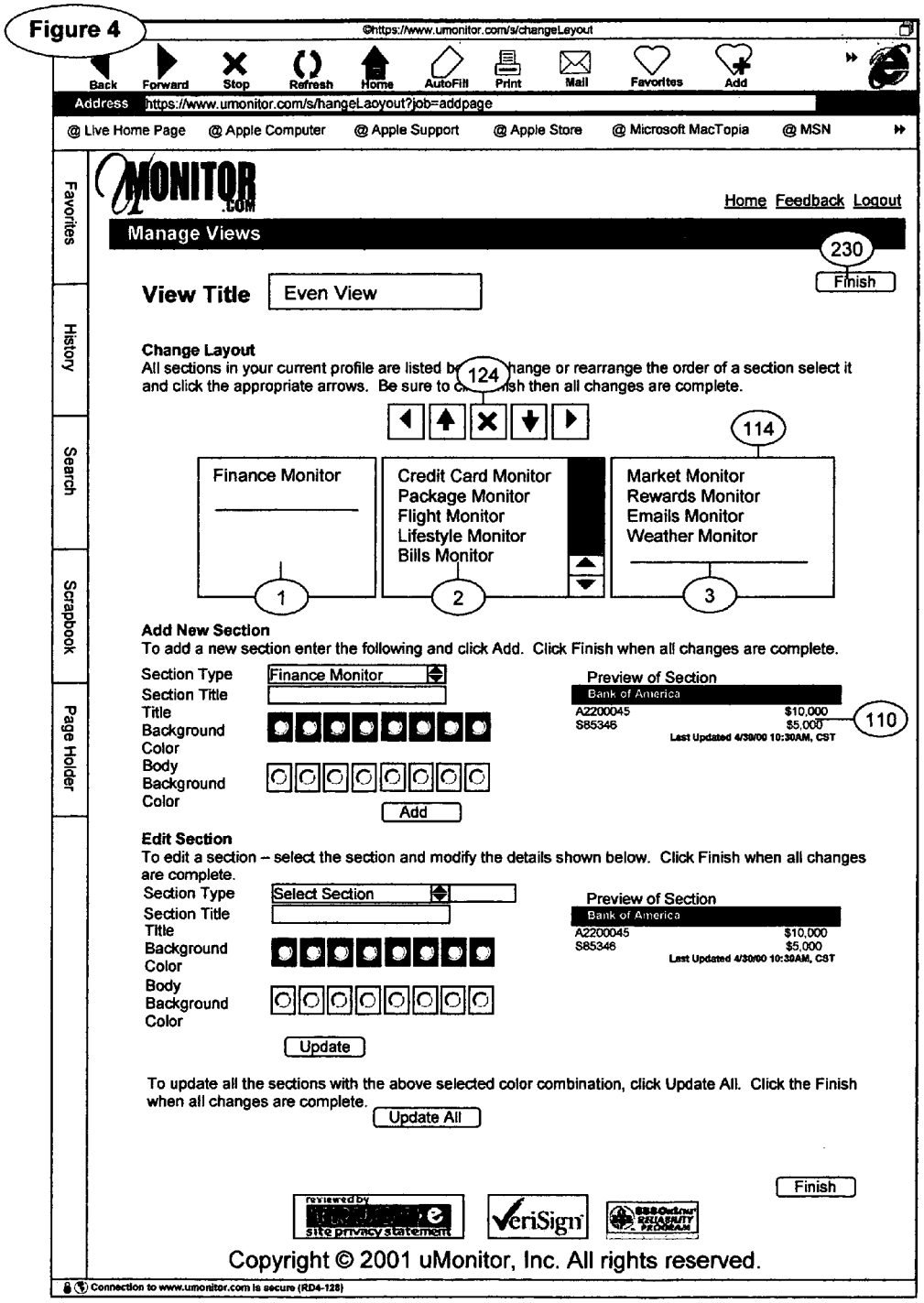
FIG. 4 is a preferred embodiment of a graphical user interface of a modify view page of the information aggregation system of the invention.

Referring to the flow chart of FIG. 6, the software receives input from a user at block 114 for selection of a monitor 10. In the GUI of FIG. 4, selection of the monitor 10 is accomplished by simply pointing to the name of the monitor 10 on chart 114 and then clicking the monitor 10; this step corresponds to block 122 of the flowchart of FIG. 6. In block 124, the software enables the user to move the monitor 10 to a desired location on the view page 20. Referring back to the GUI of FIG. 4, once a monitor 10 has been selected in the step of block 122, the user can move or delete the monitor 10 by using the selection bar 124. The selection bar 124 includes selections for left, up, delete, down, and right. By simply pointing and clicking on one of the selections on the selection bar 124, the user can move the selected monitor 10 on the view page 20. For example, if the user selected "Finance Monitor" from column 1 of chart 114 and then clicked once on the "right" button on selection bar 124, the Finance Monitor 10 would move from column 1 to column 2. If the user clicked the "right" button of the selection bar 124 a second time, the Finance Monitor 10 would move from column 2 to column 3. From column 3, the user could click the "left" button of the selection bar 124 to return the Finance Monitor 10 to column 2. If the user clicked the "down" button on selection bar 124, the Finance Monitor 10 would move one spot down on the column. Similarly, if the user clicked the "up" button on the selection bar 124, the Finance Monitor 10 would move one spot up the column. If the user clicked the delete button on selection bar 124, the Finance Monitor would be deleted from the view page 20.

As indicated in block 126, the user may repeat the foregoing process until the user is satisfied with the arrangement of the monitors 10 on view page 20. Once the user is satisfied with the selection and position of the various monitors 10 on the view page 20, the user can click the finish icon 230, which will return the user to the GUI shown in FIG. 2. Alternatively, the user may elect to add or modify additional monitors, in the manner described below.

2. Add New Monitors

New monitors 10 can be added to the view page by the process described in blocks 150–164 of the flowchart of FIG. 6. Upon receiving input from the user as to the type of monitor to add (block 154), the software retrieves the selected monitor from the types of monitors database 152. Turning to the preferred GUI shown in FIG. 4, link 154 provides a pull-down menu of types of monitors available (i.e. Finance Monitor, Credit Card Monitor, Bills Monitor, etc.). The software provides a name for the selected monitor (block 156). For example, if the user selects "Finance Monitor" from the pull-down menu 154 of FIG. 4, the words "Finance Monitor" appear in box 156 on the display screen. The user can then edit the name of the selected monitor by clicking on box 156 and typing in a desired name.

The user may also elect to change the color of the title background and the body background of the display of the monitor 10 (see block 158). Turning to the preferred GUI shown in FIG. 4, the "Title Background Color" box 158 and the "Body Background Color" box 160 allow a user to select the color of the display for each selected monitor 10 by simply clicking on one of an array of available colors. The GUI also preferably includes a "Preview of Section" box 158B, 160B, which changes colors in accordance with the selections made in boxes 158 and 160, respectively, so that the user obtains a preview of what the selected colors will look like on the view page 20.

Once the user is satisfied with the name and the color scheme of the new monitor 10, the user clicks on the "Add" button 164, at which point the software stores the parameters of the new monitor 10 in the monitor database 116. The user can move the new monitor 10 on the view page 20 by repeating the procedure of blocks 120–126. The user can add another new monitor by simply repeating the procedure of steps 150–164.

3. Modify Existing Monitors

Existing monitors 10 can be modified by the process described in blocks 200–224 of the flowchart of FIG. 6. Upon receiving input from the user as to the type of monitor to modify (block 204), the software retrieves the selected monitor from the monitors database 116. Turning to the preferred GUI shown in FIG. 4, link 204 provides a pull-down menu of the monitors 10 of the view page 20. The software retrieves the name of the selected monitor (block 212). For example, if the user selects "Finance Monitor" from the pull-down menu 204 of FIG. 4, the words "Finance Monitor" appear in box 216 on the display screen. The user can then edit the name of the selected monitor 10 by clicking on box 216 and typing in a desired name.

As shown in FIG. 6, the user may also elect to change the color of the title background and the body background of the display of the monitor 10 (see block 208), in a procedure similar to that described above with regard to adding a new monitor. Turning to the preferred GUI shown in FIG. 4, the "Title Background Color" box 208 and the "Body Background Color" box 210 allow a user to select the color of the display for each selected monitor 10 by simply clicking on one of an array of available colors. The GUI also preferably includes a "Preview of Section" box 158B, 160B, which changes colors in accordance with the selections made in boxes 208 and 210, respectively, so that the user obtains a preview of what the selected colors will look like on the view page 20.

Once the user is satisfied with the name and the color scheme of the edited monitor 10, the user clicks on the "Update" button 226 (see FIG. 4), at which point the software stores the parameters of the edited monitor 10 in the monitor database 116. The user can change all of the monitors to the selected color combination by clicking the "Update All" button 227. The user can move the edited monitor 10 on the view page 20 by repeating the procedure of blocks 120–126. The user can edit other monitors by simply repeating the procedure of steps 204–224.

Figure 7B:
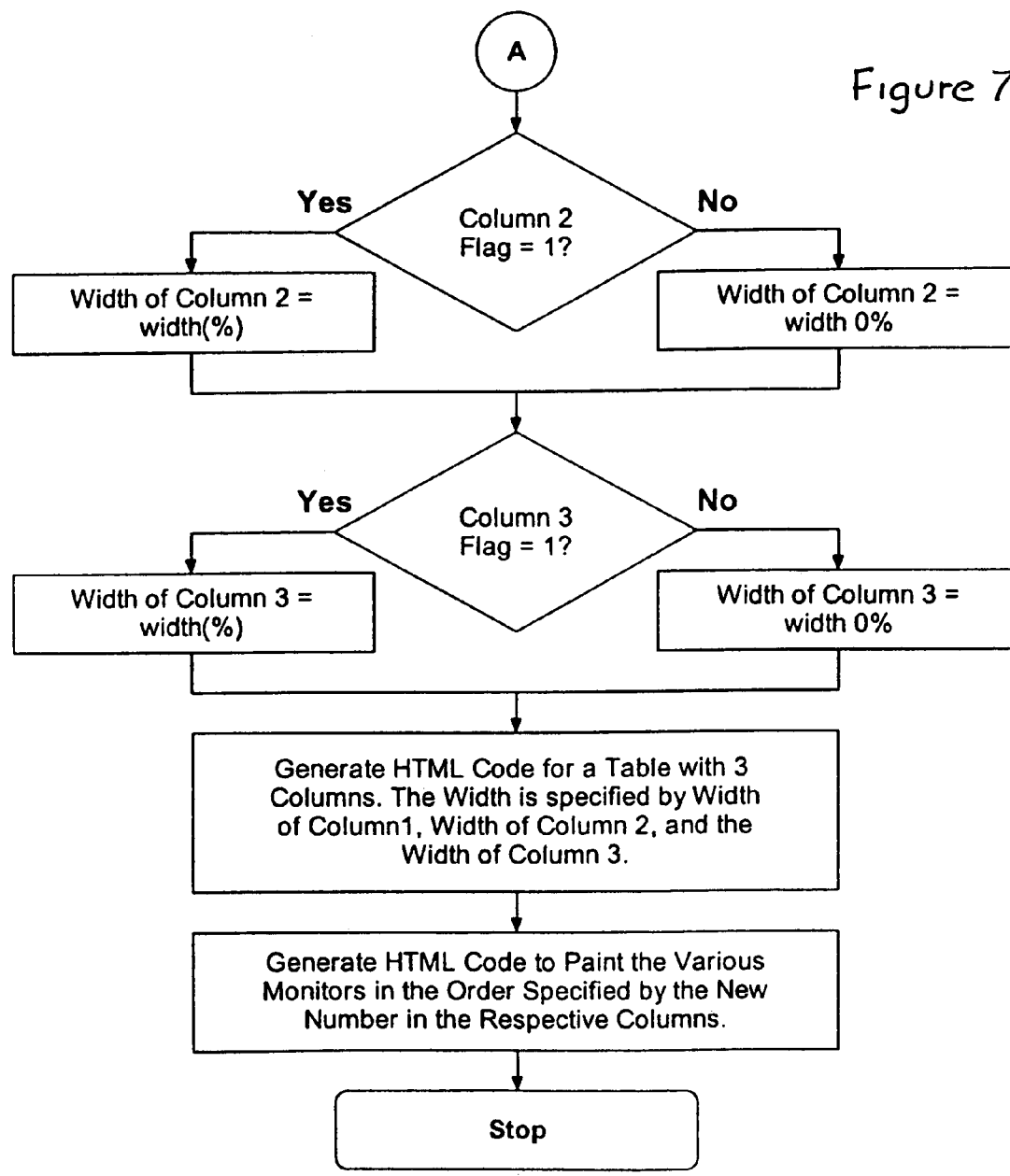

When the user is finished moving, adding, deleting, and editing monitors, the user clicks on the "Finish" button 230. As shown in the flow chart of FIG. 6, upon receiving the "finish" input 230, the software updates the parameters of the monitors 10 of the view page 20 and stores them in the monitor database 116. The software then displays the finished view page 20 on the display 1030 (see block 238). FIG. 7 provides a high level flow chart of a preferred embodiment of software for carrying out the display function of block 238 of FIG. 6A. The software routine shown in FIG. 7 calculates the width of the columns 1, 2, and 3. The software routine also preferably eliminates any column that does not contain at least one monitor 10, thus increasing the width of the remaining columns.

E. Populate Monitors

Once a view page 20 has been set up in accordance with the foregoing steps, the user populates each monitor 10 of the view page 20 by inserting links to selected web-sites onto the monitor 10. FIG. 8 is a flow chart of one preferred embodiment of a routine for populating a monitor. As shown in FIG. 2, each monitor is provided with a "Modify" link 400. By clicking on the Modify button 400, the user initiates the software routine of FIG. 8.

Upon receiving input from a user at block 400 for selection of a monitor 10, the software retrieves data for the selected monitor 10 from database 404 (i.e. the institutes/web-sites that are already populating the monitor). Additionally, the software retrieves information on available institutes/web-sites for the selected monitor 10 from Institute Database 416. At block 412, the software displays the institutes/web-sites that are already populating the selected monitor 10, as well as the institutes/web-sites that the user can add to the selected monitor 10. FIGS. 5A–5J present preferred embodiments of GUI's for displaying the foregoing information.

Upon receiving input from a user at block 408 for selection of an institute/web-site, the software prompts the user to enter the user's ID (block 420) and PIN/password (block 424) for the selected institute/web-site. The user is also asked to verify the PIN/password (block 428). The software accesses a user ID encryption key from database 440, encrypts the user's ID for the selected institute/web-site 432, and stores the user's encrypted ID in database 436. Similarly, the software accesses a PIN/password encryption key from database 452, encrypts the user's PIN/password for the selected institute/web-site 456, and stores the user's PIN/password in database 448. If the user desires to populate the selected monitor 10 with additional institutes/web-sites, the software repeats the foregoing routine (see block 456).

Each category of monitor has different types of institutes/web-site links, and therefore different requirements for populating the monitor. For example, in order to populate a Finance Monitor, a Bills Monitor, or a Credit Card Monitor, the user's private ID number and password must be sent to the selected financial institution's web-site in order to obtain the user's account information. However, links to a Weather Monitor or a Market Monitor can be selected from a public access web-site, with no need for encryption of account information, user ID numbers, passwords and the like. For monitors that do not require password entry, the software routine of FIG. 8 can be modified to eliminate the steps of ID and password processing, encryption, decryption, and storage.

Figure 5C:
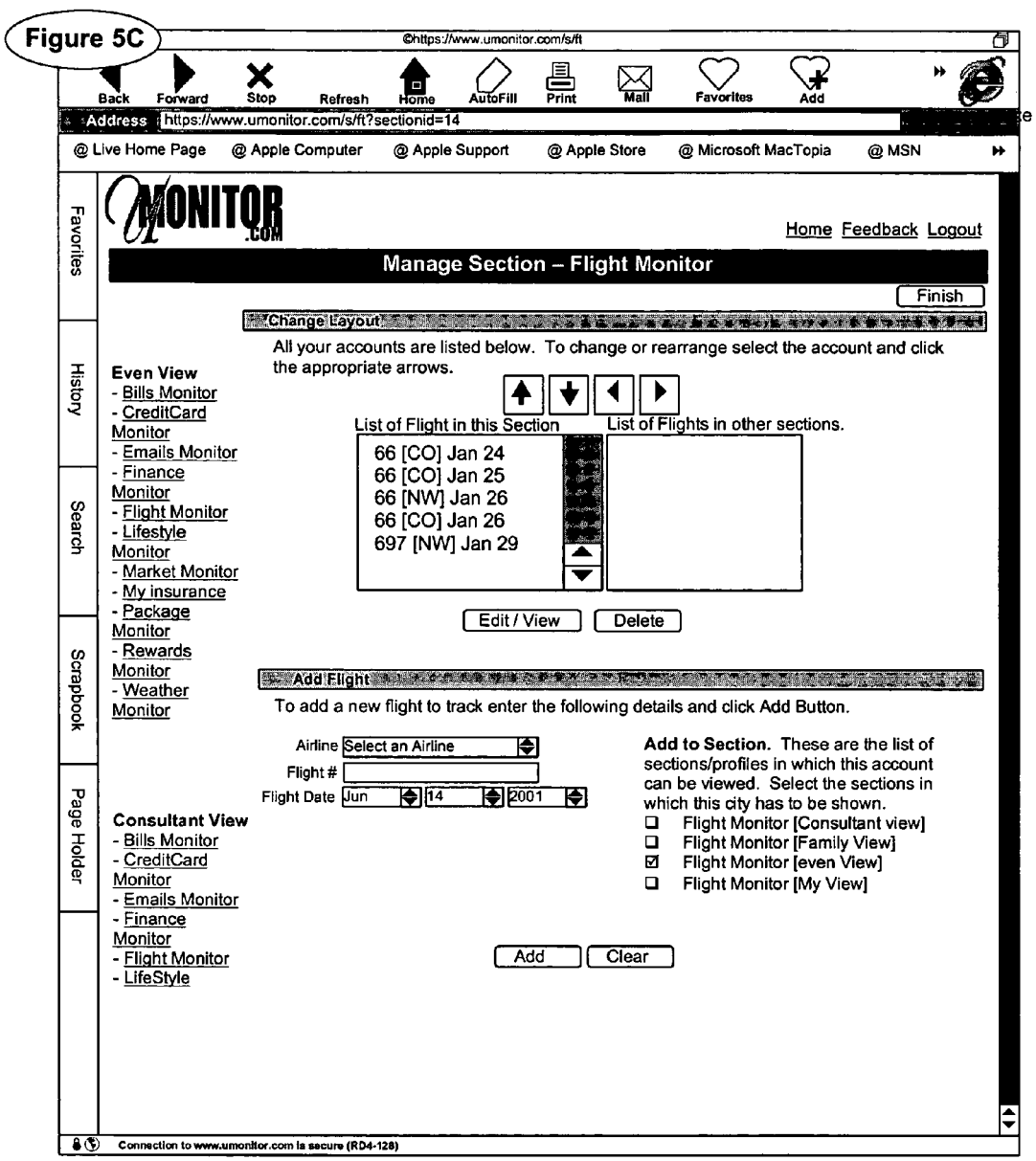
FIGS. 5A–5J are preferred embodiments of graphical user interfaces of pages for editing monitors.
Figure 5D:
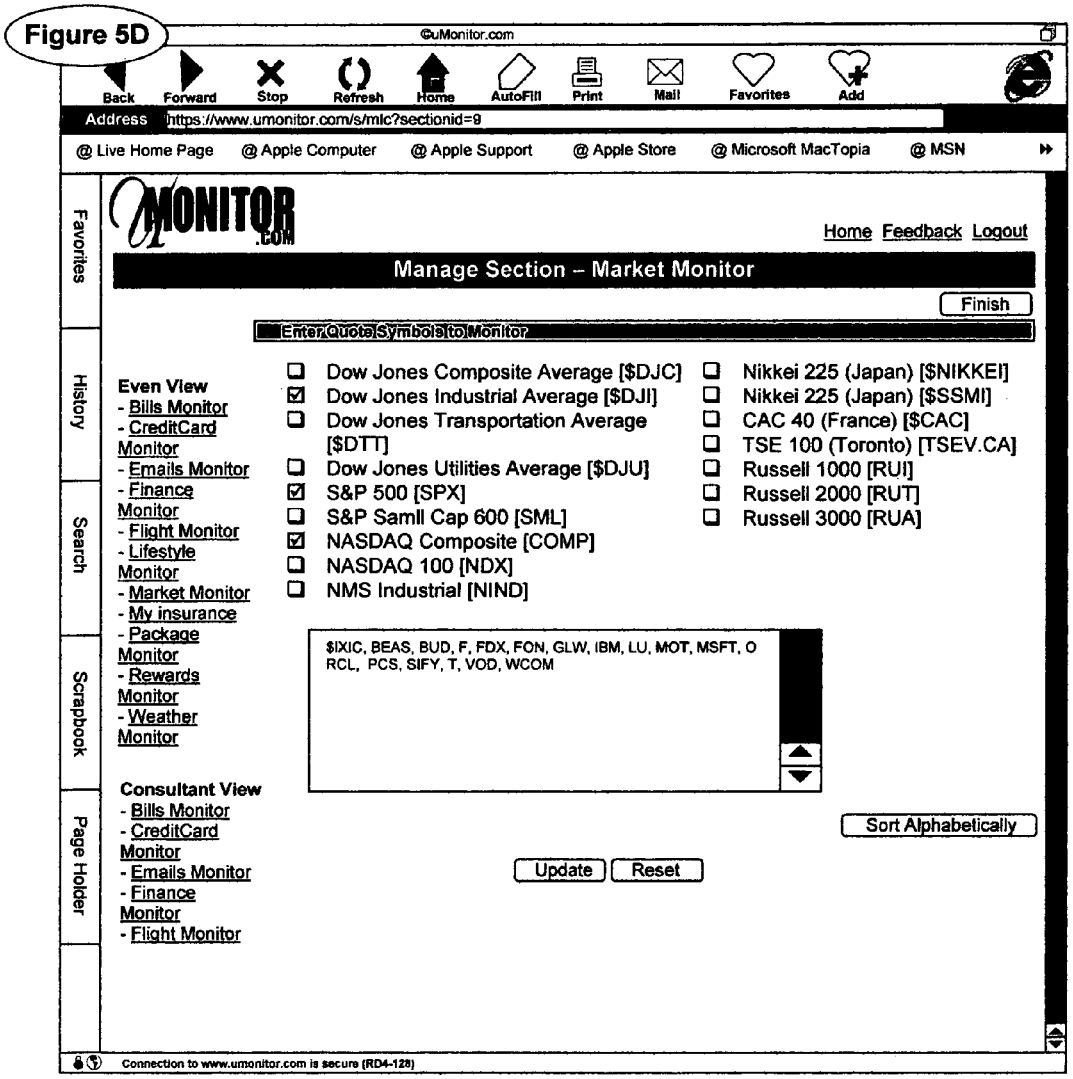
Figure 5E:
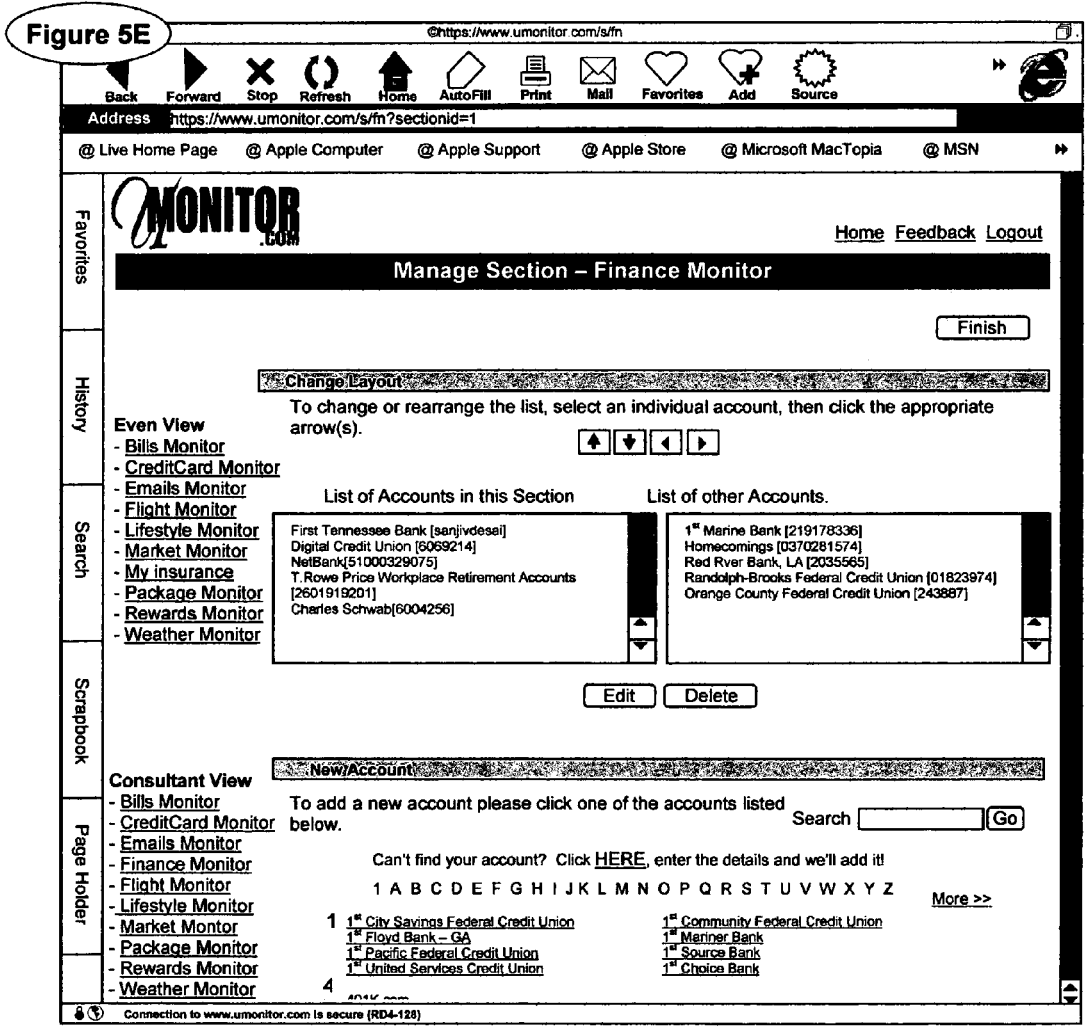
Figure 5F:
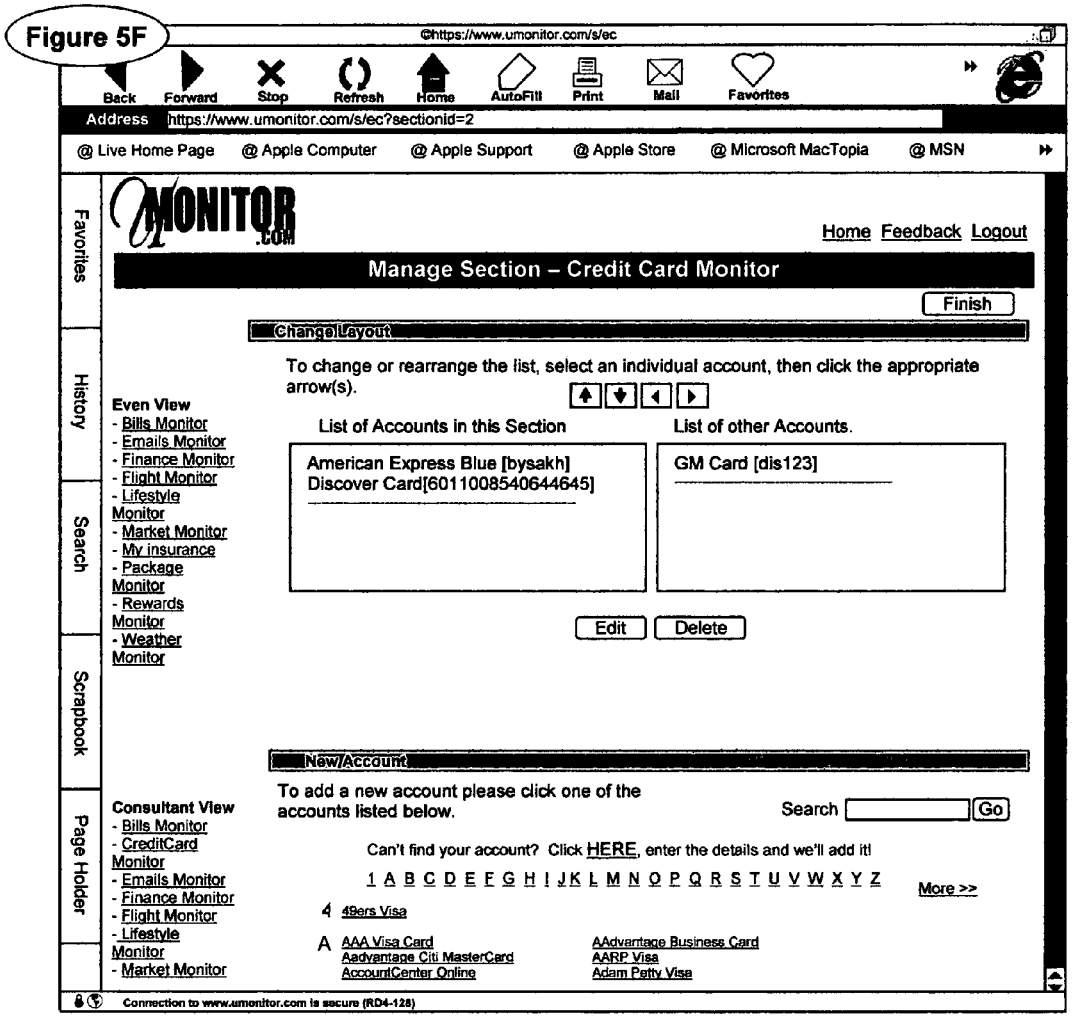
Figure 5G:
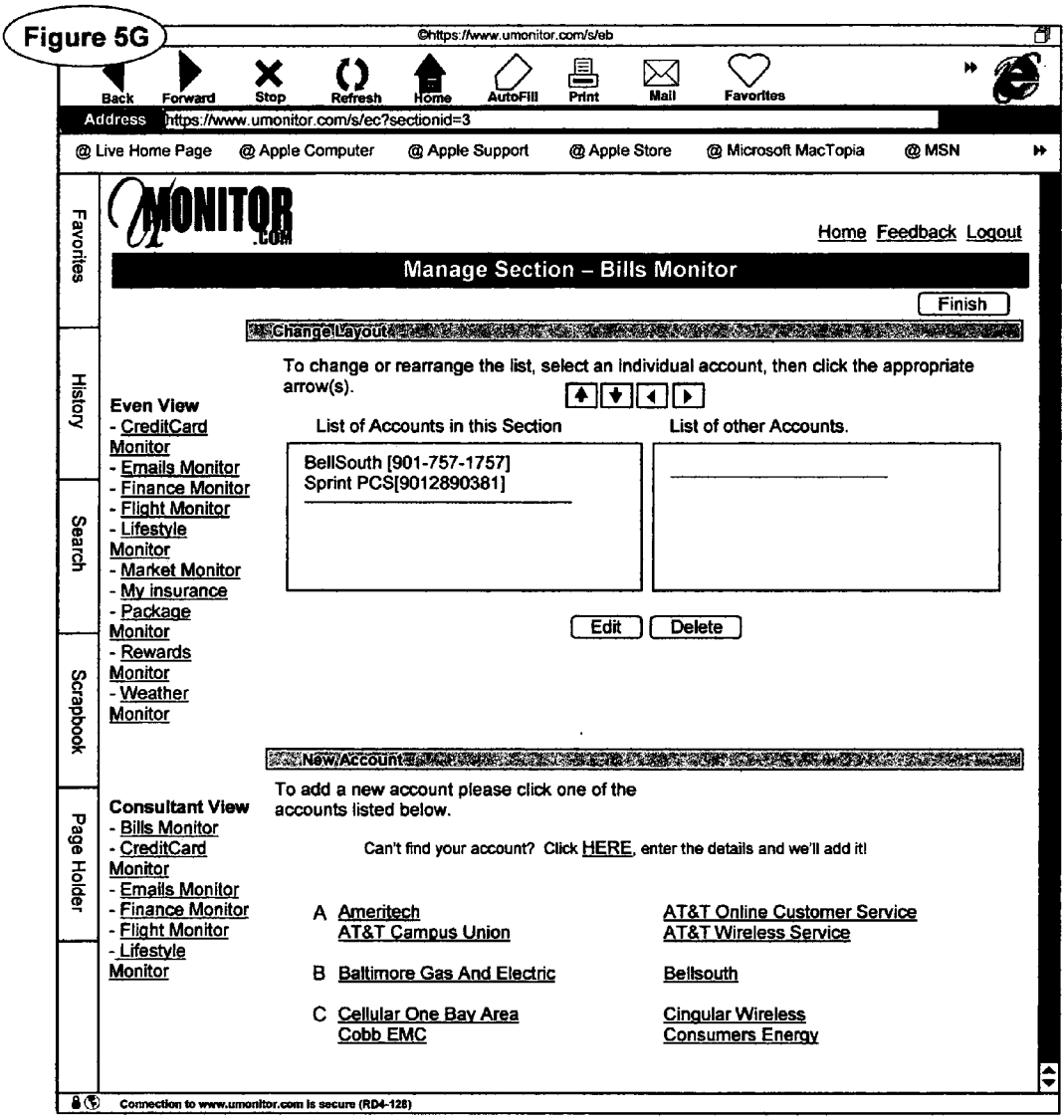
Figure 5H:
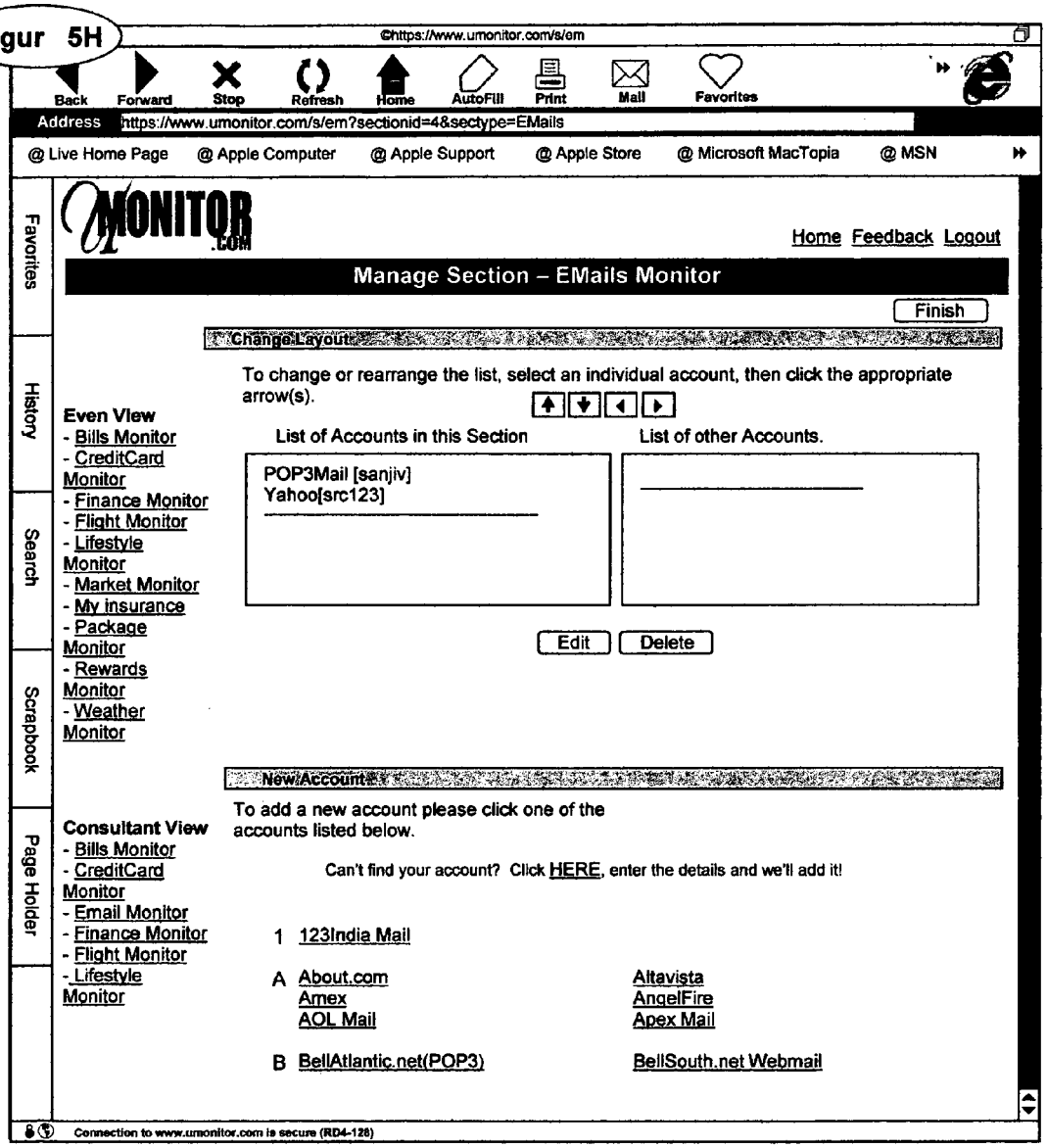
Figure 5L:
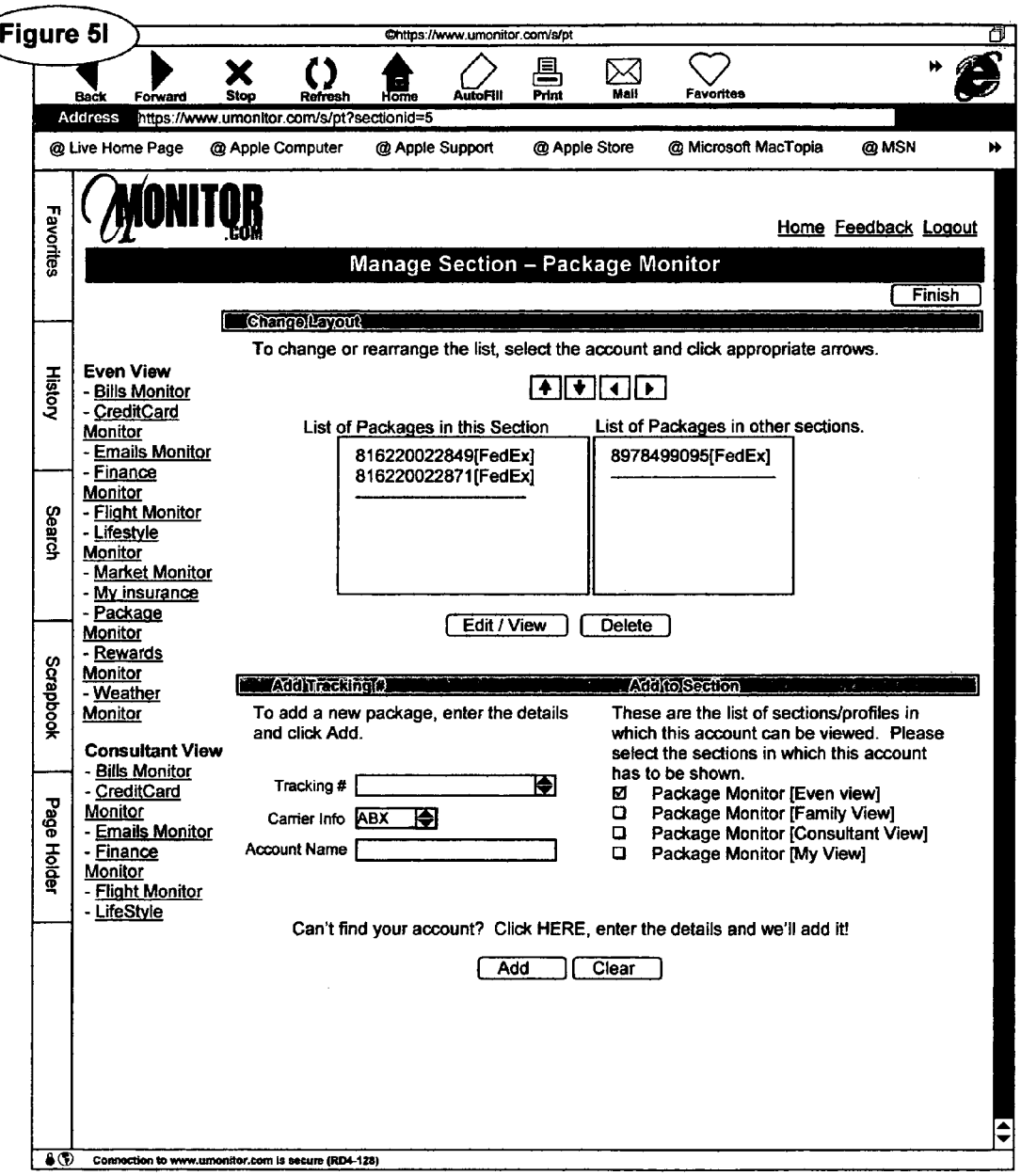
Figure 5J:
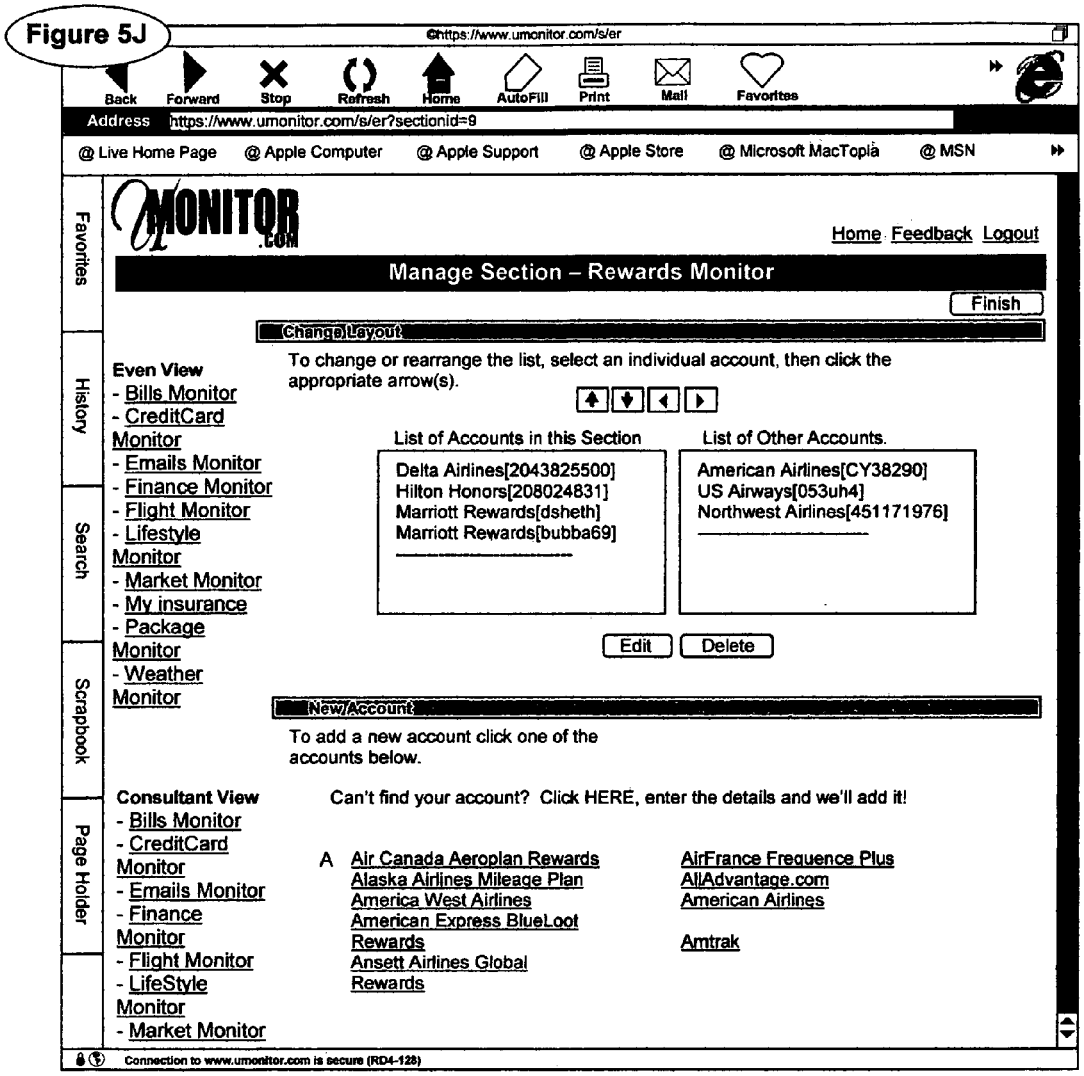

FIGS. 5A–5J present preferred embodiments of nine different types of GUI display screens for modifying monitors. For example, the GUI of FIG. 5A can be used for monitors that do not require password entry, such as weather and market monitors. FIG. 5A demonstrates an option in which a list of cities that are already populating the weather monitor appear in column 404, while cities that populate other monitors of the user appear in column 416. The user can transfer cities into or out of the weather monitor simply by clicking the left and right buttons on bar 417. Likewise, the user can rearrange the position of a selected city simply by clicking the up and down buttons on bar 417. The user can delete a selected city simply by clicking on the delete button 418. The user can add a city by entering requested information in block 416 and then clicking the is "Add" button 419. Menu 421 allows a users to add a new city to any available view pages 20 by simply clicking boxes next to selected view pages 20.

Once the user has populated the selected monitor 10, the information aggregation method of the invention retrieves the desired data from each of the institutes/web-sites that populate the monitor 10. If the data is already in the server's database (block 460), the system retrieves the data using the procedure set forth in blocks 468–496. The software retrieves the data 468 from the user account data store 472. The software decrypts the data 476 using a user data decryption key 480. The system retrieves the user's layout design 488, formats the data for presentation 484, and then populates the layout 492 on the user's display 1030.

If data is not available for a particular institute/web-site (block 460), the system retrieves the data 464, in a manner described in Section G below. Additionally, if the user desires to update the data on a particular monitor 10, he or she clicks the refresh button 500 and the system then retrieves updated data, in a manner described in Section G below.

F. Modify Passwords

From time to time, a user's login ID and PIN/password for a particular institute/web-site may change. It then becomes necessary for the user to update his or her login information in the information aggregation system of the invention. FIG. 9 is a flow chart of one preferred embodiment of a routine for modifying a password. Upon receiving an input from a user to modify a monitor 400, the system displays the institutions/web-sites (accounts) that the user is enrolled for on the selected monitor 404. FIG. 5B shows a preferred embodiment of the display of the accounts 404. Upon selection of a monitor 10 and receipt of an edit input by the user 800, the system prompts the user to enter a user ID 804, a PIN/password 808, and a PIN/password confirmation 812. The system encrypts the user ID 816 and stores it in user ID database 820. The system also encrypts the PIN/password 824 and stores it in the PIN/password database 828. If the user desires to set up or modify more passwords, the user repeats the foregoing steps (block 832).

G. Get New Data From Institute/Web-Site

FIG. 10 is a flow chart of one preferred embodiment of a routine for getting data from an institute or web-site. Turning to FIG. 8B, the routine of FIG. 10 is initiated when data is not available for a particular institute/web-site (block 460). If data is not available, the system initiates the routine of FIG. 10. The routine of FIG. 10 may be initiated in various ways and at different times, e.g. upon initial login, at periodic intervals, upon population of monitor, or when the user selects "Refresh" 500. The system retrieves an institute/web-site name 504 from the user institute/web-site account database 5048. The system retrieves the user's account ID from database 520 and decrypts the user's ID 512 using an ID decryption key 516. The system further retrieves the user's PIN or password from database 528 and decrypts the PIN/password 520 using a PIN/password decryption key 524. The system retrieves the institute/web-site's script 536 from institute script knowledge database 532. The system then executes a data aggregation routine such as a PDE routine 600. A preferred PDE routine is described below and in FIG. 11. When the PDE routine 600 is complete, the system retrieves the data 540 from the institute/web-site. Similarly data could be aggregated with OFK, IFK, QIF, XML, or other data interchange standards or proprietary methods as illustrated in FIG. 10. The system normalizes the data 544 (e.g. round off decimal places and otherwise place the data in a format acceptable for display on the view page 20). The system encrypts the data 548 using a user data encryption key 552. The system then stores the data 556 in the user's data store 472. Once the data for the institute or web-site is stored in the data store 472, the data can be retrieved by the system using the routine shown in blocks 468–492 of FIG. 8. When retrieving non-confidential data (e.g. for the weather monitor 10), the encryption and decryption steps can be eliminated.

H. Programmatic Data Extraction (PDE)

FIG. 11 is a flow chart of one preferred embodiment of a routine for PDE. As mentioned above, PDE is a technique used in information aggregation systems to gather confidential data from web-sites. Referring back to FIG. 10, the PDE function is initiated while gathering data from a web-site. At block 536 of FIG. 11, the system obtains information about the institute/web-site (e.g. URL, login, and name of institute) from the institute script knowledge base 532. The system retrieves the user's account ID or user name from database 616 and decrypts the user's ID using an ID decryption key 612. The system further retrieves the user's PIN or password from database 624 and decrypts the PIN/password using a PIN/password decryption key 620. The knowledge module then connects to the website from which data is to be collected 644. It then identifies the connection type supported by the website server 656. Some sites communicate using normal HTTP protocol while others use secure HTTP (HTTPS) using SSL encryption. If SSL encryption is to be used 660, the corresponding SSL certificate for the server is loaded 668 and a secure socket is opened by the knowledge module 676. While opening the secure socket, the knowledge module has to select the most appropriate encryption and decryption algorithms supported by the server 672. If the server supports normal HTTP communication, an ordinary socket connection is established between the knowledge module and the corresponding website server. The knowledge module transmits the login information to the website over the socket connection 680. The login session information and cookies etc. are accepted by the knowledge module 684. This session information and cookies are to be sent back to the server to access other resources (pages).

The knowledge module accesses the HTML pages containing the required data using the session information and cookies over the socket connection 690. The response from the server is passed and the required data extracted 694. More pages are requested from the server if data has to be collected from them 696. When all the required data has been collected the data is encrypted using the encryption key for the user and is then stored in the database 708.

I. Fast Login

FIGS. 12A–B are flow charts for preferred routines for setting up and using the fast login feature of the invention. Fast login is used to setup and access frequently visited websites with a click of a mouse button. Fast login can access sites that require a user name and password for access. The fast login feature allows the user to setup the website for fast login by entering the user name and password for the selected site. Once the website is set up for fast login, the user can click and go to the site any time without being asked to enter the user name and password.

FIG. 12A explains the process of setting up a web-site for fast access. The process is initiated when the user selects the "modify" option from the fast login drop-down list 802. A list of all the supported websites is read from the database 810 and displayed on the user's screen 806. The user navigates through the list and selects the desired website by clicking on the name of the site 814. If the site requires a user name and password to obtain access, the user is prompted to enter those details 826. When done, the user clicks the add button to add that website to his list of fast logins. If he cannot find the desired site in the list, he can manually add the site by entering the exact URL and site name 838. If the user wishes to add more websites 842, the above process is repeated. Once all the sites have been added, the user clicks the finish button 846. At that point all the newly added website details are stored in the database 848.

FIG. 12B is a flow chart for the process of accessing a fast login site. To go to a website for which the user has set up fast login, the user selects the site from the fast login drop down list 860. This list contains all the websites that have been set up for fast login by the user. A new browser window is opened with the required website loaded 864. If the site requires a user name and password to login, the application will automatically submit this information from the database and login the user to the web-site.

J. Mobile Access

FIGS. 13A–C are flow charts of the routines for setting up and accessing aggregated information using various wireless and handheld devices ("mobile devices"). The user has the option of selecting the information he wishes to access using each supported mobile device. When accessed through a mobile device, the data is formatted to fit the type of display on that device.

FIG. 13A is a flow chart for the process of setting up and modifying the mobile password. For security reasons, a separate password (i.e. different from the one that is used for web access) is preferably used for accessing the system from mobile devices. To set or modify the mobile password, the user selects the "Mobile Password" option from the list of options available in the "options" drop-down menu 904. If the user already has a mobile password, the user is required to enter the user's existing mobile password for verification 908. If the user is setting up a mobile password for the first time, he enters his regular (i.e. non-mobile) password for the site. The user then enters the desired mobile access password and confirms by entering the password again 912. When done, the user clicks the "Update Password" button 916. The new password is stored 920 in the database 924.

FIG. 13B is a flow chart for a preferred routine for selecting the pieces of aggregated information to be seen on each type of mobile device. The process is initiated when the user selects the "Mobile Access" option from the "Options" drop-down list 928. A list of all aggregated accounts is displayed in the check boxes beside each of the supported mobile devices 932. If the user wishes to view an account in a particular device, he checks the corresponding box 936. This process is repeated for each available account. When all accounts have been set up, the user clicks the "Finish" button 940. At this point information about the accounts and the devices in which they are to be seen are stored 944 in the database 948.

FIG. 13C is a flow chart for the process of accessing the aggregated information using a mobile device. The information to be accessed through the mobile device is set up in the manner explained in the previous section. The process starts when the user invokes the application on a mobile device 952. The mobile device sends the server a request for the welcome page of the web server of the information aggregation system. The server recognizes the type of device from the request, and sends the corresponding welcome page 960. On the welcome page, the user is prompted to enter his user ID and the mobile password 904. The user ID and password entered by the user is validated 908. After validating the password or a list of accounts (information sources which are selected by the user to be accessed through the mobile device) is displayed 980. The user selects the information that he desires to view 984. Details about the selected account are displayed in a format that suits the mobile device 988. After viewing the information, the user logs out of the application 990.

K. Additional and Specialized Functions

The foregoing description describes the basic components of the information aggregation system of the invention. The remainder of this application will focus on additional details that can be incorporated into the invention.

General Functions

Login

Before obtaining access to the information aggregation system, a customer is required to create a user profile through an enrollment or sign up procedure. Upon accessing the site of the host server, a customer is presented with a link to a sign up page. Upon clicking on the link, the user is presented with a page containing a user profile. The user is required to input information into the user profile, such as name, address, telephone, fax, email, secret question, etc. The information entered by the customer is authenticated and then stored in a user profile. The customer is given the option of selecting his own user-name and password. If a customer selects a user-name that has already been assigned to another customer, he is asked to select a new user name. He can also be shown a list of user-names to chose from. By selecting "Change Profile" from the options pull down menu 110 (FIG. 2), the user can change his profile, including his password.

Once a user is enrolled in the information aggregation system, he gets receives a view page 20 containing a default profile. The user can then customize the view page 20 in the manner described above. Once the customer enrolls into the host site, he can login to his own personalized page 20 using his user-name and password. The first page of the host server's site provides an interface for logging into the site. Once the customer has successfully logged into the site, he can elect to change his password. If he forgets his password, information regarding the procedures to reset his password is preferably provided on the home page. Once the system administrator resets a customer's password, the customer is preferably required to change his password the next time he logs into the site.

News Monitor

This information is provided as part of the general profile. Users can customize this information to be part of the personal profile. The user can obtain the following headline information daily:
Current Events
Top Stories
Health Information
Business Information
Kids News
Sports
General Quote Information Links are also available to other news sites. A customer can create various lifestyle monitors to link to sites of interest. Information may also be aggregated from the user's sites of interest.

Weather Monitor

General weather information is displayed on the view page 20 screen. The user can enter the name of city or zip code to obtain information specific to a particular location. A forecast for the week can be provided. The temperature can be displayed in degrees Fahrenheit as well as degrees C. Various customization options will be available to the customers through their personal profile.

Customers can also obtain information about the entire country. They can obtain storm information and record temperatures over a period of time. This information can be displayed in formats which can be easily understood by the user.

General Search Utility

A general search utility is provided. Here the user has options to use various search engines like AltaVista, Yahoo, and Lycos etc. The set of search engines available is customizable to offer search engines that are requested by the client group.

General Stock Profile/Market Monitor

A list of general stock quotes is displayed by default on the general profile screen. Once a user registers, he can personalize the information displayed so as to track stocks of interest to him. This also offers a link to his existing financial institutes for fast one click login for easy access to execute a trade.

Advertisements

Both banner advertisement as well as site link advertisement is available on this general information/start-up page. Also links to selected partners may be displayed at this level.

Personal Functions

This section describes the ability to set personal preferences in a profile and also explains options available for selection. These options outline functions available through the information aggregation system for registered users. In addition, there is a section to allow users to send feedback regarding the site. This is helpful to enhance the existing functionality and address any problems users may encounter is using the system.

Edit Personal Profile

For registered users of the information aggregation system, a customization option is available to tailor the application to meet their needs. Under the personal profile the customer can create as many different views as desired to track combinations of information. The customer can have multiple views such as business, home, operations etc. The personalization screen provides a list of applications (monitors) to choose from. Based on the information needed, the user can add or delete an application from the profile. Once the applications to be used are chosen, clicking on the save button can save the changes. Once the selection is made, the user is able to design the page layout to place selected information in a desired location on the page. Once a view is developed and saved, the user is free to modify the view as he wishes, To do this he should choose the edit option. There is also a help screen, which is viewed by the customer. A log out option will also be present. The user is asked to enter account and password information to get to the information that only he has access to through those passwords. All user information is encrypted for privacy and protection. A user can also select what if any information he would like to deliver to his wireless devices, such as palm computers, cellular telephones, and pagers.

Groups/Valet Access

Users of the information aggregation system can also be allowed to create a group in order to share profile information. A group can be made up of members of the user's family for domestic purposes or members of an organization or project in a business environment. The reason for creating groups is to allow members of family or business organizations to share certain information. The group coordinator can also monitor information coming in and going out of each group.

Home, Personal or Domestic Coordination

The customer can maintain family information in one place. This screen will display a list of all the monitors to be viewed. When the customer clicks on an entity he will obtain further details on the entity. He may also have access to execute commands and/or process additional information. This could be refresh information, or execute a transaction such as trade stocks, transfer funds, or pay bills. For multiple users in a household, a group can be created with different access levels. For example, parents have permission to view all information and children have restricted access. Or while parents are tracking their stock portfolio, their children can track sports information.

Bill Payment and Utility Tracking and Monitoring

The user can monitor various utility services such as electricity, gas, water, Cable TV, telephone, pager, and cellular phone. The information aggregation system makes it easy for the members of a household to maintain all their utility information in one place. All the utility bills can be tracked by the system. The bills can also be paid on line. Customer can monitor the status of home appliances with a click of a button.

The utility option will have a billing section and a utilization section. Under the billing section there are two options for viewing bills and making payments. Under the utilization section there will be a graphical view and a tabular view of utilization and billing data history.

Billing Section

The customer can set his view page 20 to monitor his utility and other online bills. He is also able to track his payments and make payments for any of these bills directly from the information aggregation system over the web. The billing view will have a list of monitored services. When each service is selected, the required information will be displayed. This requires necessary interfaces to be provided by the various utility services through which the host server can query and get information and also make payments and other transactions.

Utilization Section

The customer can get daily/weekly/monthly reports on the usage of various utilities. The reports could be in a tabular form or as graphs or charts. The user can be provided with an option to choose the month or the number of days for information to be viewed. >From the view page 20, the customer can track daily, weekly, monthly and annual usage of various services. The customer should be able to analyze the billing information, e.g. frequently called numbers or water usage in summer. Each month when the utilization is viewed, frequently used numbers could be displayed at one corner of the screen. Customers should be able to track money spent on phone bills over a month or year. The page may link to useful information, such as the best deal in long distance and international calling plans. Similarly, cellular calling can be analyzed or electricity usage patterns can be developed.

Bank and Credit Card Accounts

The customer can track various bank and credit card accounts from the view page 20. The latest information about the various accounts can be displayed in a summary window. Customers can personalize the page by selecting various options to see outstanding balances and deposits etc. To configure this option the customer needs to enter various bank and credit card information along with password and access information. The customer can view the balance in each of his account along with the transactions in each account. This will help the customer to keep track of expenditures over a monthly and annual basis. This will also save customers the trouble of going to each individual financial institute site to get information.

Similarly, the customer's credit card accounts can be viewed in summary and detailed view. The consumer can make any bill payments and fund transfers from various accounts from a single place in the information aggregation system.

Portfolio Management

The information aggregation system of the invention allows the customer to monitor and manage his financial portfolios from a single place. The information aggregation system of the invention differs from existing web-based portfolio management systems in at least two ways:

a) It allows monitoring of information from many different accounts in one place, without requiring the user to enter particular security information manually for each site; and b) Customers can maintain all their shares directly from the information aggregation system of the invention without having to go to their individual broker's page. Information and passwords for a customer's brokerage accounts are stored as part of the customer profile. When the customer elects to execute a transaction, the information aggregation system of the invention automatically logs in to the respective broker's server to execute the transaction.

The customer can personalize the page so as to group the stocks in the manner in which the customer would like to view them, e.g. all Internet stocks in one group, all financial stocks in another, etc. Another way of grouping could be based on the brokers, i.e. all stocks from one broker in one group and all stocks from another broker in another group. Mutual funds holdings can also be tracked by the user. A user should also able to configure different groups of stocks that he does not hold in an account, but which he would like to monitor, i.e. hypothetical portfolios. Another advanced feature would be to track the growth of stocks over a period of time and view it graphically. The user can set limits on stock prices to trigger an alert or a page when price fluctuations occur. The user will be able to create family and group profiles as well.

Integrated Mailbox: Email/Voicemail/Fax

Most customers have multiple email accounts. The email feature in the information aggregation system of the invention will provide a single interface through which they can access all their mails from the various email accounts. This will include all their POP accounts as well as other Internet-based email services like Hotmail and Yahoo. In addition to the external email accounts that can be configured in the information aggregation system of the invention, the customer also preferably receives a host server email account by default.

When the user enrolls, a default email profile will be set for the information aggregation system. The user can then add all the other email accounts to this profile. Thereafter the user can see all the mails coming to the various accounts setup in the user's profile in the in box. The user will be able to add, delete or modify email accounts from the profile at any time. The information aggregation system of the invention allows users to maintain family and group accounts, i.e. all the general mails coming to a family or group can be obtained here. Restrictions can be placed on access to each group.

Other common features of email services like filtering, sorting, and creating different folders etc. may also be provided by the host server. Emails can be automatically forwarded to specified folders according to the customer's preferences. The customers can also set up automatic email responders. With a unified messaging platform, fax and voice mail may also be integrated to work like the email system described above.

Home Appliances Monitoring

As more and more home appliances become 'smart' and report their status through wireless services or through Internet interfaces, the user will be able to control and track the status of the various home appliances over the Internet through the information aggregation system of the invention. With the invention of tiny web servers, and connectivity through many networks, the 'smart home' concept may finally become a reality. The following list provides some of the devices that could be monitored and controlled:

Air-Conditioner
Heater
Swimming Pool system
Washer
Dryer
Dishwasher
Kitchen Appliances (oven, refrigerator, etc.)

There will be an option to choose the device (from the ones listed). Then the customer can choose to manage or view detailed information. Preferred options include:

Turn the devices on or off.
Set temperature.
Program device operation.

Air-Conditioners/Heaters can be switched on/off and temperatures can be set via the web. For example before leaving the office, the customer could switch on a heater at his house and set it to a desired temperature so that by the time he gets home the rooms/pool would be at the desired temperature level. This feature would promote conservation of energy.

If the view detailed information option is chosen, the system displays additional information. The customer will see the daily/weekly/monthly reports on the usage of the various appliances and various settings like temperature. The report could be in a tabular form or a graphs or charts. The customer has the option to see the reports in one or more of these types. The charts/graphs etc could be created and shown using applets.

Home Security Monitoring and Control

Customers can setup their information aggregation system to monitor their home security system. Depending on the available information from the home security system, various pieces of information will be displayed by the information aggregation system of the invention. The main display will contain a list of devices or zones and their current status. If video monitoring is available there will be video feed to actually display activity from a selected zone. Some of the devices such as Alarm Status System, Intercom and Gate Security can be integrated. The functionality of some of the devices is as follows:

Intercom—this allows for monitoring of infants and elders at home. This can also be used for door or gate release.

Alarm System—can be used for both internal and external protection. One of the internal alarm systems is the smoke alarm system. In the event of a smoke alarm, the device can send out the message to the information aggregation system server and the customer can be notified via their preferred emergency notification method. Some of the functions that could be performed on the security systems through the information aggregation system of the invention include:

Monitoring the status of the security system (Armed/Disarmed)

Arm or disarm the system directly over the Internet from the information aggregation system service.

In the event of security alarms, the information could be transmitted to the information aggregation system server and then the customers could be notified automatically through pager, cellular etc. or any other method specified by the customer.

Vehicle Tracking and Monitoring

Through the information aggregation system of the invention, a customer can track movement of vehicles driven by members of the client's household or by employees. The movement of the vehicle can be tracked over a period of time. The route taken by the vehicle can be displayed on a map. The information obtained can be used for different purposes, such as tracking the location of children using the family vehicle or tracking missing vehicles. This information would be useful in emergency situations (e.g. a car accident or a stolen vehicle). The value of this information could be enhanced by keeping a history of travel, driving habits, auto related transaction tracking, etc.

A summary page may display the following information for each of the vehicles owned by the customers:

Vehicle Name
Vehicle license number
Vehicle ID number
ID of the tracking device placed in the vehicle.
Current location of the vehicle
Current status of the vehicle A detailed view can map the location of the vehicle. The distance covered during the travel can also be viewed. If the vehicle has the ability to report details on its performance (e.g. engine statistics diagnostics, information etc.) they can be displayed here. There could also be a device mounted in the vehicle that can send a help request in case of an emergency. Depending on the nature of the information and user preference, such information may be relayed to other services. This may allow the auto manufacturer or repair shop to offer better service and price and develop loyalty programs. This could help with insurance ratings etc.

A user could also be allowed to monitor information such as

Expenditures on vehicle maintenance
Next service date for an oil change or engine tune up or other maintenance.
Daily fluid level and air pressure of the car.
Track car loan installment payment and schedules.
Track auto insurance coverage and renewals.

The information obtained can be displayed in a graph or in a table format.

Personal Travel Services and Monitoring and Rewards Programs

Currently there are many sites that offer very competitive travel booking and ticket purchasing services. They offer many features with offers for best prices or best schedules etc. The information aggregation system does not try to duplicate these services. The information aggregation system of the invention will offer added convenience to an individual traveler. The status of the flight travel can be monitored if a reservation is made online or flight information is entered into the system. Once the travel plan is entered in the system, the information aggregation system of the invention will monitor arrival and departure times for the flight, and notify the user of any change in the schedule.

Similarly, if a user wishes to monitor the price change for a given flight schedule, the information aggregation system will monitor the available price and update the user as to any price change. The information aggregation system can book a flight through one of the sites that offer online reservation, if desired. The information aggregation system of the invention will provide links to popular travel sites like Travelocity and Expedia.

The information aggregation system of the invention will allow the users to monitor all their frequent flyer programs information in one place. Just like the stock portfolio or bank account monitoring, customers can specify their account information and passwords, and the information aggregation system of the invention will gather necessary information. Users can maintain all their frequent flyer/hotel etc. programs in one place and request services from them as appropriate from the information aggregation system of the invention.

Calendar (Personal Information Manager)

A calendar is provided by the information aggregation system on which the customer can maintain family schedules and set reminders for all-important information. The system also provides updating of the calendar from the existing calendar systems. The entire family schedules can be updated on one calendar so as to identify any conflicts in schedules. For business or group calendar, all the entries of the group can be merged in one calendar so that conflicts can be resolved while scheduling meetings.

The customer can view his daily, weekly or monthly calendar. He can also view the entire group or family calendar. Tasks to be done can be listed on the main display if desired.

The customer can synchronize his personal organizers and other schedulers such that any changes made in one place can be reflected in the other scheduler. If he makes a modification at home and he makes another entry at work in a different scheduler, the information aggregation system of the invention can show both entries and help synchronize both or display both. If the customer decides to have a meeting or party then he can send emails directly from the calendar. The calendar will also notify the customer (if the reminder is set on in the calendar) on the pager, phone or by e-mail of important appointments.

The first screen in this application may be a login screen or sign up for new users. The general services available to the customer are displayed here. Once the user has logged on, he is allowed to create a personal profile or a group profile.

In a group profile the members of the group may have different access levels. The project leader will have permissions to view the schedules of the group members, and will also be allowed to create or schedule meetings and add or delete members. The members can view the group and individual calendar but can only update their personal information. Once a meeting is scheduled, a user has an option to send out an e-mail to all the people who need to attend it. The screen can display a 'to do list' on one side of the screen. A reminder can be set on to notify the members of the group of a meeting. To create or schedule a meeting, the user is guided through a menu of the necessary information such as:

All the employees to choose from
An option to add or delete entries
An option to set the date and time
An option to set reminder
An option to send e-mail to all the attendees.

There will also be an option to create a group, such that instead of choosing the individual names and adding them to the list of attendees, the group name can be selected. If there is a general lecture or meeting, the calendar for many groups could be updated. There could be another screen which will display the event information. This page can be personalized to display the events that need to be tracked. A list of events will be provided. The user will also be allowed to set reminders for important events. In a personal profile, the access permission can be applied based on the head of the family. The children could have a lower access level.

Package Tracking

The information aggregation system customers are allowed to track incoming as well as out going packages. The customer can obtain information regardless of who the package carrier is (i.e. FedEx, UPS, etc.). The customer can also obtain information regarding the rates of all the different cargo systems. Customers will also be able to locate the offices nearest to them. One of the screens will display information of the area covered by the carrier. This information can be presented in a map format. The user is allowed to enter the zip code from where a package starts, and in response the system displays the number of days it will take the package to reach its destination and the cost of various shipping options. The customer can enter the tracking number and the carrier. Once these values are entered, the status of the package will be displayed. This feature can be used for both domestic and business purposes.

Video Feed

Customers may receive a video feed from a camera, which they have paced at a location that they would like to monitor. For example, customers can monitor what their kids are doing while they are at work by placing a camera in the kids' room and sending in video feed from the camera directly to the information aggregation system service. They can then view the video live over the Internet in the information aggregation system display. This feature can also be used to monitor the activities of a baby-sitter while they are away at work. It can also be used to monitor movement around the house and apartments for security purposes. This kind of video feed can also come from day care centers and schools. If one parent is unable to attend a child's functions (e.g. a dance performance or soccer game), the other parent can send a live video feed from the function.

Business Functions

The information aggregation system of the invention can be used to extend the concept of corporate and business portals. The focus in not so much on how data is entered in various corporate systems, but on how various data and information systems are pulled together so that the user receives the data she needs where she wants it, e.g. on a desktop or palm computer. In the corporate embodiment, the information aggregation system of the invention serves as an office worker or knowledge worker dashboard. A single password and account on a corporate information aggregation system based portal lets the user receive what she wants from all corporate systems (e.g. personal data from HR system; manufacturing statistics from a production line). The user can also maintain group information. The group concept will allow for collaboration and extension of knowledge throughout an organization. On a simple level, a group can be seen as collection of users with different access levels. In a hierarchical organization, the manager and group head may have permission to view all information while project members may have restricted permissions.

Several corporate portal providers have evolved in recent years that look at various corporate data and information and bring it together for the user. Most applications providers with ERP, SCM, CRM and data warehousing are offering options to view some level of data through web-based browsers. However a user now has to go to many sources and must login with many systems in order to get what she needs to complete her job. This is frustrating and hurts worker productivity.

The information aggregation system of the invention offers an integrated view of many diverse portals and systems inside a corporate firewall. The system also includes the ability to perform a single sign-in function, such that the user only needs one password to go to all systems within the corporation or on the web. The information aggregation system of the invention also allows the user to bring key personal data into the business world to provide a single view of important information for monitoring and control of both personal and business domains.

In this set-up the information aggregation system of the invention is the technology that gets integrated inside the IT managed environment to quickly offer features and functions that are similar to those offered on the personal side for corporate users. From integrated reporting from various systems to single account management, the user gets the necessary information delivered to her as needed.

Special Applications

The information aggregation system of the invention allows users to monitor and track commercial applications on the web. Some of these applications are described below.

Logistics Management

The customer is provided with a few easy ways of managing the information obtained from different sources. Organizations that are involved in transportation of goods can use this application to obtain information and track the movement of the cargo. The goods can be transported via truck, trailers, or railcar. A Mobil tracking device is mounted on the trucks. This can keep track of all the information /movement of the truck.

The information aggregation system can track the movement of trucks. The route traveled by the truck can be displayed on a map. The system can also track: the period of time for which the vehicle has been stationary or in movement; gas consumption of the truck over a week, month and year; and maintenance of the truck over a month or week.

The information obtained can be displayed for the use of the people at the company or base station. The user can be provided with a few different views, such as group view and personal view. Different users of the company may want to view their information in different formats, hence the personal view option. The group views can be based on area or the cargo being carried.

The customer can configure the vehicle information. The information need to configure may include:
  Name
  Description
  Type
  Capacity
  Owner
  Address
  Radio equipped
  Radio type
  Radio ID
  Radio address
  Radio serial number
  Start and End point The view will have a set of tables displaying information. One table will display the daily delivery and pickup information, such as:
  Customer name
  Contact person
  Date and time
  Delivery or pickup
  Contents
  Trailer name Another table will track the movement of the trailer. Here the user is provided with two views: tables views and map view. The table view will display the following information:
  Trailer identification information
  Last location
  Date and time
  Status (mobile or stationary)
  Previous location
  Date and time
  Status The movement of the truck can be displayed on a map. The map will have capabilities of zooming in and zooming out. The user can view the last and current status/location of the trucks or trailers. There will be another table which has a "to do" list of all tasks that need to be accomplished. The system can also provide a chart with information regarding the speed of the vehicle over a period of time (day, month and year). This chart will display the maximum speed and average speed of the vehicle. It will also display the miles traveled per gallon. The utilization and expenditure can be displayed in tabular column or as a graph. Customers can also obtain a list of the office locations and contact information.

Order Tracking System

The information aggregation system makes order tracking easy for customers. As more and more services and goods are purchased on line, on line suppliers are providing on line information about the status of orders. See e.g. www.onsale.com. The information aggregation system functions as a central control center where the user can track all of his orders from the view page 20, so that the user does not have to go to various sites to gather that information. Next level of functionality will be for the order tracking system to integrate with back office systems for inventory management and billing and payment services. Some of the information provided could include:
  Supplier name and address
  Order ID
  Order Date and time
  Status (oh hold, shipped, in transit, delivered)
  All the orders in last month
  All the orders from a given supplier
  Payment history
  Customer Service System The information aggregation system of the invention can also provide personal information about where the customer does business. From time to time, users will have customer service requests for many of their service providers. It is often very difficult to locate a customer service contact, whether by telephone, letter, or e-mail. The information aggregation system can simplify this process by offering all of this information in one place. The system goes beyond offering information about where to go for customer service, and becomes a customer service center from the user's point of view. Today's order tracking and customer service systems are designed from the point of view of service providers for them to track transactions. The information aggregation system changes this paradigm by offering a customer service center for users that tracks all of a user's customer service requests and keeps him updated on the status or progress of his given request. Some of the information provided could be:
  Supplier name, address, phone number, online CSR address
  Customer service request number or order number
  Date and time
  Status (on hold, rma issued, credit issued, in process, resolved, send more info)
  All the complaints in last month
  All the issues for a given supplier
  Service history
  Health Care Monitoring The information aggregation system makes it easy to monitor patient information (e.g. heart rate, patient history etc.) from remote locations. In a home environment, this feature can be used to monitor the elderly and ill. Doctors can view all medical records of patients on line. Doctors can prescribe medicine for treatment, and can look up drug references and side effects. Doctors can also hear dictated notes. Dictated notes can be converted to text and be available to doctors as documents. The system can page nurses and doctors to notify them of any critical condition. Over a period of time the medical record or medical history of the patient can also be obtained online. Restrictions will be provided as to who can view the patient's information. Tips about health care can be posted at regular intervals for the awareness of the general public. After returning home from the hospital or a doctor's appointment, patients can log on to review information regarding their health. This utility can be used for new admissions, patient registration and critical care information. The first screen will display the patient's personal information, such as:
  First Name
  Last Name
  Social Security Number MRN
Age
Address
DOB
Gender
Insurance number
Doctor name For first time patients, all requested information will have to be entered. For returning patients, the patient's information can be automatically displayed once the name and Social Security Number have been entered. Personal information can be modified as needed. Previous medical records at the hospital can be displayed on one side of the screen. If the previous hospital chart number is obtained, then the previous medical records can be obtained.

The current patient information can be viewed on-line by both doctors and authorized family members. The information is provided in two view: a general profile and a detailed profile.

To access the information, both doctors and patient's relatives enter an access code. In the general profile, the following information can be obtained
Patient's Name
Current status
Last medication taken
Next medication due at—
Doctors name
Pager number Along with all this information, general health tips can be provided to individuals accessing this page.

The detail profile will have in-depth information regarding the status of the patient, such as:
Doctor name
Nurse in charge and pager number
Patients name
Heart rate
Blood Pressure
Temperature
Blood sugar
Current medication
Next checkup
Daily report—which will contain procedure report, test results etc
Status of the patient Every time a patient comes in for a regular visit the following information will be needed:
Patients name
MRN—medical record number
Doctors name
Date/time
Reason for visit
Insurance number
Doctors report—this will contain the diagnosis or problems
Previous Medication
Place where prescription is filled
Follow ups
Blood Pressure
Allergies
Tests if any
Prescription With the help of the MRN, the patient's past medical history can be obtained. Under Medical History, the following information will be displayed
Tests Conducted and results
Medication of the patient
Allergies
Current status
Procedures conducted if any
Discharge summary if any There will also be a billing section. The billing information will be as follows:
Name of the patient
Name of the doctor
Date of visit or service obtained form the doctor
Co-pay
Services billed for
Blood test
Any procedures
Data on lab information, such as the test conducted and the results for each test.
Fuel Monitoring Customers can manage oil wells from the interface of the information aggregation system of the invention. The first screen will display the location of all oil wells and storage areas. To obtain the information of a specific oil well or storage area, the customer will enter a new screen. The screen will display the oil level in the well as well as in the storage area. Users will be allowed to personalize the page to display the information they want to see. In case of an emergency, an alarm could be sounded by the system and interested persons can be notified by phone or beeper.

Various types of data and information can be displayed, including: the amount of oil being obtained from the well over a period of time; the price of oil over a period of time could be calculated; all the customers of the company; sales to each company; total turn over of the company; stock price quotes of the company. Customers can also view some general information, such as:
Customers can track the level of fuel in the tankers. This information can be used to keep track of the next refill.
Customers can also check the amount of fuel that can be downloaded at the next station. Once the fuel level falls below the required level, an automatic reminder is sent to the customer.
Equipment Management A customer can use the information aggregation system to track the status of equipment, such as office equipment or vehicles. This feature will allow both the customer and the service organization to monitor and service the equipment. The equipment has embedded controllers and communication devices. These devices cannot only monitor their own status, but can also provide information regarding any repair or services needed. All these devices will have a display on the systems, which will display the information. The customer and the equipment manufacturer can view the information on a screen on the information aggregation system. For example, the status of printers, fax machines and scanners can be displayed.

Each vehicle will have a screen to display the status of the vehicle, including information such as:
next oil change due
next vehicle tune up
air pressure in the wheels
Diagnostics—this will diagnose the electrical, mechanical etc. problems in the automobile and list them out.

Manufacturers will be able to obtain functional information of each and every vehicle in the market. The information will be in a tabular or graphical view. In both views the required information could be obtained by clicking on the automobile type and manufacture date. There could be a filter to display the common reoccurring problems in each make. All the information obtained could be used by the company to enhance the performance of new vehicles coming into the market. The information could also be used for timely servicing of the automobiles. A screen would be displayed asking the following information:

Vehicle ID
Make
Year
Name of owner

Once this information is punched in, all recorded details about the vehicle can be obtained. This will save both the customer and the service organization a lot of time.

In case of emergency, the automobile can automatically notify the user and any emergency contact. The manufacturer can also view general information of all the parts in the vehicle. The usage and durability of the manufactured product could also be evaluated.

One of the screens will display a list of all office equipment available to be monitored. In the transportation industry the screen will display a list off all the vehicles. When each of the links is clicked, a page will be displayed which will have all the functional information of the product along with the problems if any. The screen will preferably list:

Product ID (for office equipment's) and vehicle ID (for automobiles).
Date of purchase
Sales
Automobiles will display the miles traveled since the date of purchase.
Problems in the system so far (categorized as sever or not)
The utilization can be displayed in a table or graph.
A list of repairs needed on the product.
Next service due.
Level of all the engine fluids in the automobile.

An option can be provided for adding new sales to the existing system. There will be a new screen to add new product. All the information will need to be updated from time to time. The information entered will preferably be as follows:

Product ID
Name of customer
Address
Information—device mounted to give feed back There should also be a contact number displayed on the screen to contact the vendor if necessary. This page can also display general tips to maintain and operate the automobile or office equipment.

E-mail

E-mail for business purposes is similar to e-mail for personal purposes (discussed above), except that the project lead will have maximum access permissions. The team members will have a restricted access level. All the general mails can be forwarded to all the group members. The project lead can also keep track of the number of mails coming in and going out of a particular account.

On Line Shopping

The information aggregation system makes on line shopping easy for customers of the business. Customers are allowed to enter the name of the product or choose from a list of preferences. Once this is done, a list of all related products and their prices will be displayed. Another section will give the customer a list of auction and bargain sites. Information about all latest sales can be obtained here. Customers no longer need to search in different sites for the best price. The first page will display different shopping categories, such as the following:

Home Appliances
Cloths
Electronic gadgets
Kitchen ware
Home and garden
Sports
Flowers
Vehicles
Books
Computers
Art
Gifts
Food and Drinks
Collectibles
Health
Office equipment
Personal Care
Online drug store This page will also have a general search engine. The search will be based on category and a product in the chosen category. The sales and auction information can also be displayed on this screen. Users will have the option of personalizing this view. Adding or deleting items from the list can modify the personalized view. Once a user successfully logs in, the view selected by the user will be displayed. There could also be an option where the user's e-mail ID is entered in order to receive sale information or auctions. The customer will be given the option of requesting a catalog.

When the user clicks on a selected category, a new page will be displaying having a subset of products in that category. There will also be a search utility for the specific category. Each of the screens would have added banners to promote some products. Once the specific sub category is chosen, a third screen appears. This screen will have an option to specify the price range of the product that the user is interested in buying. Once this is done, a list of all devices in this range will be displayed. The desired product can be placed in a shopping cart. The user can then chose either to buy the product or continue shopping. If the buy option is chosen, the user is taken in to a screen to enter information to buy the product. If the continue option is chosen, then the user is allowed to continue shopping.

Fast Access/Single Sign-On

The information aggregation system of the invention makes it easy for customers to obtain on line access to many web-sites. As discussed above, when a user populates a monitor 10 with a particular institution/web-site, the customer enters the customer's ID, password, and other requisite information for the selected site. The information aggregation system stores this login information and uses it to log into the selected site on behalf of the customer, using the procedures described above (FIG. 12). Thus, the system serves as a functional database of all of the user's login information for a multitude of web-sites. Once the user is logged into the information aggregation system, the user can rely on the information aggregation system to login to the user's web-sites, eliminating the need to remember or look up account IDs and PIN/passwords. Using the foregoing capabilities, the system can provide a list of "favorites" that is available to users whenever they login to the information aggregation system. From this one place, a user can go to any selected site without having to enter a name and password for the site. Functions can also be provided whereby the system serves to hide the true identity of the user from the selected web-site.

Using this technique, the system can be adapted to work as a single sign-on system for any web based applications. Corporations can use the single login feature to offer internal users access to various applications that normally require entry of different user IDs and passwords. Single sign-on can be used by financial institutions to provide access to a multitude of services from different vendors with different user IDs and passwords using a single sign-on user ID and password.

L. Secure Selective Sharing of Account Information

The present invention is a system for providing and allowing selective sharing of account information among users of an Internet information aggregation system. The sharing system of the invention is preferably used in conjunction with the Internet information aggregation system embodiments described in Sections A–K, above. However, the sharing system of the invention can be used with any Internet account aggregation system that shares information with multiple users.

The invention allows users to create a plurality of view pages 20 and selectively share these views with other users of the system. For example, a user of the system can create the following views: (1) a public view 20 that displays news, lifestyle items, stock quotes and other non-sensitive information; (2) a private view 20 that displays sensitive information such as bank accounts, brokerage accounts, insurance, rewards programs, email, and travel information; (3) an advisor view 20 that displays selected account information, such as financial account information, travel account information, automotive history, or medical history information, for purpose of receiving and exchanging information with an advisor, such as a financial advisor, travel agent, mechanic, or physician.

For purposes of clarity in the following description, the user who is granting or assigning access to his or her view pages will be referred to as a "grantor." A user who has been granted access privileges by a grantor will be referred to as a "grantee" As will become clear from the following description, each user of the system can be both a grantor and a grantee, depending on the circumstances. For example, if user A assigns Visitation Access privileges to users B and C, user A is a "grantor" to users B and C, while users B and C are "grantee" of user A. If user B assigns Visitation Access privileges only to user A, user B is a "grantor" to user A, while user A is a "grantee" of user B. However, unless user B assigns Visitation Access privileges to user C, user B is not a grantor to user C, and likewise user C is not a grantee of user B.

Figure 14:
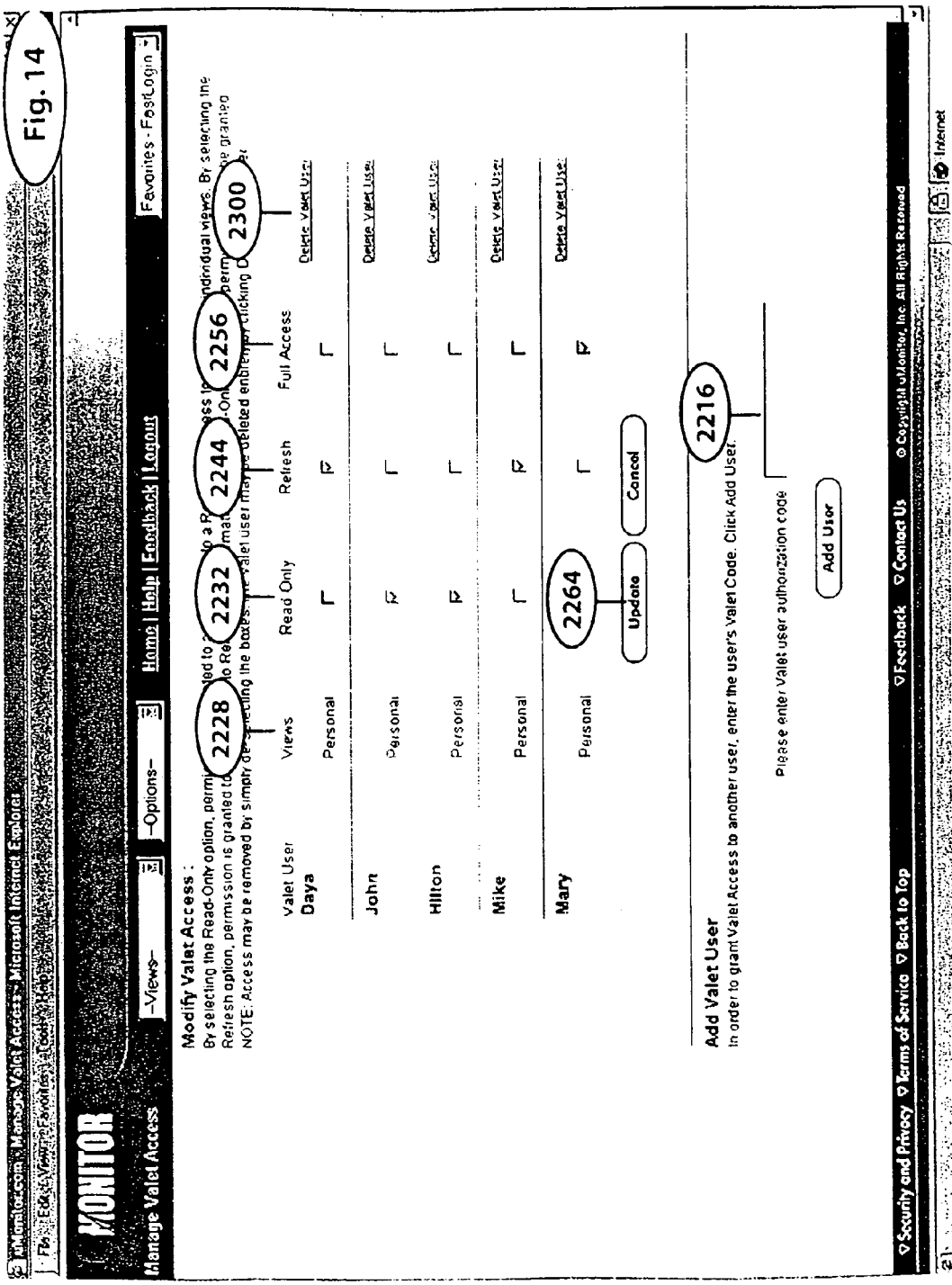
FIG. 14 is a is a preferred embodiment of a graphical user interface for granting and revoking visitation access rights for sharing account information on an Internet information aggregation system.

Using a GUI such as the preferred embodiment shown in FIG. 14, the host user can selectively grant or revoke Visitation Access using the account information sharing system of the invention. Access to the grantor's view pages 20 is granted solely by the grantor; the grantee does not have to do anything in order to obtain access, other than provide the user with the grantor's Visitation Access Code. Visitation Access Codes are assigned to the users by the Internet information aggregation system (or by the party that administers the system). The Visitation Access Codes are stored in the system's user profile database. Visitation Access Codes are unrelated to user login criteria (i.e. user IDs and passwords), so that users do not have to reveal their login criteria to one another in order to share information via the account information sharing system of the invention. The use of Visitation Access Codes also eliminates the need for the grantor to create a password for each of his grantees. A grantee simply logs onto the system using his own user ID and password. When the grantee pulls up his view page 20, he is presented with an option for viewing the view pages 20 of grantors who have granted Visitation Access to the grantee. The grantee can then select a grantor's view page 20. Selection of the grantor's view page 20 is preferably made in the same manner in which the grantee selects from among his own view pages 20. Once the grantee has selected a grantor's view page 20, the grantor's view page 20 is displayed on the grantee's display.

The Internet information aggregation system can be configured such that only certain users have the right to participate in Visitation Access. For example, users can be required to pay an additional fee in order to receive a Visitation Access Code and participate in Visitation Access.

FIG. 15 is a high level flow chart for one embodiment of a method which implements the account information sharing system of the invention. FIG. 1 SA presents an overview of the method. The flow chart documents six primary functions: Create Views (FIG. 15B); Grant Access (FIG. 15C); Revoke Visitation Access (FIG. 15D); Review Views (FIG. 15E); Mobile Visitation Access (FIG. 15F); and Secure Messaging (FIG. 15G). These functions are described in turn below.

1. Create Views

Figure 15A:
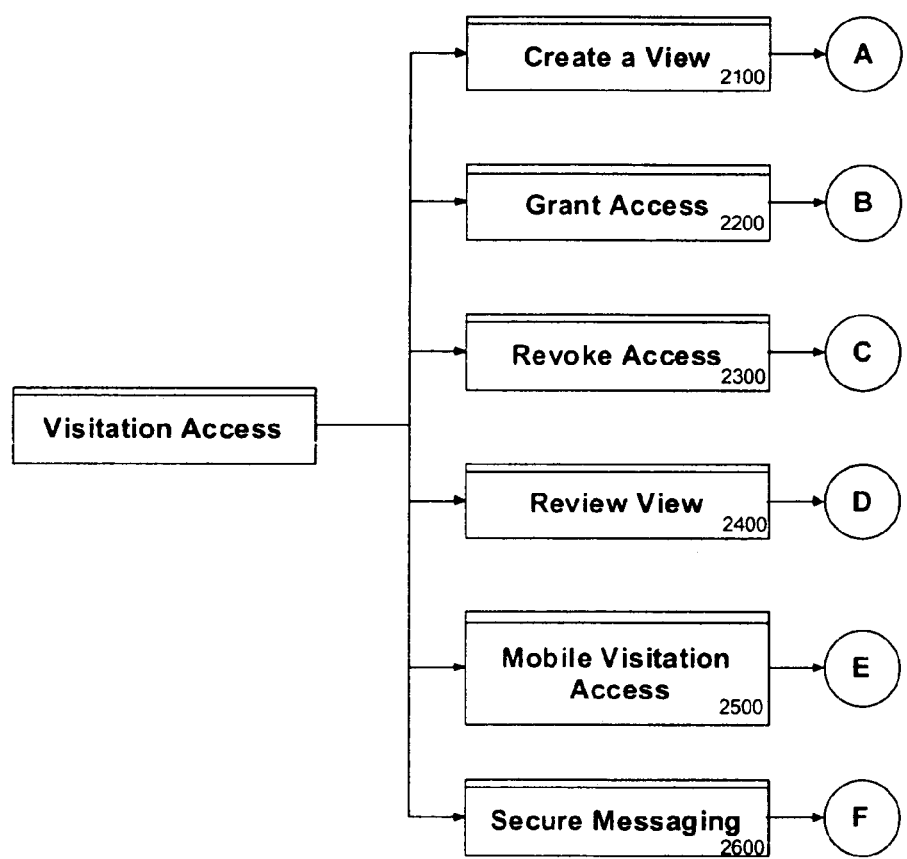
FIGS. 15A–15E are a flow chart of a preferred embodiment of a routine for providing selective sharing of personal information among users of an Internet information aggregation system.
Figure 15B:
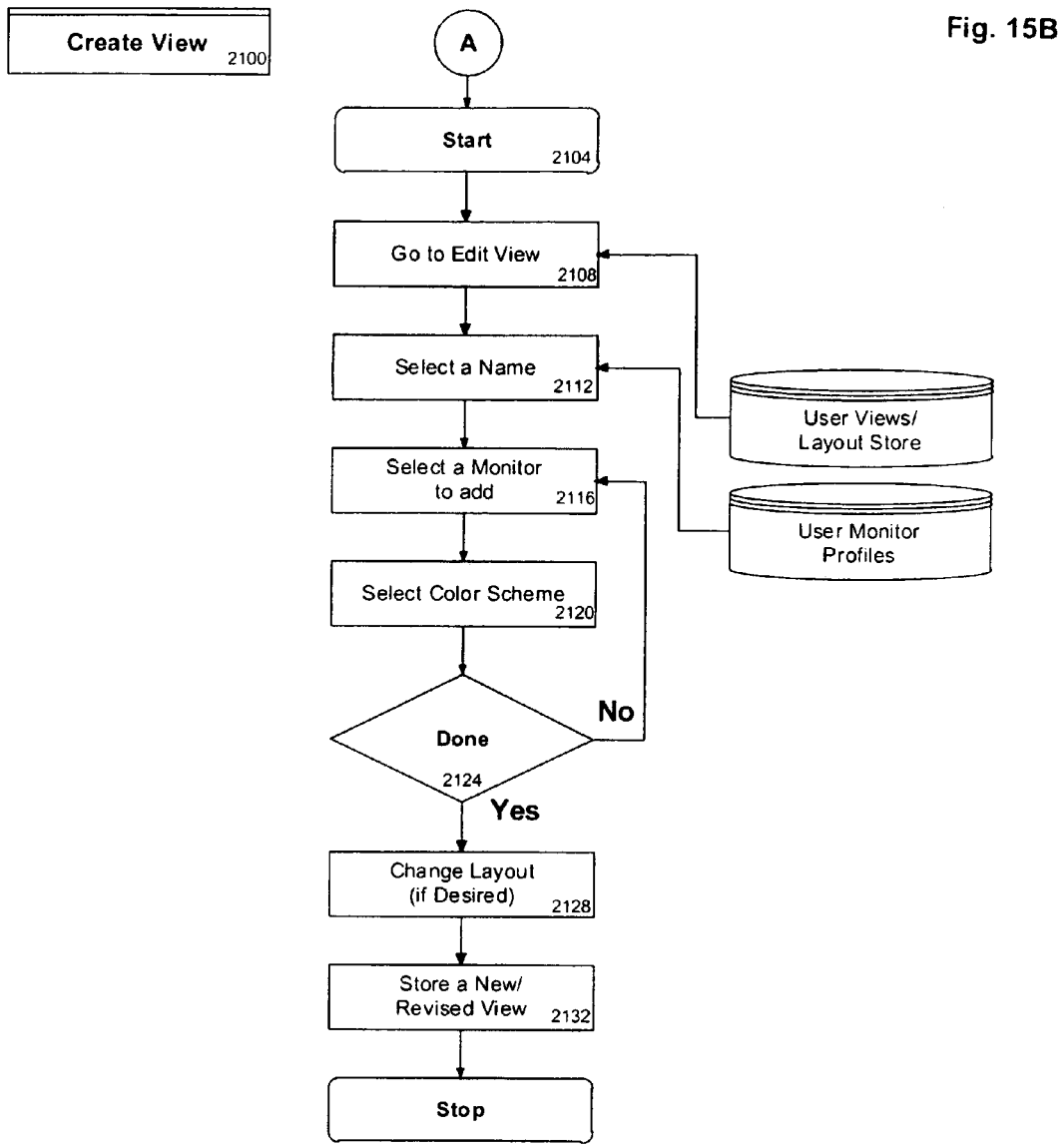

The grantor creates views 20 in the manner described with particularity in Sections C–F above. FIG. 15B provides a high level diagram of the basic functions entailed in creating and modifying view pages 20. With the grantor logged onto the Internet information aggregation system 2104, the grantor can enter input for editing a view page 2108. The grantor can assign a name to the view page 2112. The grantor can select monitors to be added to the view page 2116. The grantor can also select a color scheme for the view page 2120. When the grantor is finished setting up the view page 2124, the grantor can elect to change the view page as desired 2128. The grantor can also store a new or revised view page 2132. In this manner, the grantor creates one or more view pages 20. Once the view pages 20 have been created, the grantor can elect to share his view pages 20, in the manner described below.

2. Grant Visitation

Figure 15C:
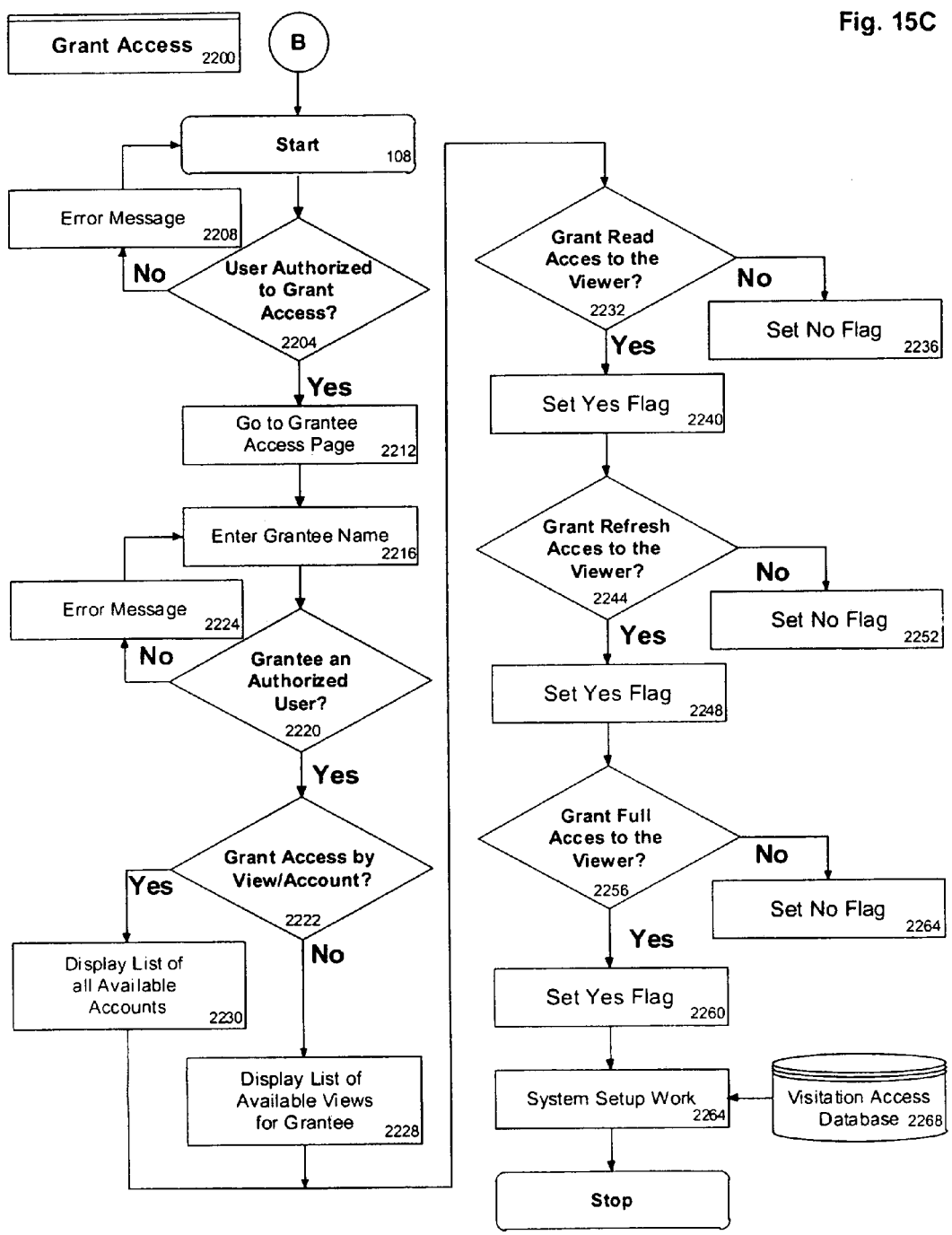

Blocks 2200–2268 of FIG. 15C describe one preferred embodiment of a software routine for granting or assigning access to grantees. When a grantor desires to grant access to the grantor's accounts, the grantor activates the routine of FIG. 15 by selecting the Visitation Access feature from one of the user's view pages 20, such as through an Options pull down menu 110 (see FIG. 2). Upon receiving input from the grantor for granting Visitation Access, the software preferably checks to verify that the grantor is authorized to grant Visitation Access 2204. As indicated in block 2208, if the user is not authorized to grant visitation, the software does not permit the user to grant visitation. In a preferred embodiment, the software is configured such that a user who does not have the right to grant Visitation Access is not presented with the option for granting visitation.

As indicated in block 2212, if the user is authorized to grant access, the grantor is permitted to proceed through the procedure for granting Visitation Access. The grantor is presented with a GUI for granting Visitation Access, such as the preferred embodiment shown in FIG. 14. As indicated in block 2216, the grantor enters the Visitation Access Code of a selected grantee. As mentioned above, the system assigns a Visitation Access Code to each user who has Visitation Access privileges. Upon receiving input for the grantee's Visitation Access Code, the routine determines whether the grantor has entered a correct Visitation Access Code 2220. If the grantor enters an incorrect Visitation Access Code, the routine displays an error message 2224 and/or prompts the grantor to reenter the Visitation Access Code. If the grantor enters a correct Visitation Access Code for a selected grantee, the routine displays a list of the grantor's existing views 2228. Every user of the Internet information aggregation system is assigned a unique Visitation Access Code. The assignment of the user's unique Visitation Access Code is preferably made during the enrollment process. The user's Visitation Access Code is part of the user's personal profile information and is stored on a database of the Internet information aggregation system. In a preferred embodiment, a user's Visitation Access Code can be changed by the user if desired.

As show in FIG. 15C, a grantor can preferably assign visitation access rights to a grantor in two ways. Access can be granted either at the view level whereby the grantor selects the views 20 to be given access to and sets the necessary permissions for the grantee. In this mode the grantee has access to all the information aggregated in the particular view(s) 20 to which he has been granted access. Alternatively, access can be granted on an individual account level. In this case, the grantee gets access only to those particular accounts for which he is given permission by the grantor. Depending on the mode selected for granting access 2222, a list of all the grantor's available views 2228, or a list of all the grantor's available accounts, is displayed 2230. Using the list, the grantor selects the views or accounts to which the grantee will be granted access.

As shown in FIG. 14, in a preferred embodiment of the invention the user can selectively assign one of three levels of access to a given view: (1) Read Access 2234—the grantee can view the information displayed on the user's view page, but cannot manipulate the information or otherwise alter the view page; (2) Refresh Access 2244—in addition to being able to view the information on the view page, the grantee can refresh the information; or (3) Full Access 2256—allows the grantee to exercise certain privileges of the user, such as entering secured web-sites (in a preferred embodiment, a Full Access grantee cannot modify the view pages of the grantor). FIG. 15C shows a preferred routine for granting Visitation Access at the various levels of access. If the grantor inputs a grant of Read Access 2232 for one of the grantor's views, the routine sets a yes flag 2240 for Read Access for that particular view. If the grantor does not input a grant of Read Access 2232 for a particular view, the routine sets a no flag 2244 for Read Access for that view. If the grantor inputs a grant of Refresh Access 2244 for one of the grantor's views, the routine sets a yes flag 2248 for Refresh Access for that particular view. If the grantor does not input a grant of Refresh Access 2244 for a particular view, the routine sets a no flag 2252 for Refresh Access for that view. Likewise, if the grantor inputs a grant of Full Access 2256 for one of the grantor's views, the routine sets a yes flag 2260 for Full Access for that particular view. If the grantor does not input a grant of Full Access 2256 for a particular view, the routine sets a no flag 2264 for Full Access for that view. Once the grantor has assigned access to selected view pages 20, the grantor inputs an instruction to set up the system to allow access by the grantee 2264, such as via the update link 2264 shown in FIG. 14. The routine then sets up the system, incorporating set up parameters from database 2268.

3. Revoke Visitation

Figure 15D:
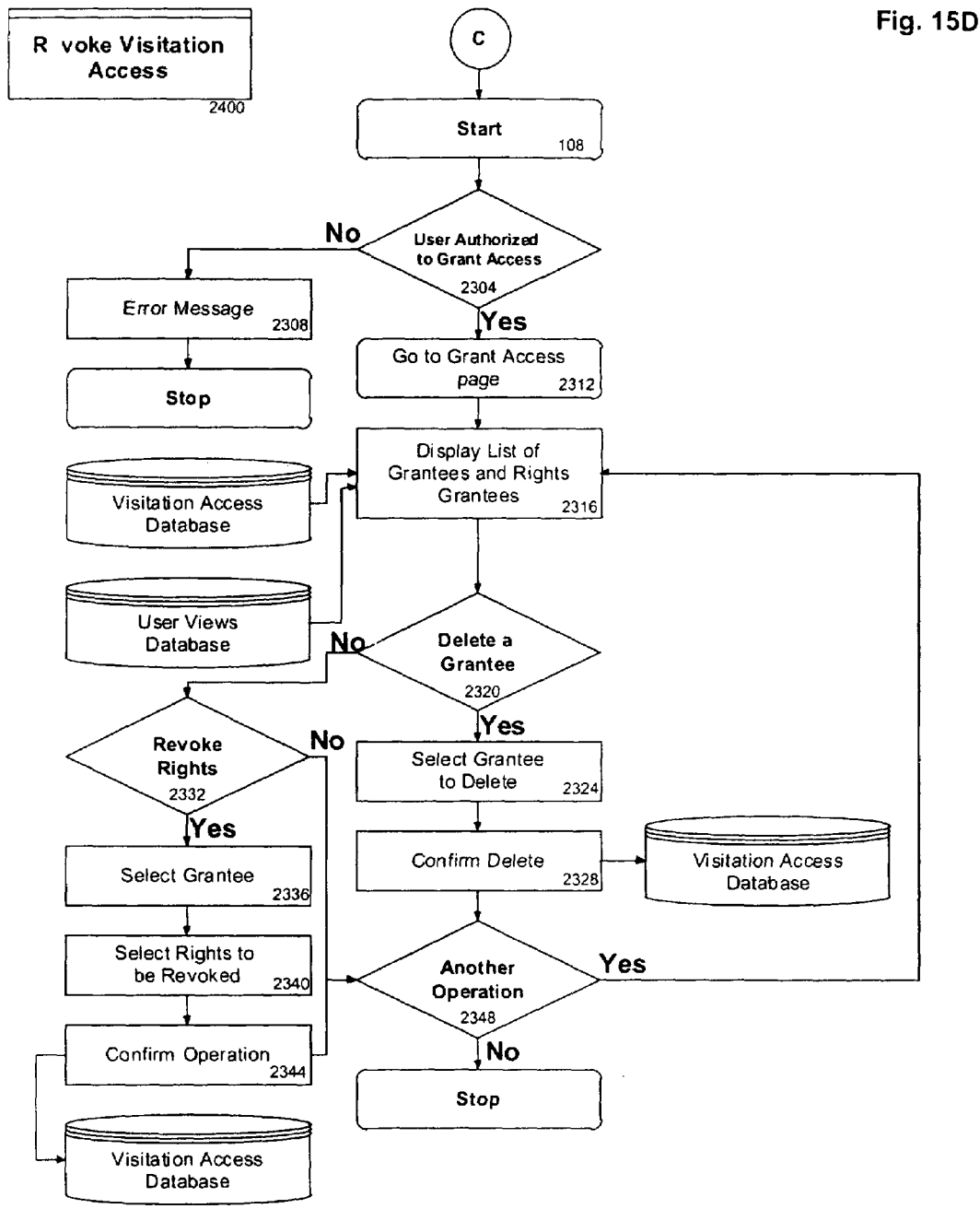

The grantor is also provided with the option of selectively revoking Visitation Access privileges. In the preferred GUI of FIG. 14, the grantor is presented with a link 2300 for deleting or revoking access to a selected grantee (i.e. revoking Visitation Access). As shown in FIG. 15D, to revoke Visitation Access to a grantee, the grantor invokes the page for setting up visitation access 2312 (see FIG. 14). A list of all the grantees to whom the grantor has granted visitation access and their respective access rights are displayed 2316. Selecting 2324 and deleting the grantee 2328 can revoke the rights of a grantee. If visitation rights are revoked in this manner and the grantor later wishes to restore access to the deleted grantee, the setup process must be repeated for the grantee by entering that particular grantee's Visitation Access Code (see 2216 in FIG. 14). Alternately, revoking specific rights for that grantee can temporarily revoke the visitation rights of a grantee 2340. For example, if the grantee is not granted basic read access to the grantor's views, then he/she no longer has any visitation access to the information. If the grantor later wishes to re-assign the privileges to the grantee, those revoked permissions can be activated again. The grantor can also revoke particular rights such as refresh or full-access for a particular grantee.

4. Review Views

Figure 15E:
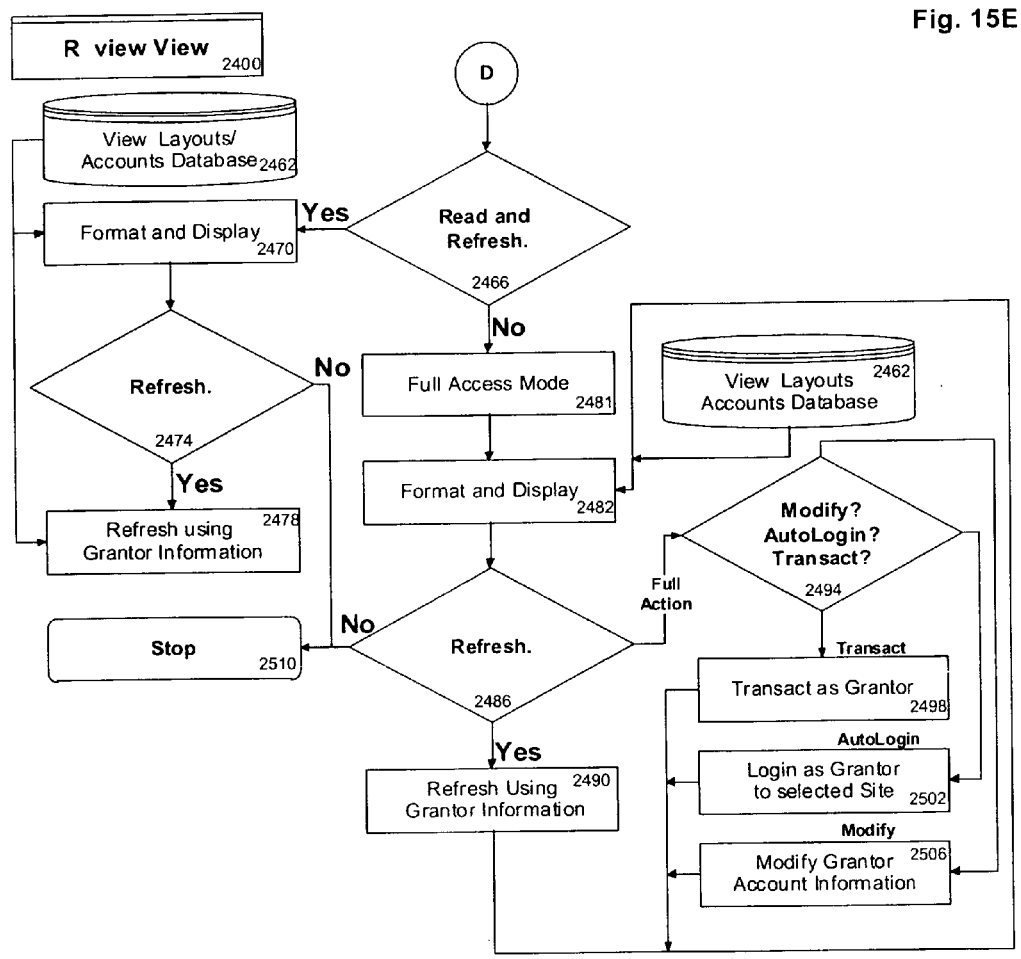

Once the grantor has granted Visitation Access to a grantee in the foregoing manner, the grantee can view the grantor's view pages 20 such as by the preferred routines shown in blocks 2400–2510 (FIG. 15E). In order to view the grantor's view pages 20, the grantee first logs onto the Internet information aggregation system in the manner described above. Once the grantee is logged onto the system, he is presented with his default view page 20 (see FIG. 2). As shown in FIG. 15B, the software initially determines whether the grantee has the right to participate in the Visitation Access function of the system 2404. If the grantee does not have the right to participate in Visitation Access, the grantee is not presented with an option for doing so (block 2408).

If the grantee has the right to participate in Visitation Access, the grantee's view page 20 presents the grantee with an option for doing so. In a preferred embodiment, the Visitation Access view pages are displayed along with the grantee's personal view pages in a pull down menu 103 (see FIG. 2). As indicated in block 2412, the software composes and presents the available view pages by retrieving the grantee's views 20 from a database of available user's views 2416 and by retrieving Visitation Access views from a database of available Visitation Access views 2420. At block 2424, the software receives input for selection of a Visitation Access view page. If the grantee does not select a Visitation Access view page, the software retrieves, composes, and presents one of the grantee's views (blocks 2428, 2412). If the grantee selects one of a grantor's Visitation Access view pages 20, the software composes a Visitation Access view page 20 for the selected view. In composing the Visitation Access view page 20, the software retrieves the grantor's view from the Visitation Access view store database 2438, the grantor's decryption and encryption keys from the grantor decryption and encryption keys database 2442, the grantee's decryption and encryption keys from the grantee decryption and encryption keys database 2446, and the grantor's Visitation Access permissions from the grantor permissions database 2450.

The software then checks to determine whether the grantee has been granted Read Access, Refresh Access, or Full Access. As shown in block 2454, in a preferred embodiment, the software first determines whether the grantee has been granted Read Access. If the grantee has been granted Read Access, the software pulls the selected grantor's view 20 from the view layouts database 2462 and then formats and displays the selected grantor's view 20 on the grantee's display 2458. If visitation access has been granted only for certain accounts of the grantor rather than veiws 20, the system automatically creates a view 20 for the grantee. The automatically created view includes all of the grantor's accounts for which access has been granted to the grantee.

If the grantee has not been limited only to Read Access, the software then determines whether the grantee has been granted Refresh Access 2466. If the grantee has been granted Refresh Access, the software pulls the selected grantor's view from the view layouts database 2462 and then formats and displays the selected grantor's view on the grantee's display 2470. As indicated in block 2474, the software additionally allows the grantee to enter input for selectively refreshing the information on the grantor's selected view page 20. If the grantee selects refresh, the software refreshes 2478 the information on the grantor's selected view page 20, in the manner described above. If the grantee does not select refresh, the system continues to display the grantor's selected view page 20 on the grantee's display until such time as the grantee selects a new view page or logs out of the system 2510.

In a preferred embodiment shown in FIG. 15E, if the grantee has not been limited only to Read Access or Refresh Access, the software defaults to a Full Access mode 2481. The software pulls the selected grantor's view 20 from the view layouts database 2462 and then formats and displays the selected grantor's view page 20 on the grantee's display 2482. As indicated in block 2486, the software allows the grantee to enter input for selectively refreshing the information on the grantor's selected view page 20. If the grantee selects refresh, the software refreshes 2490 the information on the user's selected view page 20, in the manner described above (see Section G). The software also allows the grantee to enter input for carrying out various functions 2494. In a preferred embodiment, the grantee is allowed to carry out transactions as if he were the grantor 2498, login to selected web-sites as though he were the grantor 2502, and modify the grantor's account information as though he were the grantor 2506. The system continues to display the grantor's selected view page 20 on the grantee's display until such time as the grantee selects a new view page or logs out of the system 2510.

5. Mobile Visitation Access

Figure 15F:
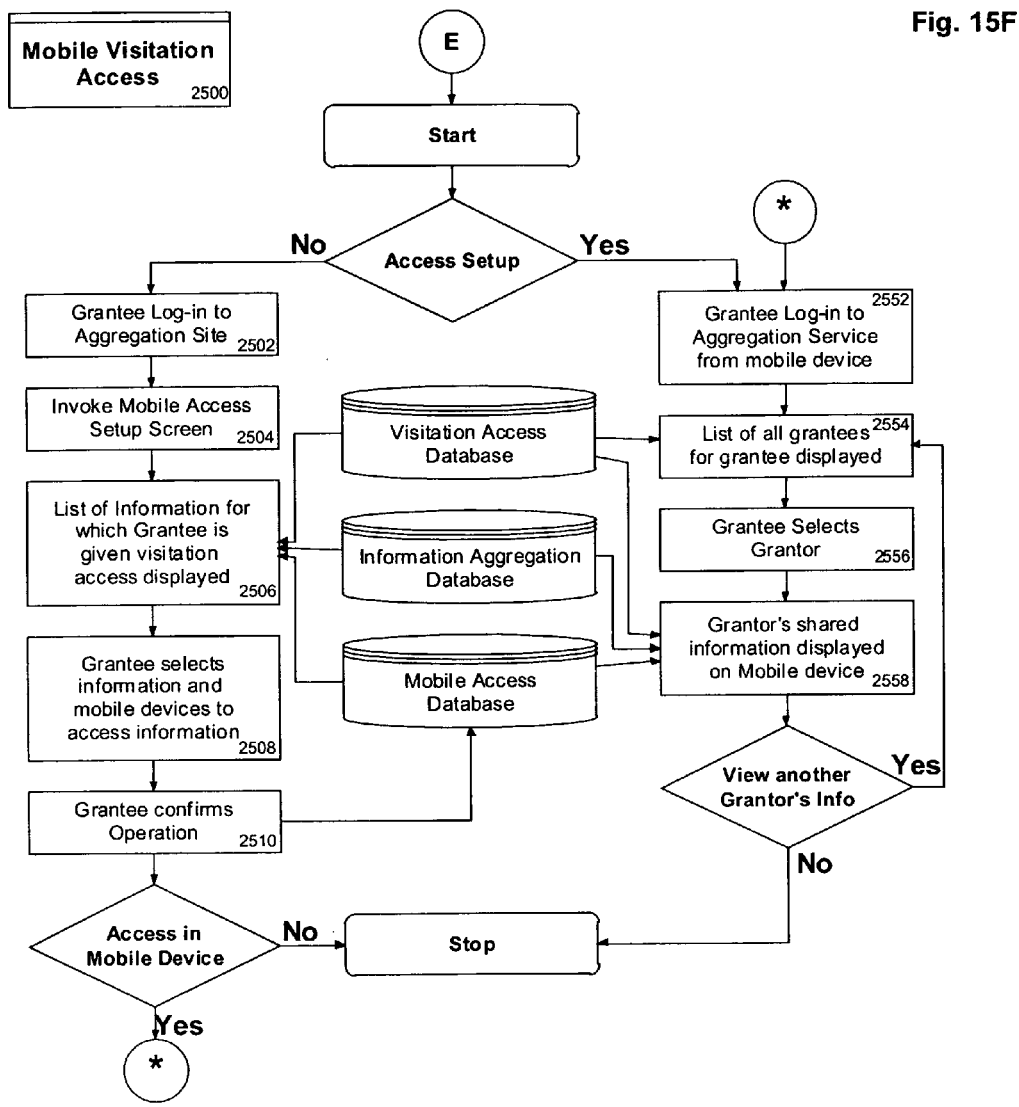
FIG. 15F is a flowchart of a preferred embodiment of a routine for providing selective sharing of personal information among users of an Internet information aggregation system using various mobile and handheld devices.
Figure 15G:
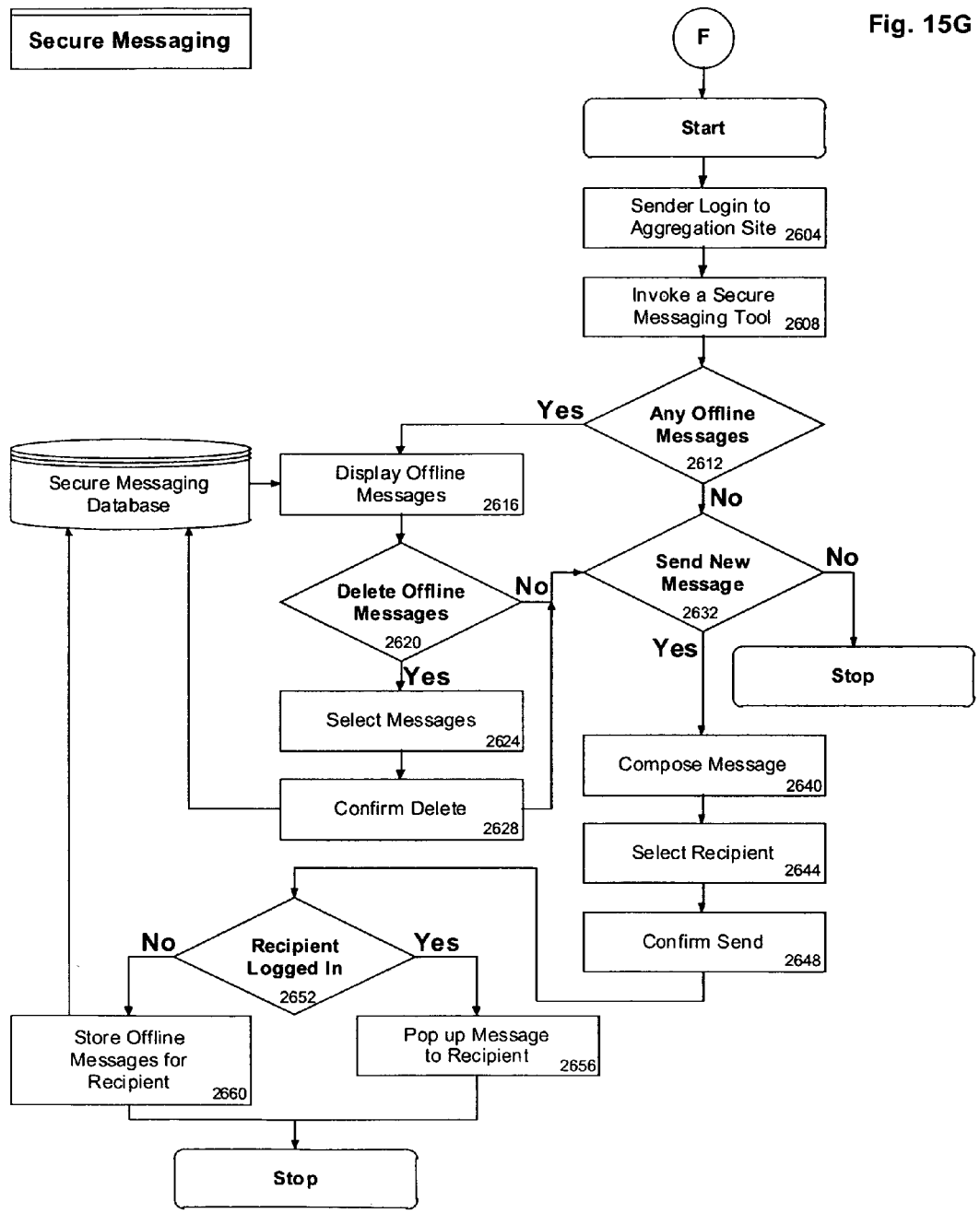
FIG. 15G is a flow chart of a preferred embodiment of a routine for providing secure message exchange between users of an Internet information aggregation system.

Grantees who have access to their aggregated information through various mobile devices (see Section J, above) can also setup and view Visitation Access through those mobile devices. FIG. 15F is a preferred embodiment of a process for setting up and viewing Visitation Access through mobile devices. In order to view grantor's information through mobile devices, a grantee first sets up the information that he/she wishes to access through each particular type of mobile device. The grantee logs in to the aggregation web site 2502 and invokes the mobile access setup page 2504. A list of all grantors who have granted Visitation Access to the grantee, along with the available information for each grantor, is displayed 2506. The grantee then selects the information and the mobile devices in which he wishes to see the selected information 2508. Upon confirming the operation 2510, the grantee's choices are stored to the mobile access database. Once the information is setup to be viewed on mobile devices, the grantee can access the shared information from a mobile device by logging into his aggregation account using his username and mobile access password 2552. After login the grantee selects the visitation option and a list of all his grantors are listed 2554. In order to view the information of a particular grantor, the grantee selects that grantor from the list 2556. The information is then read from the aggregation database and displayed on the mobile device 2558.

6. Secure Messaging

Secure messaging is a tool that allows Visitation Access grantees and grantors to securely communicate with one another. All currently available Internet Messaging services do not have sufficient security features. When a message is being relayed over the Internet, a hacker can view the message without being detected. The present invention provides a secure method for Information aggregation system users to communicate securely with one another. For example, if a user (grantor) grants visitation access rights to his financial account information to another user who is his financial advisor (grantee), the secure messaging feature can be used to discuss important matters relating to the grantor's financial accounts.

In order to send a secure message to a user in a visitation access group, the sender of the message logs in to his Internet information aggregation system 2604. The sender then invokes the secure messaging tool 2608. Messages that were sent to the sender by his grantees and grantors while the sender was offline ("offline messages") are securely stored in the system's secure messaging database 2660. To ensure security of these stored offline messages, they are encrypted before being stored in the database. When the secure messaging tool is accessed, all messages that were sent to the sender while he was offline are retrieved from the secure messaging database and displayed 2616, preferably in a list format. After reading an offline message, the sender can selectively delete the message from the secure messaging database. To delete messages, the sender first selects messages from the list of offline messages 2624. When the user confirms the delete operation, the selected messages are deleted from the secure messaging database 2628. To send a message, the sender composes a message 2640 and selects a recipient or recipients for the message from his list of grantors and grantees 2644. Upon confirmation of the send operation 2648, the message is delivered to the recipient grantor/grantee in an encrypted format. If the recipient of the message happens to be logged into the Internet information aggregation system, the message is instantly displayed to the recipient 2656. If both the sender and recipient of the message are logged in to the system at the same time, they can proceed to exchange messages in real-time. The message is transmitted from the sender's machine to the aggregation system servers and then to the recipient's machine in an encrypted format. Upon reaching the recipient's machine, the message is decrypted for viewing. If the recipient is not logged in to the Internet information aggregation system at that time the message is sent, then the message is encrypted and stored in the secure messaging database as an offline message. The offline messages will be displayed to the recipient when he logs in 2616. The users can also selectively set various priorities on the messages and, depending on the urgency level of the message, the messages can be forwarded to the grantee recipient's mobile devices.

The secure messaging system of the invention differs significantly from conventional e-mail. With conventional e-mail, a message and its envelope are transmitted from a sender to the recipient via the Internet. During transmission, the e-mail message can be intercepted and viewed by a hacker. Once a conventional e-mail message reaches the recipient's processor, the e-mail message is stored on the hard drive of the recipient's processor, typically in an "in box" file, until the message is permanently deleted. A hacker can access the e-mail message on the recipient's processor. In the secure messaging system of the present invention, the secure messages remain stored only in the system's secure messaging database. The secure messages are transmitted to a recipient's processor ion an encrypted format for viewing purposes, in the same manner as recipient's personal account information is transmitted to a grantee. The recipient is simply being allowed to view a secure message rather than, for example, the grantor's view page 20 or grantor's personal information from a web-site. Because the secure messages are transmitted to recipients in an encrypted format and remain stored only on the system's secure messaging database, it is virtually impossible for hackers to access the secure messages.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. A computerized method of providing and allowing secure sharing of account information between users of an Internet information aggregation system comprising:
   a grantor user creating one or more view pages,
   storing the grantor's view pages in a view pages database of the Internet information aggregation system,
   assigning a unique visitation access code to each of a plurality of grantee users of the Internet information aggregation system,
   storing said visitation codes in a database of the Internet information aggregation system,
   said grantor selectively obtaining said visitation access codes from one or more of said grantees, and
   said grantor using said visitation access codes to selectively grant visitation access to one or more of said grantor's view pages to one or more of said grantees.

2. The method of claim 1, wherein said grantor's view pages include
   a public view that displays non-sensitive information,
   a private view that displays sensitive information, and
   an advisor view that displays selected account information pertaining to obtaining advice from an advisor, such as a financial, health, or travel advisor.

3. The method of claim 1, wherein said step of using said visitation access codes to selectively grant visitation access to one or more of said grantor's view pages to one or more of said grantees comprises:
   receiving input from said grantor for granting visitation access,
   verifying that said grantor is authorized to grant visitation access,
   if said grantor is authorized to grant visitation access, presenting a graphical user interface for granting visitation access,
   receiving input from the grantor for a visitation access code of a selected grantee,
   determining whether said grantor entered a correct visitation access code,
   if said grantor entered a correct visitation access code, displaying a list of said grantor's available view pages, and
   receiving input from said grantor for selectively granting access to one or more of said grantor's view pages to said selected grantee.

4. The method of claim 3, further comprising, in said step of selectively granting access to one or more of said grantor's view pages, selectively assigning one of three levels of access for each said view page for which access is granted, said level of access selected from the group consisting of Read Access, Refresh Access, and Full Access.

5. The method of claim 1, further comprising said grantor selectively granting visitation access privileges to one or more of said grantees.

6. The method of claim 5, further comprising, in said step of selectively granting access to one or more of the grantor's view pages, selectively granting a right of Read Access to said selected grantee, wherein said Internet information aggregation system permits said grantee to view account information displayed on the grantor's view page but does not permit said grantee to manipulate said account information or otherwise alter said view page.

7. The method of claim 5, further comprising, in said step of selectively granting access to one or more of the grantor's view pages, selectively granting a right of Refresh Access to said selected grantee, wherein said Internet information aggregation system permits said grantee to view account information displayed on the grantor's view page and to selectively refresh said account information.

8. The method of claim 5, further comprising, in said step of selectively granting access to one or more of the grantor's view pages, selectively granting a right of Full Access to said selected grantee, wherein said Internet information aggregation system permits said grantee to view and manipulate account information displayed on the grantor's view page as though said grantee were the grantor.

9. The method of claim 5, further comprising, in said step of selectively granting access to one or more of the grantor's view pages, selectively assigning a right to one of three levels of access for each said view page for which access is granted, said level of access selected from the group consisting of Read Access, Refresh Access, and Full Access.

10. The method of claim 5, further comprising exchanging messages between the users in a secure format, wherein said secure messages are transmitted to recipient users in an encrypted read-only format, and wherein said secure messages are stored only on the Internet information aggregation system.

11. The method of claim 1, further comprising the grantor selectively revoking visitation access privileges to one or more of said grantees.

12. The method of claim 1, further comprising:
   a grantee logging onto the Internet information aggregation system via a processor,
   displaying one of said grantee's view pages on a display of said grantee's processor, said display including an option for selectively viewing view pages of grantors who have granted visitation access to said grantee,
   said grantee selecting one of the grantors' view pages, and
   displaying said selected grantor's view page on said grantee's display.

13. The method of claim 12, wherein said step of displaying said selected grantor's view page on said grantee's display comprises:
   retrieving said selected grantor's view from said view pages database,
   retrieving the grantor's decryption and encryption keys from a grantor decryption and encryption keys database,
   retrieving said grantee's decryption and encryption keys from a reviewer decryption and encryption keys database,
   retrieving the grantor's visitation access permissions from a grantor permissions database, and
   utilizing the grantor's decryption and encryption keys, said grantee's decryption and encryption keys, and the grantor's visitation access permissions to display said selected grantor's view page on said grantee's display.

14. The method of claim 13, wherein said processor is a mobile device.

15. The method of claim 12, further comprising determining whether said grantee has been granted a right to Read Access, Refresh Access, or Full Access, and limiting said grantee's use of said selected grantor's view page to said granted right of access.

16. The method of claim 15, wherein said step of determining whether said grantee has been granted a right to_Read Access, Refresh Access, or Full Access comprises:
determining whether said grantee has been granted a right to_Read Access, and, if said grantee has been granted said right to_Read Access, retrieving said selected grantor's view page, displaying said selected grantor's view page on said grantee's display, and permitting said grantee to view said view page in a read-only mode;
if said grantee has not been limited only to Read Access, determining whether said grantee has been granted a right to Refresh Access, and, if said grantee has been granted said right to Refresh Access, retrieving said selected host user's view page, displaying said selected grantor's view on said grantee's display, and enabling said grantee to selectively refresh selected information on said selected grantor's view page; and
if said grantee has not been limited only to Read Access or Refresh Access, retrieving said selected grantor's view page, displaying said selected grantor's view on said grantee's display, enabling said grantee to selectively refresh selected information on said selected grantor's view page, and enabling said grantee to carry out functions on the grantor's view page as though said grantee were the grantor, said functions including carrying out transactions, logging in to selected web-sites, and modifying the grantor's account information.

17. The method of claim 16, wherein said processor is a mobile device.

18. The method of claim 15, wherein said processor is a mobile device.

19. The method of claim 12, wherein said processor is a mobile device.

20. The method of claim 12, further comprising exchanging messages between the users in a secure format, wherein said secure messages are transmitted to recipient users in an encrypted read-only format, and wherein said secure messages are stored only on the Internet information aggregation system.

21. The method of claim 1, further comprising exchanging messages between the users in a secure format, wherein said secure messages are transmitted to recipient users in an encrypted read-only format, and wherein said secure messages are stored only on the Internet information aggregation system.

22. A computerized system for providing and allowing secure sharing of account information between users of an Internet information aggregation system, the Internet account aggregation system aggregating and displaying Internet account information on processors of the users, the users' processors each having a display and being interactively connected to a host server processor via the Internet, wherein a grantor is a user who selectively grants the right to access account information displayed on the grantor user's view pages, and a grantee is a user who receives such right to access account information on the grantors' view pages, comprising:
a means for the grantors to create one or more view pages,
said host processor programmed to store said view pages created by the grantors in a view pages database of the Internet information aggregation system,
a means for assigning a unique visitation access code to each of the grantees,
said host processor programmed to store said visitation access codes in a visitation access code database of the Internet information aggregation system, and
a means for granting visitation access to the grantees, whereby the grantors use said visitation access codes to selectively grant access to selected grantor view pages to selected grantees.

23. The system of claim 22, wherein said grantor view pages include a Public View that displays non-sensitive account information of the grantor.

24. The system of claim 22, wherein said grantor view pages include a Private View that displays sensitive account information of the grantor.

25. The system of claim 22, wherein said grantor view pages include an Advisor View that displays selected account information of the grantor that pertains to obtaining advice from an advisor, such as a financial, health, or travel advisor.

26. The system of claim 22, wherein said means for selectively granting visitation access further includes a means for selectively granting Read Access, wherein said Internet information aggregation system permits said grantee to view account information displayed on the grantor's view page but does not permit said grantee to manipulate said account information or otherwise alter said view page.

27. The system of claim 22, wherein said means for selectively granting visitation access further includes a means for selectively granting Refresh Access, wherein said Internet information aggregation system permits said grantee to view account information displayed on the grantor's view page and to selectively refresh said account information.

28. The system of claim 22, wherein said means for selectively granting visitation access further includes a means for selectively granting Full Access, wherein said Internet information aggregation system permits said grantee to view and manipulate account information displayed on the grantor's view page as though said grantee were the grantor.

29. The system of claim 22, further comprising a means for the grantors to selectively revoke visitation access privileges to one or more of said grantees.

30. The system of claim 22, further comprising:
the host processor programmed to display on each grantee's display available grantor view pages to which the grantee has been granted visitation access rights, said display including a means for the grantee to select an available grantor view page for viewing, and
the host processor programmed to display said selected grantor's view page on said grantee's display.

31. The system of claim 30, further comprising the host processor programmed to determine whether each grantee has been granted a right to Read Access, Refresh Access, or Full Access, and to limit each grantee's use of said selected grantor's view page to said granted right of access.

32. The system of claim 31, wherein said processor is a mobile device.

33. The system of claim 30, wherein said processor is a mobile device.

34. The system of claim 30, further comprising a means for exchanging messages between the users in a secure format, wherein said secure messages are transmitted to recipient users in an encrypted read-only format, and wherein said secure messages are stored only on the Internet information aggregation system.

35. The system of claim 22, further comprising a means for exchanging messages between the users in a secure format, wherein said secure messages are transmitted to recipient users in an encrypted read-only format, and wherein said secure messages are stored only on the Internet information aggregation system.

36. A computerized method of providing and allowing secure sharing of account information between users of an Internet information aggregation system, wherein a grantor is a user who selectively grants a right to access account information displayed on the grantor user's view pages, and a grantee is a user who receives such right to access account information on the grantors' view pages, comprising:
- a grantor creating one or more view pages, each said view page having a plurality of monitors therein,
- storing the grantor's view pages in a view pages database of the Internet information aggregation system, assigning a unique visitation access code to each of a plurality of grantees of the Internet information aggregation system,
- storing said visitation access codes in a database of the Internet information aggregation system,
- the grantor selectively obtaining said visitation access codes from one or more of said grantees,
- receiving input from the grantor for granting visitation access,
- verifying that the grantor is authorized to grant visitation access,
- if the grantor is authorized to grant visitation access, presenting a graphical user interface for granting visitation access,
- receiving input from the grantor for a visitation access code of a selected grantee,
- determining whether the grantor entered a correct visitation access code,
- if the grantor entered a correct visitation access code, displaying a list of the grantor's available view pages, and
- receiving input from the grantor for selectively granting access to one or more of the grantor's view pages to said selected grantee.

37. A computerized method of providing and allowing secure sharing of account information between users of an Internet information aggregation system, wherein a grantor is a user who selectively grants a right to access account information displayed on the grantor user's view pages, and a grantee is a user who receives such right to access account information on the grantors' view pages, comprising:
- a grantor creating one or more view pages, each said view page having a plurality of monitors therein,
- storing the grantor's view pages in a view pages database of the Internet information aggregation system,
- assigning a unique visitation access code to each of a plurality of grantees of the Internet information aggregation system,
- storing said visitation access codes in a database of the Internet information aggregation system,
- the grantor selectively obtaining said visitation access codes from one or more of said grantees,
- receiving input from the grantor for granting visitation access,
- verifying that the grantor is authorized to grant visitation access,
- if the grantor is authorized to grant visitation access, presenting a graphical user interface for granting visitation access,
- receiving input from the grantor for a visitation access code of a selected grantee,
- determining whether the grantor entered a correct visitation access code,
- if the grantor entered a correct visitation access code, displaying a list of the grantor's available view pages, and
- receiving input from the grantor for selectively granting access to one or more of the grantor's view pages to said selected grantee, including selectively assigning a right to one of three levels of access for each said view page for which access is granted, said level of access selected from the group consisting of Read Access, Refresh Access, and Full Access.

38. A computerized method of providing and allowing secure sharing of account information between users of an Internet information aggregation system, wherein a grantor is a user who selectively grants a right to access account information displayed on the grantor user's view pages, and a grantee is a user who receives such right to access account information on the grantors' view pages, comprising:
- a grantor creating one or more view pages, each said view page having a plurality of monitors therein,
- storing the grantor's view pages in a view pages database of the Internet information aggregation system,
- assigning a unique visitation access code to each of a plurality of grantees of the Internet information aggregation system,
- storing said visitation access codes in a database of the Internet information aggregation system,
- the grantor selectively obtaining said visitation access codes from one or more of said grantees,
- receiving input from the grantor for granting visitation access,
- verifying that the grantor is authorized to grant visitation access,
- if the grantor is authorized to grant visitation access, presenting a graphical user interface for granting visitation access,
- receiving input from the grantor for a visitation access code of a selected grantee,
- determining whether the grantor entered a correct visitation access code,
- if the grantor entered a correct visitation access code, displaying a list of the grantor's available view pages, and
- receiving input from the grantor for selectively granting access to one or more of the grantor's view pages to said selected grantee,
- a grantee logging onto the Internet information aggregation system via a processor,
- displaying one of said grantee's view pages on a display of said grantee's processor, said display including an option for selectively viewing view pages of grantors who have granted visitation access to said grantee,
- said grantee selecting one of the grantors' view pages, and
- displaying said selected grantor's view page on said grantee's display.

39. The method of claim 38, wherein said processor is a mobile device.

40. A computerized method of providing and allowing secure sharing of account information between users of an Internet information aggregation system, wherein a grantor is a user who selectively grants a right to access account information displayed on the grantor user's view pages, and a grantee is a user who receives such right to access account information on the grantor's view pages, comprising:
- a grantor creating one or more view pages, each said view page having a plurality of monitors therein,
- storing the grantor's view pages in a view pages database of the Internet information aggregation system,
- assigning a unique visitation access code to each of a plurality of grantees of the Internet information aggregation system,
- storing said visitation access codes in a database of the Internet information aggregation system,
- the grantor selectively obtaining said visitation access codes from one or more of said grantees,
- receiving input from the grantor for granting visitation access,
- verifying that the grantor is authorized to grant visitation access,
- if the grantor is authorized to grant visitation access, presenting a graphical user interface for granting visitation access,
- receiving input from the grantor for a visitation access code of a selected grantee,
- determining whether the grantor entered a correct visitation access code,
- if the grantor entered a correct visitation access code, displaying a list of the grantor's available view pages, and
- receiving input from the grantor for selectively granting access to one or more of the grantor's view pages to said selected grantee, including selectively assigning a right to one of three levels of access for each said view page for which access is granted, said level of access selected from the group consisting of Read Access, Refresh Access, and Full Access,
- a grantee logging onto the Internet information aggregation system via a processor,
- displaying one of said grantee's view pages on a display of said grantee's processor, said display including an option for selectively viewing view pages of grantors who have granted visitation access to said grantee,
- said grantee selecting one of the grantors' view pages,
- retrieving said selected grantor's view from said view pages database,
- retrieving the grantor's decryption and encryption keys from a grantor decryption and encryption keys database,
- retrieving said grantee's decryption and encryption keys from a reviewer decryption and encryption keys database,
- retrieving the grantor's visitation access permissions from a grantor permissions database, and
- utilizing the grantor's decryption and encryption keys, said grantee's decryption and encryption keys, and the grantor's visitation access permissions to display said selected grantor's view page on said grantee's display.

41. The method of claim 40, further comprising determining whether said grantee has been granted a right to Read Access, Refresh Access, or Full Access, and limiting said grantee's use of said selected grantor's view page to said granted right of access.

42. The method of claim 41, wherein said step of determining whether said grantee has been granted a right to Read Access, Refresh Access, or Full Access comprises:
- determining whether said grantee has been granted a right to Read Access, and, if said grantee has been granted said right to Read Access, retrieving said selected grantor's view page, displaying said selected grantor's view page on said grantee's display, and permitting said grantee to view said view page in a read-only mode;
- if said grantee has not been limited only to Read Access, determining whether said grantee has been granted a right to Refresh Access, and, if said grantee has been granted said right to Refresh Access, retrieving said selected host user's view page, displaying said selected grantor's view on said grantee's display, and enabling said grantee to selectively refresh selected information on said selected grantor's view page; and
- if said grantee has not been limited only to Read Access or Refresh Access, retrieving said selected grantor's view page, displaying said selected grantor's view on said grantee's display, enabling said grantee to selectively refresh selected information on said selected grantor's view page, and enabling said grantee to carry out functions on the grantor's view page as though said grantee were the grantor, said functions including carrying out transactions, logging in to selected web-sites, and modifying the grantor's account information.

43. The method of claim 40, wherein said processor is a mobile device.

44. A computerized method of providing and allowing secure sharing of account information between users of an Internet information aggregation system, wherein a grantor is a user who selectively grants a right to access account information displayed on the grantor user's view pages, and a grantee is a user who receives such right to access account information on the grantors' view pages, comprising:
- a grantor creating one or more view pages, each said view page having three columns, each of said columns having at least one monitor therein,
- storing the grantor's view pages in a view pages database of the Internet information aggregation system,
- assigning a unique visitation access code to each of a plurality of grantees of the Internet information aggregation system,
- storing said visitation access codes in a database of the Internet information aggregation system,
- the grantor selectively obtaining said visitation access codes from one or more of said grantees,
- receiving input from the grantor for granting visitation access,
- verifying that the grantor is authorized to grant visitation access,
- if the grantor is authorized to grant visitation access, presenting a graphical user interface for granting visitation access,
- receiving input from the grantor for a visitation access code of a selected grantee,
- determining whether the grantor entered a correct visitation access code,
- if the grantor entered a correct visitation access code, displaying a list of the grantor's available view pages, and
- receiving input from the grantor for selectively granting access to one or more of the grantor's view pages to said selected grantee,
- a grantee logging onto the Internet information aggregation system via a processor,
- displaying one of said grantee's view pages on a display of said grantee's processor, said display including an option for selectively viewing view pages of grantors who have granted visitation access to said grantee, said grantee selecting one of the grantors' view pages, and displaying said selected grantor's view page on said grantee's display.

45. The method of claim 44, wherein said processor is a mobile device.

46. A computerized method of providing and allowing secure sharing of account information between users of an Internet information aggregation system, including secure sharing of messages, wherein a grantor is a user who selectively grants a right to access account information displayed on the grantor user's view pages, and a grantee is a user who receives such right to access account information on the grantors' view pages, comprising:

a grantor creating one or more view pages, storing the grantor's view pages in a view pages database of the Internet information aggregation system, assigning a unique visitation access code to each of a plurality of grantees of the Internet information aggregation system, storing said visitation access codes in a database of the Internet information aggregation system, the grantor selectively obtaining said visitation access codes from one or more of said grantees, receiving input from the grantor for granting visitation access, verifying that the grantor is authorized to grant visitation access, if the grantor is authorized to grant visitation access, presenting a graphical user interface for granting visitation access, receiving input from the grantor for a visitation access code of a selected grantee, determining whether the grantor entered a correct visitation access code, if the grantor entered a correct visitation access code, displaying a list of the grantor's available view pages, and receiving input from the grantor for selectively granting access to one or more of the grantor's view pages to said selected grantee, a grantee logging onto the Internet information aggregation system via a processor, displaying one of said grantee's view pages on a display of said grantee's processor, said display including an option for selectively viewing view pages of grantors who have granted visitation access to said grantee, said grantee selecting one of the grantors' view pages, displaying said selected grantor's view page on said grantee's display, receiving input from a composing user for composition of a secure message, said composing user being either a grantor or a grantee, receiving input from said composing user for selection of a recipient of said secure message, said recipient being either a grantor or a grantee, receiving input from said composing user for transmitting said secure message to said recipient, and upon receipt of said input for transmitting said secure message, transmitting said secure message to a processor of said recipient in an encrypted read-only format.

47. The method of claim 46, further comprising decrypting said secure message when said secure message reaches said recipient's processor, and displaying said secure message on a display of said recipient's processor.

48. The method of claim 46, wherein, if said recipient was not logged into the Internet information aggregation system when said secure message was transmitted to said recipient, storing said secure message in an encrypted format in a secure messaging database of the Internet information aggregation system.

49. The method of claim 48, further comprising retrieving said secure message from said secure messaging database when said recipient logs into the Internet information aggregation system, and transmitting said secure message to said processor of said recipient in an encrypted format.

50. The method of claim 49, further comprising decrypting said secure message when said secure message reaches said recipient's processor, and displaying said secure message on a display of said recipient's processor.

51. The method of claim 48, further comprising said composing user selectively deleting secure messages from said secure messaging database.

52. The method of claim 46, further comprising forwarding secure messages to a mobile device of said recipient.

* * * * *